(12) United States Patent
Sahita et al.

(10) Patent No.: US 11,099,878 B2
(45) Date of Patent: Aug. 24, 2021

(54) SCALABLE VIRTUAL MACHINE OPERATION INSIDE TRUST DOMAINS WITHIN THE TRUST DOMAIN ARCHITECTURE

(71) Applicant: Intel Corporation, Santa Clara, CA (US)

(72) Inventors: Ravi L. Sahita, Portland, OR (US); Tin-Cheung Kung, Folsom, CA (US); Vedvyas Shanbhogue, Austin, TX (US); Barry E. Huntley, Hillsboro, OR (US); Arie Aharon, Haifa (IL)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 16/456,628

(22) Filed: Jun. 28, 2019

(65) Prior Publication Data

US 2020/0409734 A1    Dec. 31, 2020

(51) Int. Cl.
*G06F 9/455* (2018.01)
*G06F 9/50* (2006.01)
*H04L 9/06* (2006.01)

(52) U.S. Cl.
CPC ......... *G06F 9/45558* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/45566;
(Continued)

(56) References Cited

U.S. PATENT DOCUMENTS 9,990,208 B2 * 6/2018 Sutton, II ............. G01N 23/223
2016/0299851 A1 * 10/2016 Mattson, Jr. ........ G06F 9/45558
(Continued)

OTHER PUBLICATIONS

Kaplan, David, "Protecting VM Register State With SEV-ES", AMD White Paper, Feb. 17, 2017, pp. 1-8, https://www.amd.com/system/files/TechDocs/Protecting%20VM%20Register%20State%20with%20SEV-ES.pdf (Year: 2017).*
(Continued)

*Primary Examiner* — Charles M Swift
(74) *Attorney, Agent, or Firm* — Nicholson De Vos Webster & Elliott LLP

(57) ABSTRACT

Implementations describe a computing system that implements a plurality of virtual machines inside a trust domain (TD), enabled via a secure arbitration mode (SEAM) of the processor. A processor includes one or more registers to store a SEAM range of memory, a TD key identifier of a TD private encryption key. The processor is capable of initializing a trust domain resource manager (TDRM) to manage the TD, and a virtual machine monitor within the TD to manage the plurality of virtual machines therein. The processor is further capable of exclusively associating a plurality of memory pages with the TD, wherein the plurality of memory pages associated with the TD is encrypted with a TD private encryption key inaccessible to the TDRM. The processor is further capable of using the SEAM range of memory, inaccessible to the TDRM, to provide isolation between the TDRM and the plurality of virtual machines.

23 Claims, 24 Drawing Sheets

(52) U.S. Cl.
CPC .............. *G06F 9/50* (2013.01); *G06F 9/5005* (2013.01); *G06F 9/5011* (2013.01); *G06F 9/5016* (2013.01); *G06F 9/5022* (2013.01); *G06F 9/5061* (2013.01); *H04L 9/06* (2013.01); *H04L 9/0618* (2013.01); *G06F 2009/4557* (2013.01); *G06F 2009/45566* (2013.01); *G06F 2009/45575* (2013.01); *G06F 2009/45579* (2013.01); *G06F 2009/45583* (2013.01); *G06F 2009/45587* (2013.01)

(58) Field of Classification Search
CPC ... G06F 2009/4557; G06F 2009/45575; G06F 2009/45579; G06F 2009/45583; G06F 2009/45587; G06F 9/50; G06F 9/5005; G06F 9/5011; G06F 9/5016; G06F 9/5022; G06F 9/5061; H04L 9/06; H04L 9/0618
See application file for complete search history.

(56) References Cited

U.S. PATENT DOCUMENTS

| | | | |
|---|---|---|---|
| 2016/0364341 | A1* | 12/2016 | Banginwar ......... G06F 9/45545 |
| 2018/0260251 | A1 | 9/2018 | Beveridge et al. |
| 2019/0087575 | A1 | 3/2019 | Sahita et al. |

OTHER PUBLICATIONS

Li et al, "A Trusted Virtual Machine in an Untrusted Management Environment", IEEE Transaction On Services Computing, vol. 5, NP. 4, Oct.-Dec. 2012, pp. 472-483 (Year: 2012).*

Champagne et al, "Scalable Architectural Support for Trusted Software", 2009, IEEE, pp. 1-12 (Year: 2009).*

Asvija et al., "Security in hardware assisted virtualization for cloud computing-State of the art issues and challenges", Commuter Networks, vol. 151, 2019, pp. 68-92.

European Search Report and Search Opinion, EP App. No. 20164745.0, Aug. 26, 2020, 9 pages.

* cited by examiner

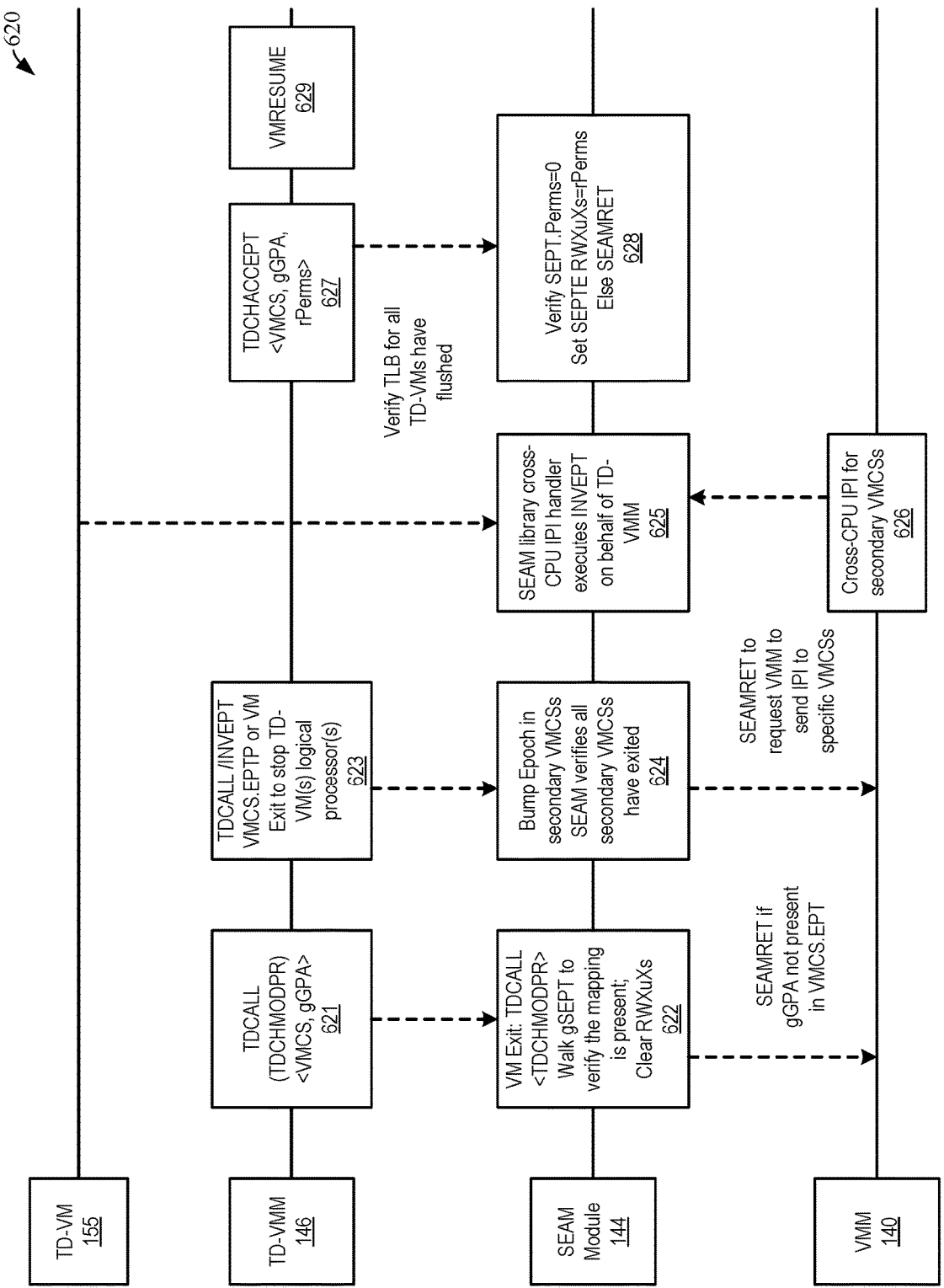

400
SCALABLE VIRTUAL MACHINE OPERATION INSIDE TRUST DOMAINS WITHIN THE TRUST DOMAIN ARCHITECTURE

TECHNICAL FIELD

The disclosure pertains to computer systems, and more specifically, to executing virtual machines using a secure arbitration mode of a computing device within a trust domain architecture.

BACKGROUND

Modern processing devices employ disk encryption to protect data at rest. However, data in memory is in plaintext and vulnerable to attacks. Attackers can use a variety of techniques including software and hardware-based bus scanning, memory scanning, hardware probing, and the like to retrieve data from memory. This data from memory could include sensitive data for example, privacy-sensitive data, IP-sensitive data, keys used for file encryption or communication, and so on. The exposure of data is further exacerbated with the current trend of moving data and enterprise workloads into the cloud utilizing virtualization-based hosting services provided by cloud service providers.

BRIEF DESCRIPTION OF THE DRAWINGS

FIG. 6C illustrates an example flow for execution of an instruction to modify permissions to access a memory page identified by a guest physical address that can be invoked by the virtual machine monitor operating inside a trust domain, in the SEAM-enabled TD-VMX architecture, in one exemplary implementation.

DETAILED DESCRIPTION

Figure 1A:
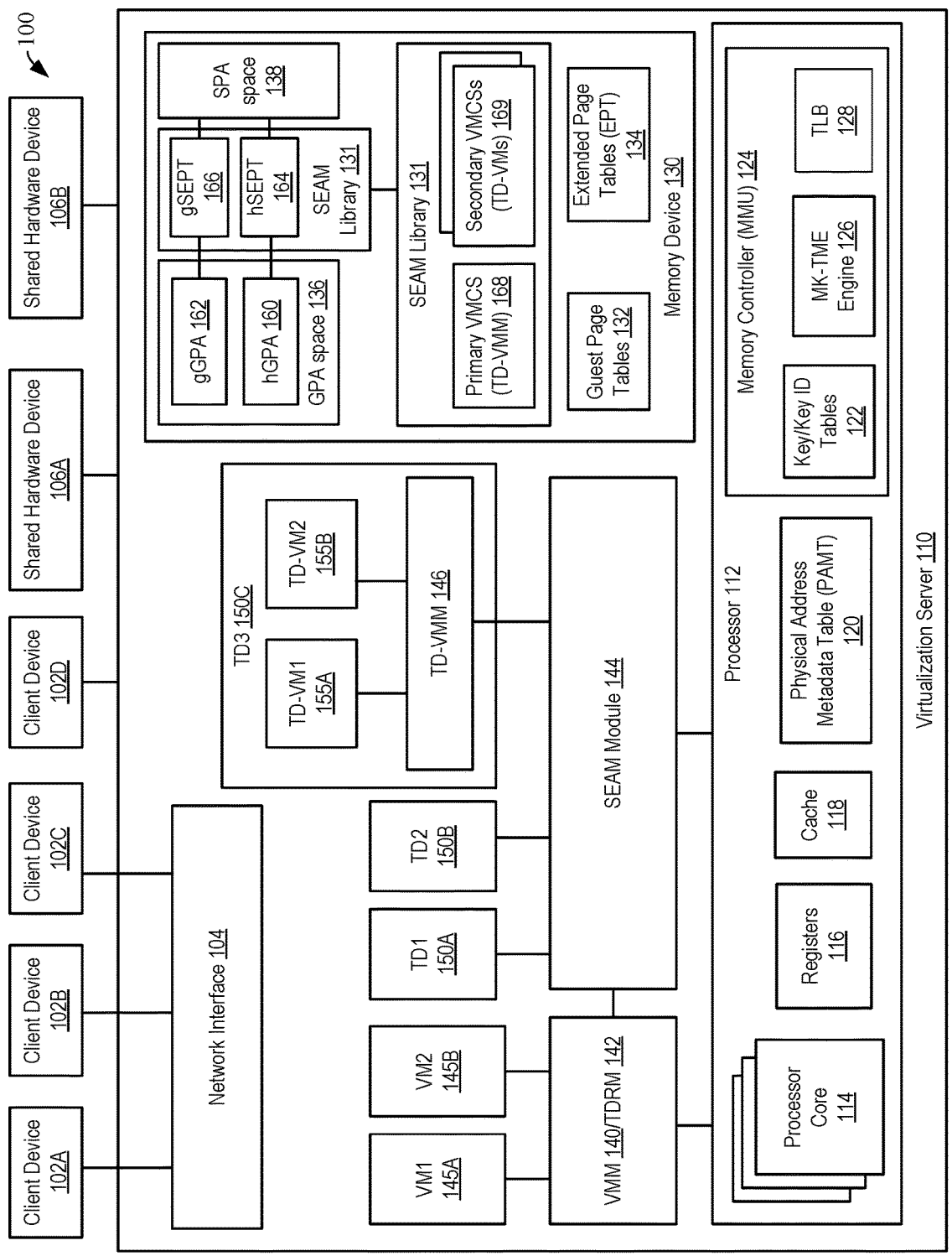
FIG. 1A is a block diagram illustrating an example computing system that implements virtual machines inside a trust domain, in the SEAM-enabled VMX architecture.

Aspects of the present disclosure are directed at enabling, as a combination of hardware and software functionalities, execution of virtual machines architecture (VMX) inside a trust domain architecture (TDX). The TDX is an extension of an instruction set architecture (ISA) that allows a secure execution inside trust domains (TDs) whose memory and logical processor execution states are not accessible to a hypervisor/virtual machine monitor (VMM) of the host server. To enable execution of VMX inside TDX, the present disclosure describes execution of a virtual machine monitor (TD-VMM) inside a trust domain to support virtual machines (TD-VMs) therein. Secure operation of both the trusted TD-VMM and the untrusted host VMM is facilitated through a secure arbitration mode (SEAM) of the processor. The SEAM may utilize a special SEAM memory range whose isolation from the host VMM may be hardware-enabled. The SEAM memory range may host secure extended page tables for management of memory assigned to a trust domain (TD).

Conventional cloud server computing and virtual computing environments provide remote computing resources and remote data storage resources for various devices. Remote computing and data storage make it especially important to protect data from accesses by unauthorized persons and malicious software. Unencrypted plaintext data residing in memory, as well as data moving between the memory and a processor, may be vulnerable to scanning attacks. Attackers can use a variety of techniques including bus scanning, memory scanning, and the like to retrieve data from memory. Such data could even include keys used for encryption. Correspondingly, even data encrypted with an encryption key is not safe if there is a possibility that the attackers or unauthorized software may come into possession of such a key.

One way to protect data in memory is with the Total Memory Encryption (TME) technology, in which memory accesses by software executing on a processor core may be encrypted with an encryption key. For example, the encryption key may be a 128-bit key generated by the processor at a boot time and used to encrypt data sent on the external memory buses. In particular, when the processor makes a write request to memory, the data may be encrypted by a memory encryption engine before being sent to memory, where it is stored in an encrypted form. Similarly, when the data is read from memory, the data is sent to the processor in an encrypted form. Once the data has reached the processor, it is decrypted with the encryption key. Because data remains in the processor in the form of plaintext, the TME technology does not require modification to the existing software and the ways the existing software interacts with the processor.

The Multi-key TME (MK-TME) technology is an extension of TME technology that provides support for multiple encryptions keys, allowing for compartmentalized memory encryption. For example, the processor architecture may allow generating multiple encryption keys upon boot to be used to encrypt different memory pages with different MK-TME keys. The multi-key extension is particularly suited to work with multi-tenant architectures, such as used by CSPs, because the number of supported keys may be implementation-dependent. The processor may utilize an MK-TME engine to cause different pages (for example, belonging to different tenants) to be encrypted using different MK-TME keys.

In the TDX architecture, there is a host operating system supporting a trust domain resource manager managing multiple TDs corresponding to different client machines (e.g. virtual machines) each with its own guest operating systems supporting a number of applications running therein. Additionally, even different applications run by the same client within the same guest operating system may be executed securely. To ensure scalability of the secure computing when multiple TDs are present, each TD may use one or more private keys that are not available to software operating outside the TD. In some instances, software executing in one secure trust domain may have access to private keys specific to that particular trust domain (managed by SEAM) and to shared keys that may be used by multiple domains (managed by the VMM). For example, a software running inside a TD may use a private key for its secure execution, such as read, write, or execute operations. On the other hand, the same software can use a shared key to access structures or devices (para-virtualized or direct assigned) that are shared with other domains, such as a printer, a keyboard, a mouse, a monitor, a network adapter, a router, and the like.

A TD may be secured even from privileged users, such as the host server's operating system OS, a hypervisor/VMM, basic input/output system (BIOS) firmware, system management mode, and the like. Correspondingly, even if malicious software takes over a privileged host domain, such as the host operating system/VMM, sensitive data stored in memory by the TD remains protected. Such data may include medical records, biometric factors, personal ID information, intellectual property, passwords, encryption keys, or other sensitive data.

Each TD may operate independently of other TDs and use logical processor(s), memory, and I/O assigned by a Trust Domain Resource Manager (TDRM) operating as part of the host OS, the hypervisor, or as a separate software program. Each TD may be cryptographically isolated in memory using at least one exclusive (private) encryption key of the MK-TME engine for encrypting the memory (holding code and/or data) associated with the TD. Even within a TD, a client may need to communicate with shared structures, e.g., shared hardware devices, such as input-output (I/O) devices, printers, network adapters, routers, and the like. In implementations, the access to such shared structures may still need to be secured with at least one restricted key for TD's own secure operations and at least one key that may be shared with the VMM and other TDs. Such a setup allows execution of highly sensitive applications within TDs so that the host VMM does not have access to the memory pages and encryption keys allocated to a TD and its trusted computing base (TCB).

A cloud service provider (CSP) may need to run multiple VMs inside a single TD. For example, a single TD may offer VM support to an organization having multiple users. There is a strong need to secure the organization's computing base from other clients of the CSP. On the other hand, it may be important to allow various users inside the same organization to access each other's information. Under such conditions, providing each user with a separate secure TD may requires additional computational resources that may be not be justified, especially if users need to share large amounts of data.

In some implementations, a virtual machine monitor (in the following description referred simply as "VMM") that is separate from the host VMM may be executed inside a TD (in the following description referred as "TD-VMM"). The TD-VMM may instantiate a plurality of virtual machines (in the following description, TD-VMs). Each or some of the TD-VMs may support guest operating systems (OS) to facilitate execution of client software. Once the VMM has exclusively associated a plurality of memory pages with the TD, the TD-VMM may own assignment of some of those memory pages to various TD-VMs, to isolate the TD-VMs and also protect the TD-VMM itself. For example, the TD-VMM may control assignment of guest physical addresses (GPAs) to different TD-VMs. Because the assignment of physical memory pages—identified by their host physical addresses (HPA)—is performed by the VMM, the security of mappings of GPAs to HPAs—in a standard setup maintained by the VMM in extended page tables (EPT)—becomes a critical issue. On one hand, the TD-VMM may have no direct access to the HPA space, to ensure the security of the host. On the other hand, the VMM may be outside the trusted computing base of the TD meaning the TD-VMM cannot rely on VMM to enforce isolation of the TD's logical processor state and management of its memory.

The problem of interfacing the secure TD-VMM with the untrusted VMM may be solved with a secure arbitration mode (SEAM) of the processor. In SEAM, the logical processor state may be protected from the VMM and the logical processor may, therefore, securely manage the TD. The SEAM of the processor may be enabled by a SEAM module that functions as a trust arbiter between the VMM and the TD-VMM. The SEAM module may include one or more software, firmware, and/or hardware modules. The SEAM module may include a SEAM library to host a code to transition the processor into SEAM and to execute secure operations on the processor. The SEAM module may manage creation, deletion, entry/exit from TDs, and the secure use of resources assigned to the TDs (such as memory or input/output (I/O) devices).

In one implementation, a processor may deploy the SEAM module in order to enter into the SEAM from which a TD may be launched or managed. In some implementations, the SEAM module may use the SEAM library to support the resource management for TDs and to be the trusted arbiter between the VMM and the TD-VMM. The processor may include a hardware register, such as a SEAM range register, to store information that identifies a reserved range of SEAM memory. In this disclosure, "SEAM module" may refer to a code to implement SEAM functionality while "SEAM library" may refer to stored (in the reserved range of memory) resources, both volatile and non-volatile, that may be used by the SEAM module to support its operations. Hereinafter, the term "SEAM module"—when used alone—shall also be understood as encompassing both the corresponding code and the resources stored in the SEAM library.

The processor may execute a get secure (GETSEC) leaf function referred to as a GETSEC[ENTERACCS] instruction to bootstrap the SEAM VMX root mode software (the SEAM module) into operation via launch of an authenticated code module (ACM) referred to herein as a SEAM loader (SEAMLDR). In implementations, the SEAMLDR is used to install the SEAM module and the SEAM library in the reserved range of the memory. Once the SEAM has been deployed, the SEAM module may invoke the SEAM library to execute certain privileged instructions for use in managing TD virtual machines. Once the SEAM is enabled, a SEAMCALL instruction executed by the VMM (or TDRM) may transfer control over the processor to the SEAM module. In other words, the control over the processor in the VMX root mode may be passed to the SEAM. In SEAM, the SEAM module can manage creation of TD-VMs and memory operations for memory assigned to the TD.

FIG. 1A is a block diagram illustrating an example computing system 100 that implements virtual machines (VMs) inside a trust domain (TD), in the SEAM-enabled TD-VMX architecture. The system 100 includes a processor 112 that supports the secure arbitration mode (SEAM) and the trust domain extensions (TDX) architecture. The computing system 100 may provide the software and hardware to support the SEAM of the processor. The SEAM may provide functionality to facilitate TDX operations on a virtualization server 110 supporting multiple client devices 102A, 102B, 102C, and 102D. Each client device may be a remote desktop computer, a tablet, a smartphone, another server, a thin/lean client, and the like. The computing system 100 may further include a network interface 104 and shared hardware devices 160A and 160B. The virtualization server 110 may include, but not be limited to, the processor 112 and a memory device 130, referring henceforth simply as memory. The memory device 130 may include dynamic random access memory (DRAM), synchronous DRAM (SDRAM), a static memory, such as static random access memory (SRAM), a flash memory, a data storage device, a persistent memory device, or any other types of memory devices.

The processor 112 may execute a virtual machine monitor (VMM) 140, which may be extended with a TD resource manager (TDRM) 142. The VMM 140 may control one or more legacy virtual machines, such as VM1 145A and VM2 145B. The legacy VMs may be executed outside the TDX (e.g., without a support from the SEAM), as schematically shown in FIG. 1.

Additionally, the TDRM 142 may support one or more TDs, such as TD1 150A and TD2 150B. The TDRM 142 (in some implementations, in combination with the VMM 140) may act as a host for TDs 150A-B and control access of TDs to the processor 112 and other system hardware. The TDRM may possess the capability to enter and exit the TDX mode. The TDRM 142 may assign software in a TD (e.g. TD1 150A) with logical processor(s), but may not access a TD's execution state on the assigned logical processor(s). Similarly, the TDRM 142 may assign physical memory and I/O resources to a TD but not be privy to access/spoof the memory state of a TD due to separate encryption keys, and other integrity/replay controls on memory.

The TDs 150A-B may be trust domains without nested virtualization, namely each TD 150 may support one client device 102. The virtualization server 110 may support a different type of a TD, such as TD3 150C, that is capable of supporting multiple virtual machines, e.g., TD-VM1 155A and TD-VM2 155B. The TD3 150C may include the trusted hypervisor TD-VMM 146 for management of TD-VMs. The SEAM module to support SEAM of the processor 112 may interface the TD1 150A, TD2 150B, and TD3 150C with the TDRM 142 for secure management of resources provided to the TDs 150. The SEAM module 144 may interface between the TDRM 142 and the virtual machines TD-VMs 155 executed inside the TD3 150C. The SEAM module 144 may implement a secure arbitration mode (SEAM) of the processor. The SEAM module be implemented as a software or firmware code stored in a SEAM Library 131. The SEAM Library 131 may reside in the memory 130, in the range reserved for the SEAM in one or more registers 116 of the processor 112, which may include a dedicated SEAM range register (not shown explicitly in FIG. 1A), in some implementations. In some implementations, the SEAM may be implemented as a microcode of hardware instructions residing in the memory 130 (e.g., in the SEAM Library 131) or in a (high-speed) cache 118 of the processor 112. The range of memory reserved for the use in the SEAM and by the SEAM Library 131 may be indicated in the SEAM register with a base address and a mask, or with a start address and an end address of the reserved range.

In various implementations, the processor 112 includes one or more processor cores 114 and a micro-architectural physical address metadata table (PAMT) 120. The PAMT may be used by the processor 112 to store attributes of physical memory pages, such as allocations of physical memory pages to the TD1, TD2, and TD3. In some implementations, the PAMT 120 may hold the following attributes for each 4 KB page of host physical memory identified by its host physical address (HPA): a guest physical address (GPA) expected to map to the HPA, a page status (indicating whether the page is a valid memory page), a page state (indicating whether the page is assigned, or is pending, is in the process of being assigned/freed/reassigned to another TD, and so on), a TD identifier (indicating to what specific TD the page is assigned), and a key identifier (ID) of the encryption key used to encrypt/decrypt the host physical memory page. The PAMT 120 may further hold information about the owner of the memory page (e.g., the SEAM, the VMM, one of the TDs, and so on). Other data that may be stored in the PAMT 120 includes information about whether the page assignment is pending (i.e., the page is being reassigned to a different owner) or whether the page is blocked (i.e., reserved for some specific present or future use). The PAMT 120 may be enabled when the TDX is enabled in the processor 112 (e.g., via CR4 enable bit, after CPUID-based enumeration). The PAMT 120 may also store an epoch associated with the physical memory page (such as an epoch when the page was last modified, assigned to the current owner, and the like). Once the PAMT 120 is enabled, the PAMT 120 may be used by the processor 112 to enforce memory access control for physical memory accesses initiated by software, including the TDRM 142 and the SEAM module 144.

The processor 112 may further include a memory controller or memory management unit (MMU) 124. The MMU may include an MK-TME engine 126 (or other memory encryption engine) and a translation lookaside buffer (TLB) 128 to store recent memory transactions. A TLB entry may include a guest virtual address (GVA) translation to a HPA of a host physical memory page. A TLB entry may also include a SEAM bit and/or a TD bit to distinguish SEAM-buffered and TD-buffered translations pages from other, less secured, translations.

In implementations, the MK-TME engine 126 encrypts data stored in the memory 130 and decrypt data retrieved from the memory 130 using appropriate encryption keys, e.g., a unique key assigned to the VMM, the SEAM, or one of the TDs that is storing data in the memory device 130. The MK-TME engine 126 may maintain a set of internal tables 122 used to hold key IDs and the associations of encryption keys to the key IDs. The key/key ID tables 122 may further store ownership of key IDs by various components of the system 100. For example, an encryption key specified by key ID 0 may identify a global total memory encryption (TME) key assigned for use by the VMM 140/TDRM 142. As a way of example, key ID 1 may be assigned to the VM1 145A, key ID 2 may be assigned to the TD1 150A, whereas key ID 3 may be assigned to the TD3 150C. The VMM 140/TDRM 142 may have access to the encryption key (and memory transactions performed with this key) with key ID 1, but may be denied access to the encryption keys associated with key ID 2 and key ID 3. A separate key (e.g., associated with key ID 4) may be assigned to SEAM (e.g., to be used by the SEAM module 144 to encrypt/decrypt memory pages assigned to the SEAM Library 131). This key may be access-controlled by processor 112 to ensure that the key cannot be used by the VMM 140/TDRM 142 (or any other untrusted modes of the processor) or by the trust domains, including the TD3 150C. In some implementations, the SEAM and the TD3 150C may share the same encryption key. The attributes of the key/key ID tables 122 may be programmed using a processor configure (PCONFIG) instruction.

In implementations, the MK-TME engine 126 may further provide integrity and reply protection. In one implementation, key IDs of the encryption keys used to encrypt physical pages of the memory 130 may be added (e.g., appended as most significant bits) to the physical memory address (such as HPA) of the physical page of the memory. With the key IDs appended to the physical memory addresses, a memory transaction requested by software may fail unless the memory transaction request (e.g., of a read or write to memory) includes both the physical memory address of the page and the correct key ID for the encryption key used to encrypt/decrypt the physical page of the memory.

Figure 1B:
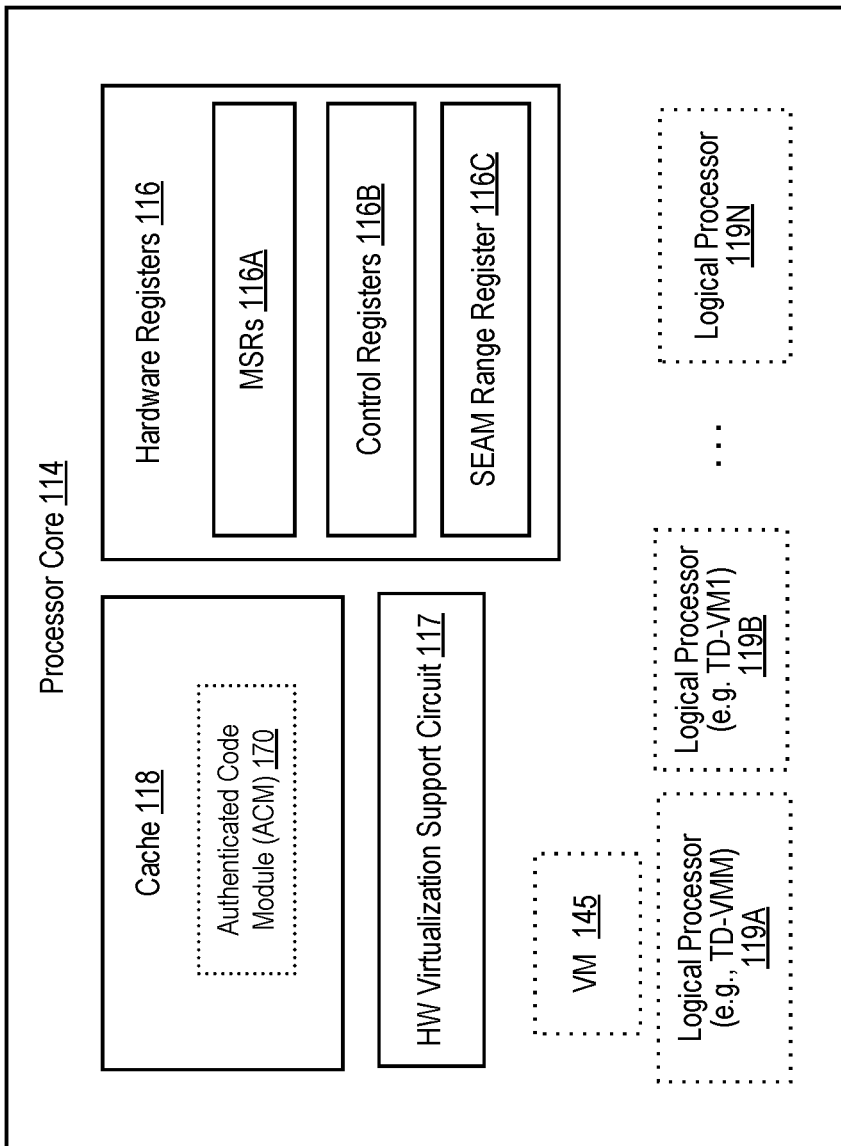
FIG. 1B is block diagram illustrating an example processor core of a processor of the computing system of FIG. 1A, according to one implementation.

FIG. 1B is block diagram illustrating an example processor core 114 of the processor 112 of the computing system 100 of FIG. 1A, according to one implementation. In the implementation illustrated in FIG. 1B, each processor core 114 includes cache 118 (e.g., one or more levels of cache), a hardware virtualization support circuit 117, and hardware registers 116. The hardware registers 116 may include, for example, a number of model-specific registers (MSRs) 116A, control registers 116B (e.g., CR0, CR4, and the like), and a SEAM range register 116C.

In various implementations, the cache 118 is loaded with an authenticated code module (ACM) 170 via execution of a GETSEC[INTERACCS] instruction. This ACM 170 may be the SEAMLDR, which may bootstrap the load of the SEAM module 144, and associated data, into the reserved range of the memory 130. In other implementations, the ACM 170, may have the SEAMLDR functionality and be implemented as a security logic of the processor core 114, such as logic embedded into hardware, is microcode or logic invoked by the SEAM module 144, or a security microcontroller embedded in the processor 112. Further, or alternatively, the SEAM module 144 may invoke authenticated firmware in the security microcontroller to launch the ACM 170.

In implementations, the processor core 114 executes instructions to run a number of hardware threads, also known as logical processors, including the first logical processor 119A, a second logical processor 119B, and so forth, until an Nth logical processor 119N. In one implementation, the first logical processor 119A is assigned to the TD-VMM 146. A second logical processor 119B may be assigned to one of the TD-VMs 155 executed and controlled by the TD-VMM 146.

In some implementations, the TDRM 142 may schedule a TD for execution on a logical processor of one of the processor cores 114. In addition to the TDX-based implementation of client virtual machines, the virtualization server 110 may execute one or more legacy VMs 145 outside TDs for one or more client devices 102A-D. Whereas software outside a trust computing base of a TD—such as the TDRM 142/VMM 140—may not have access to physical memory pages allocated to TDs and/or execution state of TDs, the VMs 145 operating outside TDs may not be secure against accesses by the VMM 140.

In some implementations, the MK-TME engine 126 prevents unauthorized accesses by encrypting data moving between the processor 112 and the memory 130 with one or more shared encryption keys using the MK-TME engine 126. The term "shared" is meant to refer to a key accessible to the VMM 140/TDRM 142, and is different from private key IDs associated with keys configured by the SEAM module 137 for assignment to TDs. In implementations, the MMU 124 may enforce restrictions on use of private key IDs by the VMM 140/TDRM 142 or VMs 145 in the processor core 114. For example, the MMU 124 may enforce that the key IDs that are private can be associated with read and write requests sent to the MK-TME engine 126 only when the logical processor executes in the SEAM (root or non-root mode). If such restricted key IDs are used outside of the SEAM, then they cause a fault and the read or write transaction is aborted.

Additionally, in at least some implementations, one or more of the non-restricted keys are shared. Shared keys may be accessible by two or more entities, such as TDs 150 and VMs 145 running outside the TDX environment. Shared keys may be used to access one or more shared structures, such as shared hardware devices 160A and 160B, which may be a printer, a keyboard, a mouse, a monitor, a network adapter, a router, and the like. In one implementation, a shared hardware device may be connected to the virtualization server 110 via the network interface 104. In another implementation, a shared hardware device may be local to the virtualization server 110. In implementations, the MK-TME engine 126 encrypts data stored in memory using a shared key associated with a shared key ID. The shared key ID may be used by system software including software operating in the SEAM as well as by devices that use direct memory access (DMA) to memory. Thus a TD may use a shared key ID to communicate with the VMM 140, VMs 145, or other devices. In some cases, a TD may wish to protect the confidentiality of the data transmitted to devices, for example, the data stored on a hard drive. Since the data stored to shared memory may be accessible to all software, the TD software may first encrypt such data using a specific device key, such as a disk encryption key, before storing the data into memory using the shared key ID. In this way, when the VMM 140 reads this data, it is decrypted with the shared key; however, what is decrypted is the content encrypted by the disk encryption key, so that the VMM 140 cannot access the actual data. A TD may also associate integrity check values with such encrypted data, so that a subsequent attempt to tamper with that data can be detected.

The hardware virtualization support circuit 117 may support virtualized execution of operating systems, applications, and other software by the computing system 100. The hardware virtualization support circuit 117 may include virtual machine extensions (VMX) support by providing two modes of execution: VMX-root mode and VMX non-root mode. The VMX-root mode allows executing software to have broad control of the computing system 100 and its hardware resources. Accordingly, the VMM 140/TDRM 142 or host operating system (OS) may execute in VMX-root mode.

With further reference to FIG. 1A, the memory 130 may store, among other data and information, guest page tables (GPT) 132 for GVA→GPA translations of guest virtual addresses (GVA) used by software operating inside a TD-VM to guest physical addresses (GPA) assigned by the TD-VMM 146 to the TD-VM. The memory 130 may further store extended page tables (EPT) for GPA→HPA memory space translations. The GPT 132 may include separate GPTs used by legacy VMs 145, TDs 150A-B, and TD-VMs 155 operating inside the TD3 150C. In some implementations, the GPTs used by TDs 150 may be encrypted with the encryption key for the corresponding TD.

Additionally, there may be one or more secure EPT (SEPT) to store mappings of memory assigned to the TD3 150C. Adding or updating mappings in the secure EPT may be performed by the processor 112 during its SEAM operation. The SEPT may be used to store mappings of the secure host physical address (SPA) space 138 (of the physical host memory pages assigned to the TD3 150C by the TDRM 142/VMM 140) to the GPA space 136 visible to the TD-VMM 146. The GPA space may be further subdivided into a host-GPA (hGPA) space 160 and a guest-GPA (gGPA) space 162. The hGPA space 160 may include addresses of those memory pages that are assigned by the TD-VMM 146 for its own use. The TD-VMM 146 may use such pages, for running a management code to manage the TD-VMs 155 or for assignment to various TD-VMs 155, as a need may arise, e.g., for software execution inside TD-VMs 155. The gGPA space 162 may include addresses of memory pages that are assigned by the TD-VMM 146 to different TD-VMs 155. During operation of the TD-VMs 155 and the TD-VMM 146, some addresses may be changed (by the TD-VMM) from the hGPA space 160 to the gGPA space 162, or vice versa, as may be necessary.

In some implementations, mapping of the GPA space 136 onto the SPA (secure HPA) space 138 may be achieved via separate SEPTs for hGPA space 160 and gGPA space 162 mappings. For example, a host-SEPT (hSEPT) 164 may store hGPA→SPA mappings whereas a guest-SEPT (gSEPT) 166 may store gGPA→SPA mappings. In some implementations, some or all TD-VMs 155 may share the same gSEPT 166. In other implementations, each TD-VM 155 may use its own gSEPT 166 and the TD-VMM 146 may forbid other TD-VMs access this gSEPT. Accordingly, the TD-VMM 146 may effectively provide isolation between different TD-VMs. In some implementations, a hierarchy of accesses may be established. For example, the TD-VM1 155A may have access to the gSEPT 166 (and to the gGPA space 162) of the TD-VM2 155B but the TD-VM2 155B may be prohibited from accessing the gSEPT 166 (and the gGPA space 162) of the TD-VM1 155A.

In some implementations, the SPA space 138 assigned to the TD3 150C may correspond to a region of the host memory that is wholly outside the SEAM range of memory. In some implementations, the SPA space 138 may refer to a region that is wholly inside the SEAM range of memory. In yet other implementations, some of the SPA space 138 may be inside the SEAM range of memory while some of that space may be outside the SEAM range of memory. In some implementations, the hGPA space 160 may be inside the SEAM range of memory whereas the gGPA space 162 may be outside it. In some implementations, the TD3 150 may also access the EPT 134 for memory transactions that involve shared (with other TDs and/or VMM) access to some physical memory pages.

Figure 2A:
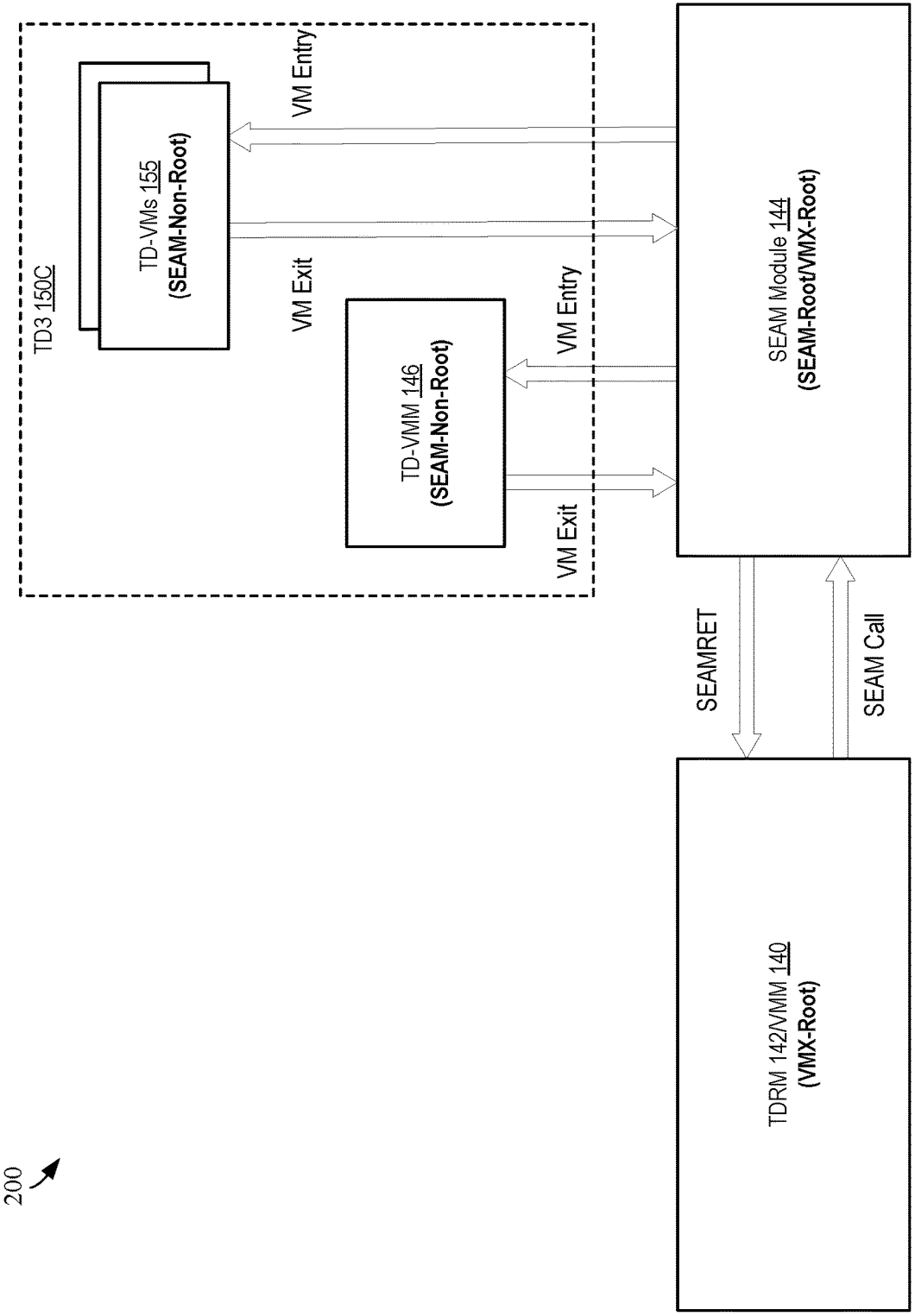
FIG. 2A illustrates an example implementation of the processor modes that provide support for virtual machine execution inside a trust domain managed via a secure arbitration mode.

The virtual machine environment inside the TD3 150C may be initialized and supported via a creation of one or more primary virtual machine control data structures (VMCS) 168 and as many secondary VMCSs 169 as there are TD-VMs 155 instantiated. The number of primary VMCSs 168 created may be based on (e.g., equal to) the number of virtual (logical) processors given to the TD-VMM 146 by the TDRM 142, in one implementations. The number of secondary VMCSs 169 to be instantiated may be determined by the TD-VMM 14, e.g., based on the number of virtual processors and/or a number of guests to be supported. A logical processor may use these VMCSs when the processor is under control of the TD-VMM 146 or one of the TD-VMs 155. The VMCSs structures also manage transitions of the logical processor into (VM Entries) and out of (VM exits) TD-VMM or TD-VM operations. The VMM 140 (and/or TDRM 142) may first create the primary VMCS 168 to maintain an execution state of the TD-VMM 146. For example, the logical processor may retrieve a previously stored execution state of the TD-VMM 146 when the logical processor executes a VM Entry instruction. A VM Entry occurs from a SEAM-root mode, as schematically shown in FIG. 2A, which illustrates one example implementation 200 of the processor modes that provide support for virtual machine execution inside a trust domain managed via a secure arbitration mode.

To instantiate the primary VMCS 168, the SEAM module 144 may select a page boundary-aligned region of physical memory and provide its HPA as a parameter to an instruction creating the primary VMCS 168, e.g., TDCREATE. This region of memory is used to store the VMCS 168 for the TD-VMM 146. 190A. When executed, the TDCREATE instruction causes the processor 112 to verify that the destination 4 KB (or some other unit of memory) page is assigned to the TD (using the PAMT 120). The TDCREATE instruction may further cause the processor 112 to generate an ephemeral memory encryption key and key ID for the TD3 150C, and store the key ID in the primary VMCS 168. The processor 112 may then initialize the page content on the destination page using the encryption key assigned to the TD3 150C. The primary VMCS 168 is to store the state of the logical processor prior to execution of a VM Exit instruction, until the next VM Entry instruction. The primary VMCS 168 may also include information and control fields that manage VM Entry/Exit operations. The primary VMCS 168 may further include a pointer to a secure EPT used by the TD-VMM 146 for memory translations, which can be the hSEPT 164.

In one implementation, the primary VMCS 168 occupies a 4 KB naturally aligned region of memory. A page identified as a primary VMCS 168 in the PAMT 120 is blocked against software reads/writes after the TDCREATE instruction is successfully executed. In one implementation, the VMCS 168 is access-controlled via the PAMT 120 (e.g., an assigned key ID for the VMCS 168 stored in the PAMT 120 is used during page walks of the processor 112 to prevent unauthorized software read/write). In another implementation, the VMCS 168 is access-controlled via its storage in a restricted range register(s) of the processor 112 that is inaccessible to software accesses. The restricted range register may be the SEAM range register.

After the primary VMCS 168 has been created, the TD-VMM 146 may be instantiated inside the TD3 150C. The TD-VMM 146 may initialize secondary VMCSs 169 to instantiate guest virtual machines, such as the TD-VMs 155, inside the TD3 150C. A plurality of the secondary VMCSs 169 may be created in a manner similar to the creation of the primary VMCS 168 described above. In one implementation, the secondary VMCSs 169 are access-controlled via the PAMT 120 and protected with an encryption key having a different key ID than the primary VMCS 168. In some implementations, each secondary VMCS has its own separate key ID. The secondary VMCSs 169 may also include pointers to one or more secure EPTs used by the TD-VMM 146 for memory translations, which may be the gSEPT 166. After the secondary VMCSs 169 have been created, the TD-VMM 146 may provide the instantiated TD-VMs 155 to guests (tenants) for execution of guest software therein.

With continued reference to FIG. 2A, in some implementations, once the primary VMCS 168 and the secondary VMCS 169 are created and the TD-VMs 155 are instantiated, the processor 112 may operate in three different modes. (1) In the VMX-root (non-SEAM) mode the TDRM 142/ VMM 140 has a complete control of the host resources with the exception of the range of memory reserved for SEAM and for TDs. (2) In the SEAM-root mode (which also operates as a VMX-root), which the processor may enter upon the execution of the SEAMCALL (SEAM Entry) instruction, the SEAM module may initialize a TD by creating a primary VMCS 168. In the SEAM-root, the processor, upon an instruction from the TD-VMM, may also create one or more secondary VMCSs 169 for one or more TD-VMs 155 to operate inside the TD3 150C. Also, in the SEAM-root, the processor may manage secure GPA→SPA mappings assigned to the TD. From the SEAM-root, the processor may exit back into the VMX-root mode upon the execution of the SEAMRET instruction or transition into a SEAM-non-root operation via an execution of a VM Entry instruction. In the SEAM-non-root operation, either the TD-VMM (i.e., the secure hypervisor) or one of the TD-VMs may take control of the processor, but may not have control over all host resources. When the processor is under control of one of the TD-VMs, it may maintain guest page tables containing mappings of GVAs to GPAs assigned to the TD-VM. The processor may also execute software (e.g., guest OS and a software stack) inside the TD-VM. The processor may transition back into the SEAM-root operation upon a VM Exit instruction. For example, while under control of a first TD-VM, the processor may receive a program call from the TD-VM and determine that execution of the program call requires support from the TD-VMM. To handle this program call, the processor may perform a VM exit to enter the SEAM followed by a VM entry back from the SEAM, but this time to transfer control of the processor to the TD-VMM. Subsequently, the TD-VMM may issue commands to the processor to execute the program call. After the program call execution, the control over the processor may be returned (via VM exit/VM entry) from the TD-VMM to the TD-VM.

The primary and secondary VMCSs may be controlled with VMCS-maintenance instructions invoked by the TD-VMM 146. The VMCS-maintenance instructions may be legacy instructions standard for the traditional VMX-architecture. The following description summarizes an example set of VMCS-maintenance instructions (also known as VMX instructions), in one exemplary implementation. A different set of instructions that provides similar functionality and control of the state of the processor (e.g., logical processor) in VMX-root and VMX-non-root modes may be used in other implementations.

The VMXON instruction. In the VMX architecture, the VMXON instruction causes the logical processor to enter the VMX-root mode. The VMXON instruction has a single operand which is an address of a memory page (e.g., a GPA) used to support the VMX operation. In the SEAM-enabled TD-VMX architecture, the VMXON instruction may be invoked by the TD-VMM 146 to put the processor into the TD-VMX-root mode. The operand of the VMXON instruction may be an hGPA of a memory page used to support the TD-VMX operation. When the TD-VMM 146 invokes the VMXON operation, the processor exits the TD-VMM via VM-Exit and enters the SEAM operation and the SEAM module 144 emulates the state change to record that the TD virtual processor is now in the TD-VMX architecture mode.

The VMPTRLD instruction. In the VMX architecture, the VMPTRLD instruction makes the VMCS referenced in the operand active and current. The operand also contains a pointer to an address of a memory page (e.g., an hGPA) where the referenced VMCS is stored. A logical processor may have only one current VMCS but multiple active VMCSs. A sequence of multiple VMPTRLD instructions referencing different VMCSs makes all of them active but only the last one subject to the VMPTRLD instruction remains current. In the SEAM-enabled TD-VMX architecture, the VMPTRLD instruction may be invoked by the TD-VMM 146 to first make active the primary VMCS 168 for the TD-VMM 146. The operand of the VMPTRLD instruction contains a pointer to an hGPA of a memory page where the primary VMCS 168 is stored. When the TD-VMM 146 invokes the VMPTRLD operation, the processor exits the TD and enters the SEAM operation (e.g., via the VM Exit shown in FIG. 2A). The SEAM module 144 may then verify that the referenced hGPA corresponds to a valid memory page assigned to the TD (e.g. the TD3 150C). The logical processor may do this verification, e.g., by performing a walk in the hSEPT 164 to determine the corresponding HPA of the memory page and looking up the attributes of this memory page in the PAMT 120. If the memory page is not assigned to the TD, the processor may exit SEAM (via SEAMRET, as shown in FIG. 2A) so that the TDRM 142 (or VMM 140) may assign a memory page to the TD (to be used as a VMCS page type in the PAMT) before returning control of the processor to the SEAM (via SEAMCALL (SEAM Entry), as shown in FIG. 2A). If the memory page is assigned to the TD (or once it is so assigned by the TDRM), the SEAM module 144 makes the primary VMCS 168 active (and current).

The TD-VMM 146 may similarly invoke additional VMPTRLD instructions to activate secondary VMCSs 169 for a plurality of TD-VMs 155. The operands of such additional VMPTRLD instructions may include pointers to the hGPAs of the memory pages storing the secondary VMCSs 169. Following a VM Exit to the SEAM, the SEAM module 144 (and TDRM 142, if needed) may make the primary VMCS 168 active as described above in relation to the primary VMCS 168. Additionally, the SEAM module 144 may add to the primary VMCS 168 the pointers to the hGPAs where the secondary VMCSs 169 are stored. SEAM enforces the same criteria on the controls set in the secondary VMCSs as it does for the primary VMCSs.

The VMCLEAR instruction. In the VMX architecture, the VMCLEAR instruction causes the logical processor to render the VMCS referenced in the operand of the instruction inactive (and not current). In the SEAM-enabled TD-VMX architecture, the VMCLEAR instruction may be similarly invoked by the TD-VMM 146 to render one of the secondary VMCSs 169 (or the primary VMCS 168) inactive. The VMCLEAR instruction makes the processor execute a VM Exit into the SEAM. The SEAM module 144 may then verify that the hGPA operand referenced in the instruction corresponds to a valid memory page assigned to the TD (e.g., via a walk in the hSEPT 164) and render the referenced VMCS inactive (and not current). The VMCLEAR instruction may be used to allow other logical processors (than the one that executed the VMPRTLD instruction) to load and execute the same virtual machine (e.g., a TD-VM 155).

The VMLAUNCH instruction. In the VMX architecture, the VMLAUNCH instruction causes the logical processor to enter the VMX-non-root mode. The VMLAUNCH instruction transfers control over the logical processor from the VMM to the VM whose VMCS is referenced in the operand of the instruction. The VMLAUNCH instruction acts on VMCSs that are current and has no effect if the referenced VMCS is inactive or active but not current. In the SEAM-enabled TD-VMX architecture, the VMLAUNCH instruction may similarly be invoked by the TD-VMM 146 to launch the referenced active secondary VMCS 169 and to transfer the control of the logical processor from the TD-VMM 146 to the corresponding TD-VM 155 whose state is controlled by the referenced VMCS 169. The VMLAUNCH instruction causes the logical processor to execute a VM Exit into the SEAM. The SEAM module 144 may then verify that the VMCS referenced (via hGPA) in the operand of the instruction is a valid VMCS PAMT page assigned to the TD-VMM and an active current VMCS for the TD-VMM. The SEAM module 144 may launch this VMCS by executing VMLAUNCH instruction and thus executing the VM Entry into the SEAM-non-root and transferring control to the TD-VM 155 that corresponds to the secondary VMCS referenced in the operand of the VMLAUNCH instruction issued by the TD-VMM.

The VMRESUME instruction. In the VMX architecture, the VMRESUME instruction may be used for a VM Entry (corresponding to the VMCS referenced in the operand of the instruction) following a successful execution of the VMLAUNCH instruction and prior to the next execution of the VMCLEAR instruction. In the SEAM-enabled TD-VMX architecture, the VMRESUME instruction may similarly be invoked by the TD-VMM 146 to resume execution of the previously launched, current and active TD-VM 155. The VMLAUNCH instruction causes the logical processor to execute a VM Exit into the SEAM. The SEAM module 144 may then verify that the VMCS referenced in the operand of the instruction is an active current and previously launched VMCS. The SEAM module 144 may resume execution of this VMCS using a VM Entry into the SEAM-non-root mode (as shown in FIG. 2A) and transfer control to the TD-VM 155 that corresponds to the secondary VMCS referenced in the operand of the VMRESUME instruction. The VMRESUME instruction may only cause the same logical processor to resume execution of the TD-VM 155. Migration of execution of an already launched TD-VM 155 to a new logical processor requires an execution of the VMCLEAR instruction on the old logical processor and a subsequent execution of the VMPRTLD instruction on the new logical processor.

The VMPTRST instruction. In the VMX architecture, the VMPTRST instruction may have an operand that includes a VMCS and a memory page. The VMPTRST instruction may be used to store the current state of the VMCS in the referenced memory page. In the SEAM-enabled TD-VMX architecture, the VMRESUME instruction may similarly be invoked by the TD-VMM 146 to store the state of an active and current VMCS. The VMPTRST instruction may have an operand that references a primary VMCS 168, or a secondary VMCS 169, and an hGPA of a memory page to store the current state of the referenced VMCS. The VMPTRST instruction causes the logical processor to execute a VM Exit into the SEAM. The SEAM module 144 may then verify that the VMCS referenced in the operand of the instruction is an active current VMCS. The SEAM module 144 may also verify that the referenced hGPA corresponds to a valid memory page assigned to the TD (e.g. the TD3 150C). The logical processor may do this verification, e.g., by performing a walk in the hSEPT 164 to determine the corresponding HPA of the memory page and looking up the attributes of this memory page in the PAMT 120. If the memory page is not assigned to the TD, the processor may exit SEAM (via SEAM Exit, as shown in FIG. 2A) so that the TDRM 142 (or VMM 140) may assign the memory page to the TD before returning control of the processor to the SEAM via SEAMCALL (SEAM Entry), as shown in FIG. 2A. If the memory page is assigned to the TD (or once it is so assigned by the TDRM), the SEAM module may store the referenced VMCS into the memory page identified by the hGPA. Alternatively, the SEAM module may transfer control of the logical processor to the TD-VMM 146 (via a VM Entry shown in FIG. 2A) and the TD-VMM 146 may store the referenced VMCS into the memory page with the hGPA.

The VMPTRST instruction may be used when an error in VM execution occurs. After the VMPTRST instruction stores the state of a current VMCS, the subsequent instructions VMCLEAR, VMPRTLD, and VMLAUNCH may, correspondingly clear, load, and re-launch the current TD-VM.

The VMREAD and VMWRITE instructions. In the VMX architecture, the VMREAD instruction causes the logical processor to read a VMCS component referenced in a register operand of the instruction and store it in a destination operand of the instruction. The VMWRITE instruction causes the logical processor to write a VMCS component from a referenced source operand of the instruction into a register operand of the instruction. Like VMLAUNCH instruction, the VMREAD and VMWRITE instructions act on a VMCS that is current and have no effect if the referenced VMCS is inactive or active but not current. In the VMX architecture, the VMREAD and VMWRITE instructions may not always trigger a VM Exit. In the SEAM-enabled TD-VMX architecture, the VMREAD and VMWRITE instructions may similarly be invoked by the TD-VMM 146 to read from and write to a register operand, respectively. In some implementations, the SEAM module 144 may optionally allow and provide support for VMCS shadowing to allow the TD-VMM 146 to read from or write to its VMCS structures, such as the primary VMCS 168 and/or secondary VMCSs 169. If the VMCS shadowing is not enabled, these instructions may cause the logical processor to execute a VM Exit into the SEAM. In other implementations of the SEAM-enabled TD-VMX architecture, where VMCS shadowing is not enabled, the VMREAD and VMWRITE instructions may be supported by the SEAM verifying that the hGPA for the referenced VMCS is valid and emulating the VMREAD and VMWRITE instructions using the HPA that the hGPA is mapped to in the hSEPT. The SEAM enforces the same criteria on the controls set in the secondary VMCSs as it does for the primary VMCSs.

The INVEPT and INVVPID instructions. In the VMX architecture, the INVEPT instruction invalidates an EPT mapping (GPA→HPA) cached in the translation lookaside buffer (TLB) 128 and referenced in the GPA operand of the instruction. The INVEPT instruction causes a VM Exit of the logical processor into the VMX-root mode. The VMM takes control of the processor and invalidates the EPT entry. The INVVPID instruction similarly invalidates TLB-cached EPT entries based on the virtual (logical) processor ID. In the SEAM-enabled TD-VMX architecture, the INVEPT instruction may similarly be invoked by the TD-VMM 146 to invalidate the EPT mapping (hGPA→HPA or gGPA→HPA) cached in the translation lookaside buffer (TLB) 128 and referenced in the operand (hGPA or gGPA) of the INVEPT instruction. The INVEPT instruction may be invoked by the TD-VMM 146 when the TD-VMM makes changes to the gSEPT 166. This invocation may be achieved via a set of TDCALLs, as described in more detail below. The INVEPT instruction causes the logical processor to execute a VM Exit into the SEAM. The SEAM module 144 may perform a walk in a secured EPT (hSEPT 164 or gSEPT 166) to verify that the GPA referenced in the operand of the instruction maps onto an HPA of a valid memory page assigned to the TD (e.g. the TD3 150C). Responsive to a successful verification, the logical processor operating in SEAM may invalidate the referenced GPA. The INVVPID instruction may similarly invalidate TLB-cached hSEPT or gSEPT entries based on the virtual (logical) processor ID.

The VMCALL instruction. The VMCALL instruction may be invoked by a VM when the logical processor in the VMX-non-root mode. The VM may use the VMCALL to call the VMM for service. A VM Exit occurs into the VMX-root mode transferring control to the VMM with the VMM receiving a notification of the reason for the VMCALL. In the SEAM-enabled TD-VMX architecture, the VMCALL instruction may similarly be invoked by a TD-VM 155. The TD-VM 155 may use the VMCALL to call the SEAM module 144 for service. A VM Exit may occurs into the SEAM. The SEAM module 144 may then recognize that the VMCALL is originating from the TD-VM 155 (based on the secondary VMCS that is active) and may redirect the TD-VM request for service to the TD-VMM 146 by activating the primary VMCS on that logical processor. For example, the SEAM module 144 may update the primary VMCS 168 of the TD-VMM 146 to reflect the nature of the VMCALL and execute VM Entry by launching the TD-VMM 146 for the subsequent handling of the VMCALL issued by the TD-VM 155. On a subsequent VMRESUME by the TD-VMM, the original requesting TD-VM 155 would be context-switched by the SEAM module.

The VMFUNC instruction. The VMFUNC instruction may be used by a software executed in the VMX-non-root mode (such as the guest OS) to invoke a VM function, which is a processor functionality enabled and configured by the VMM. No VM exit occurs following the VMFUNC instruction, unless an error occurs. In the SEAM-enabled TD-VMX architecture, the VMFUNC instruction may similarly be allowed and configured by the TD-VMM 146. If the VMFUNC is so configured with respect to a particular processor functionality, the TD-VM 155 may be able to use the VMFUNC instruction to invoke the processor service corresponding to the VMFUNC leaf enabled by the TD-VMM 146. If the VMFUNC instruction is not configured by the TD-VMM 146, the SEAM module 144 may receive a VM exit on VMFUNC execution by the TD-VM 155 and instead redirect the VMFUNC instruction to the TD-VMM 146 for processing, including a determination whether the VMFUNC instruction is legitimate (and not invoked by the TD-VM 155 maliciously or by mistake). The TD-VMM 146 may use the VMFUNC CONTROLS MSR to configure VMFUNC for its guest TD-VM 155 with respect to some processor functionality but not configure VMFUNC with respect to some other processor functionality. For example, for VMFUNC leaf 0, the alternate-EPTP list would be configured with gSEPT entries to allow TD-VMs to use EPT switching without VM exits.

Figure 2B:
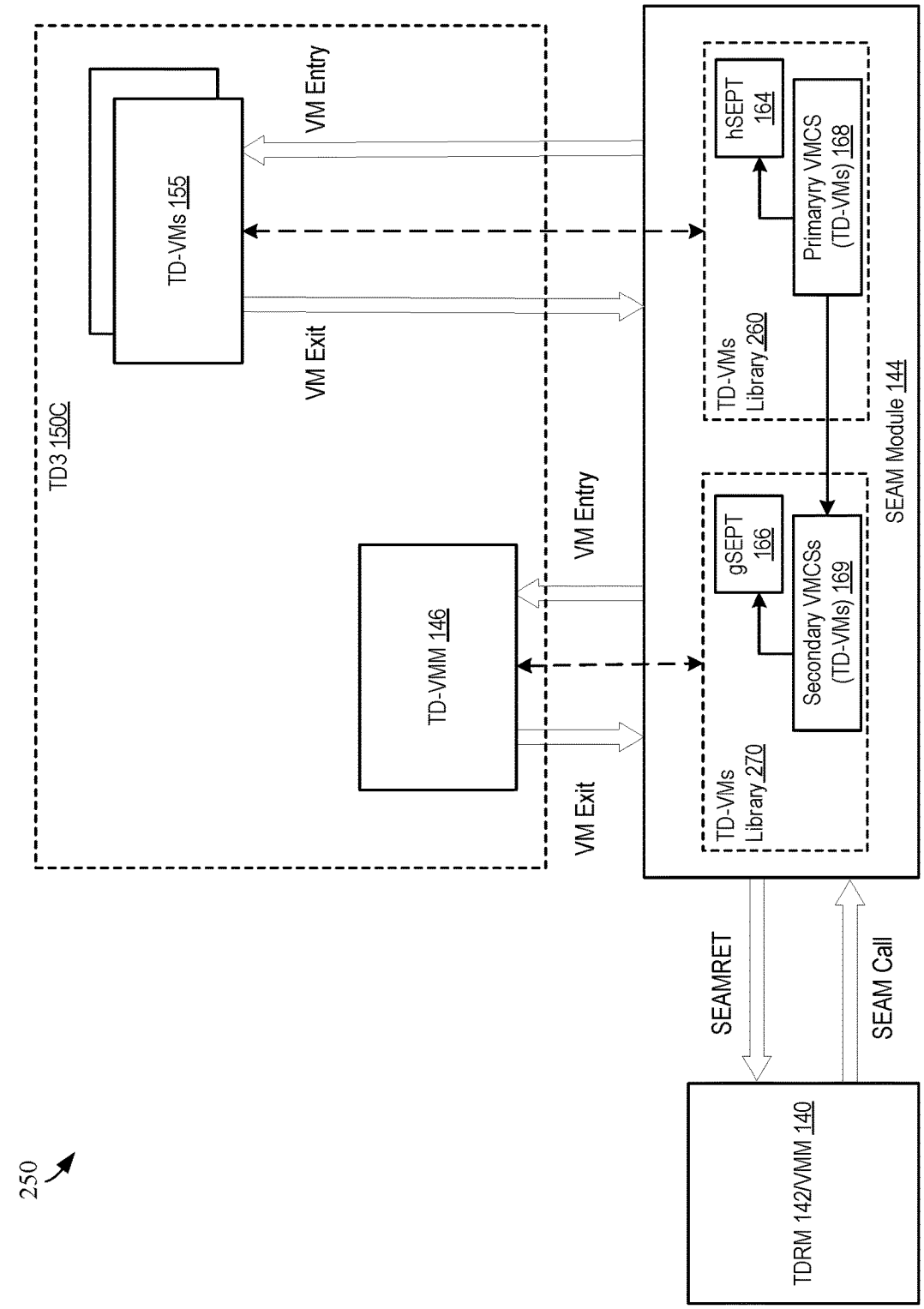
FIG. 2B is a block diagram depicting an example implementation of management of the virtual machine control structures for executing virtual machines inside a trust domain in a SEAM-enabled VMX architecture.

FIG. 2B is a block diagram depicting an example implementation 250 of management of the virtual machine control structures (VMSCs) for executing virtual machines inside a trust domain (TD) in a SEAM-enabled VMX architecture. Shown are the system components that facilitate processor states illustrated above in FIG. 2A. The VMM 140 with a TDRM 142 extension have control over the processor 112, or a logical processor, in the VMX-root mode. The SEAM module 144 has control of the processor when the latter is in the secure arbitration mode (SEAM). Transitions into and out of the SEAM-root may occur responsive to SEAM-CALL instructions such as SEAMCALL (SEAM Entry) and SEAM Exit, as shown. The control of the processor may be given to a TD, such as the TD3 150C via a VM Entry instruction. Following execution of this instruction, the trusted hypervisor TD-VMM 146 takes over the processor in the TD-VMX-root mode which operates as SEAM-not-root and VMX-non-root mode. The host's VMM 140/TDRM 142 may assign memory pages to the TD3 150C but may have no access to the processor state the TD3 150C or the memory assigned to the TD3 150C. This is enforced by encrypting the memory pages assigned to the TD3 150C with the encryption key of the TD3 150C as well as by hardware-protected PAMT 120 that stores attributes of the memory pages assigned to the TD 3 150C. The TD-VMM 146 may securely execute one or more virtual machines TD-VMs 155.

The SEAM module 144 may arbitrate between untrusted host VMM 140/TDRM 142 and TD-VMM 146. More, specifically the SEAM module 144 may include a secure memory (SEAM library) whose range may be hardware-protected in one of the hardware registers 116 of the processor 112. The SEAM library may include the TD-VMM library 260 to enable operations of the TD-VMM 146. The SEAM library may further include the TD-VM library 270 to enable management of the TD-VMs 155 by the TD-VMM 146. The TD-VMM library 260 may include the primary VMCS 168 that controls the state of the logical processor when the latter operates under control of the TD-VMM 146. The primary VMCS 168 may be instantiated using the VMPTRLD instruction, as explained earlier. The TD-VMs library 270 may include a plurality of the secondary VMCSs 169 that control the state of the logical processor when the latter operates under control of one of the TD-VMs 155. More specifically, the logical processor may execute instructions from the TD-VM whose secondary VMCSs is current, active, and launched by the VMLAUNCH instruction. The secondary VMCSs 169 need to be instantiated previously using the VMPTRLD instruction, as explained earlier.

The secondary VMCSs 169 may include pointers (shown schematically with solid arrows) to secure EPTs (i.e. gSEPT 166) that contain mappings of the gGPA assigned to the TD-VMs 155 by the TD-VMM 146. In some implementations, different TD-VMs 155 may share the same gSEPT 166. In some implementations, different TD-VMs may use different gSEPTs 166. The SEAM enforces security of gSEPTs by preventing access of TD-VMs 155 to the gSEPTs 166 used by other TD-VMs 155. Similarly, the SEAM enforces security of the hSEPT. In some implementations, some of the TD-VMs 155 may be allowed access to gSEPTs used by all (or some) of the other TD-VMs 155. The primary VMCS 168 may similarly include a pointer to the secure EPT (i.e. hSEPT 164) that contains mappings of the hGPA reserved for use by the TD-VMM 146. Additionally, the primary VMCS 168 may include pointers to the locations in memory where the secondary VMCS 169 are stored. In some implementations, the pointers (e.g., all or some of the pointers to the gSEPT 166, hSEPT 164, and the secondary VMCSs 169) may include the hGPAs where the respective structures are located.

Figure 3A:
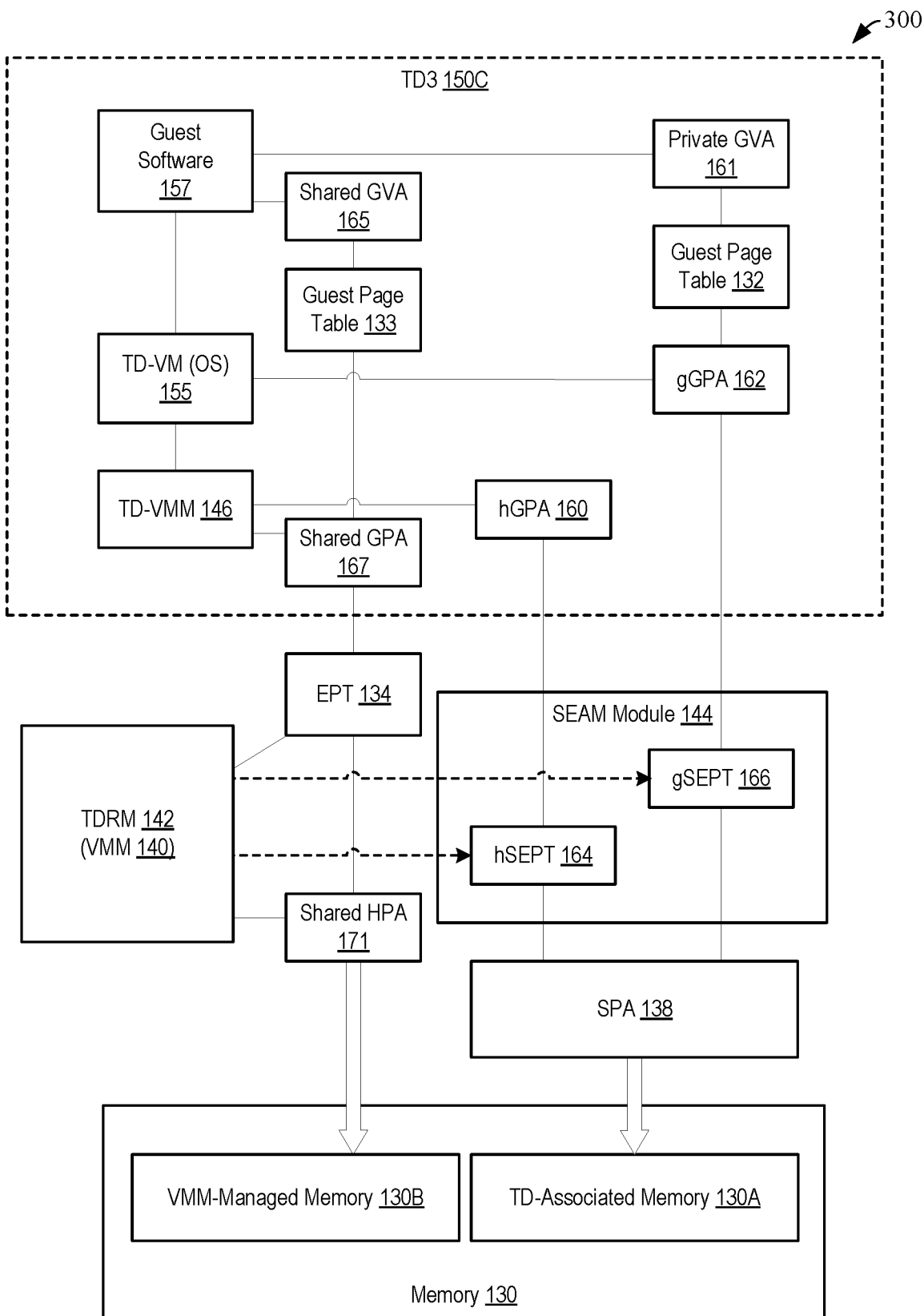
FIG. 3A is a block diagram depicting an example implementation of management of memory address space available to a trust domain in a SEAM-enabled VMX architecture.

FIG. 3A is a block diagram depicting an example implementation 300 of management of memory address space available to a trust domain in a SEAM-enabled VMX architecture. Inside a trust domain (e.g., the TD3 150C) may be the TD-VMM 146 to support a plurality of TD-VMs 155 (only one is depicted for compactness). The guest operating system (OS) instantiated inside a TD-VM 155 may support various guest software 157. The TD-VMM 146 may assign a plurality of memory pages, referenced by the gGPA 162, for use by the TD-VM 155. The guest OS may provide some of these pages for use of the guest software 157. The guest software 157 may reference the memory pages provided to it by guest virtual addresses (GVA). The TD-VM 155 may maintain guest page tables storing mappings of GVAs to GPAs. For example, the guest page table 132 may store mappings of private GVAs referencing the memory pages that are private to the TD3 150C, such as GVA→gGPA mappings. Some of the memory pages assigned to the TD3 150C, such as those referenced by hGPA 160, may be reserved for use by the TD-VMM 146.

The SEAM module 144 may store (e.g., in the SEAM library using VMM memory) secure extended page tables with GPA→HPA mappings of the private memory pages assigned to the TD3 150C. For example, gSEPT 166 may store mappings gGPA→SPA whereas hSEPT 164 may store mappings hGPA→SPA, where SPA 138 are the secure physical addresses pointing to the secure TD-associated physical memory 130A of the memory 130. As indicated schematically by the dashed arrows, the TDRM 142/VMM 140 may control assignment of physical memory pages that are mapped in gSEPT 166 and hSEPT 164 for use by the TD3 150C, but the TDRM 142 (and VMM 140) may not have access to the gSEPT 166 and hSEPT 164, in some implementations.

Additionally, the memory 130 may include memory pages that are not private to the TD3 150C and that may be accessed by different TDs (such as TD1 150A and/or TD2 150B), by the legacy VMs 145, the VMM 140, and so on. Access to such memory pages by the guest software 157 may start with the guest software 157 requesting access to a memory page referenced by a shared GVA 165. The shared GVAs 165 may be assigned by the guest OS of the TD-VM 155 and mapped to the shared GPAs 167 in the guest page table 133 maintained by the OS of the TD-VM 155, in some implementations. The VMM 140 (and/or TDRM 142) may maintain the EPT 134 having GPA→HPA mappings of the shared GPAs 167 to shared HPAs 171. A shared HPA 171 points to a memory page in a shared VMM-managed physical memory 130B of the memory 130. Unlike the secure EPTs 164 and 166, which may be encrypted with the SEAM encryption key (or the TD3 150C encryption key) and stored in the SEAM library (or in one or more memory page(s) allocated for private use by the TD3 155C), the unsecure EPT 134 may be unencrypted or encrypted with a shared encryption key accessible to multiple TDs (such as TD1 150A and/or TD2 150B), by the legacy VMs 145, the VMM 140, and so on.

Figure 3B:
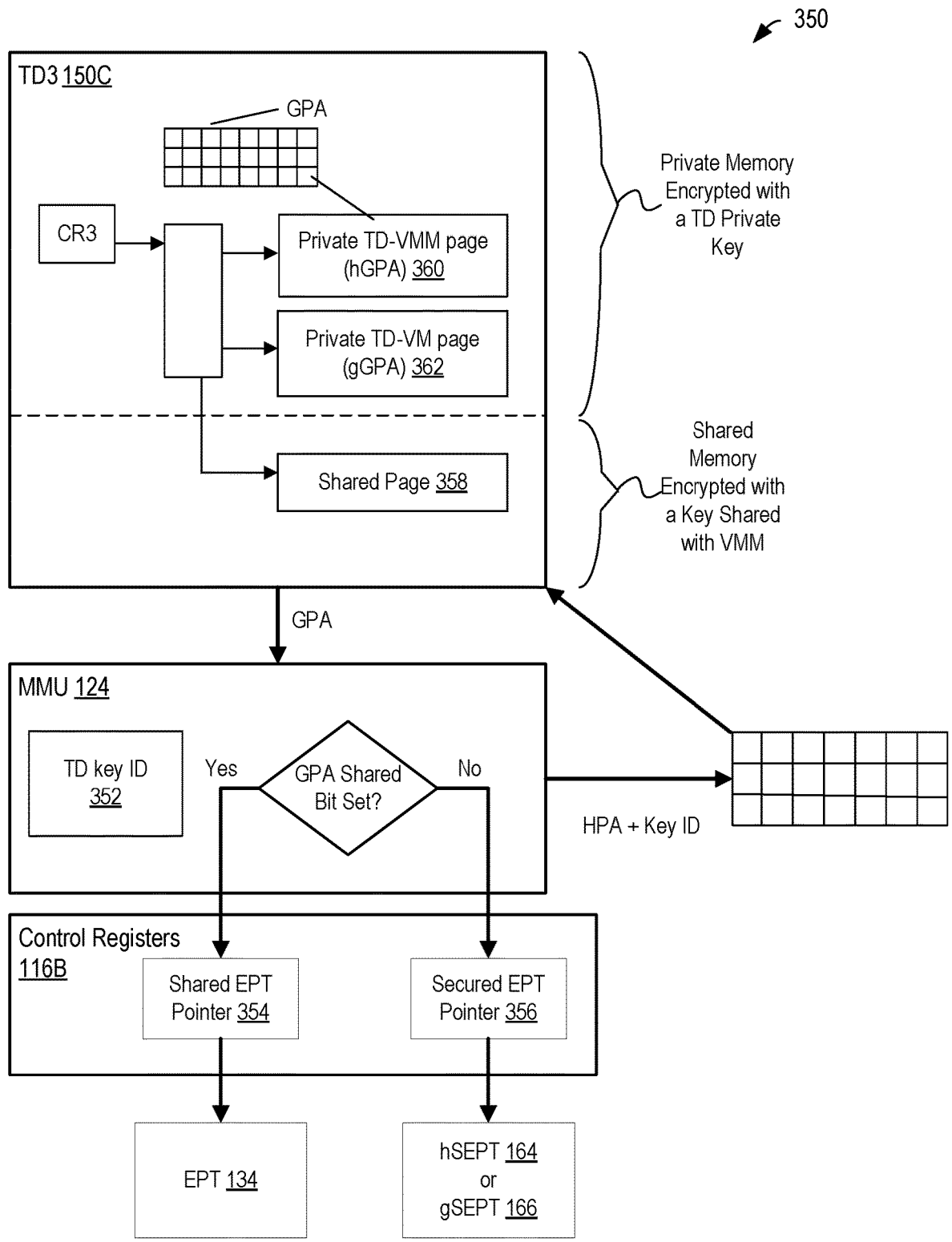
FIG. 3B is a block diagram illustrating memory transactions inside a trust domain with accesses to shared or private memory pages, according to one implementation.

FIG. 3B is a block diagram 350 illustrating memory transactions inside a trust domain with accesses to shared or private memory pages, according to one implementation. Shown is the TD3 150C that may access a GPA and send that GPA to the memory management unit (MMU) 124. In some implementations, both the TD encryption key ID 352 and the EPT pointers (both the shared EPT pointer 354 and the secure EPT pointer 354) are configured into the control registers 116B of the processor core 114 (with reference to FIG. 1B) from the VMCSs (such as the primary VMCS 168 or the one of the secondary VMCSs 169) as part of launching (VMLAUNCH instruction) or resuming (VMRESUME instruction) of the TD-VMM 146 or one of the TD-VMs 155. The MMU 124 may access the TD key ID 352 and the EPT pointers in these control registers 116B.

In some implementations, the MMU 124 may further determine whether the indicator bit (e.g., the shared or "S" bit) within the GPA is set. If the shared bit is set, the MMU 124 may retrieve the shared EPT pointer 354 from the control registers 116B, link to the shared EPT 134, and walk the extended page table entries to determine the host physical address (HPA). In some implementations, the MMU 124 may then append the shared key ID to the HPA. In some implementations, the shared key ID is received from a field in the VMCS or a field in the shared EPT 134. The MMU 124 may then retrieve a shared memory page 358 and decrypt this shared memory page using the shared encryption key. The access to the memory page may generate a TLB entry, so that when a subsequent request to access the same page (referenced by the HPA+key ID) is received, the MMU 124 may not need to walk the EPT 134 again and may access the memory page based on the TLB-cached translation.

In some implementations, if the indicator bit in the GPA is not set, the MMU 124 may retrieve the SEPT pointer 356 from the control registers 116B, link to the SEPT (e.g., hSEPT 164 or gSEPT 166), and walk the SEPT to determine the HPA (which may be an SPA 138). The MMU 124 may then append the TD key ID 352 (which is the private key ID associated with the TD3 150C) to the HPA. The MMU 124 may then retrieve a private TD-VMM page 360 (in case the GPA is an hGPA) or a private TD-VM page 362 (in case the GPA is a gGPA) and decrypt this private memory page using the encryption key associated with the TD key ID 352. The access to the memory page may generate a TLB entry, so that when a subsequent request to access the same page is received, the MMU 124 may not need to walk the SEPT (e.g., hSEPT 164 or gSEPT 166) again and access this memory page based on the TLB-cached translation.

Figure 4A:
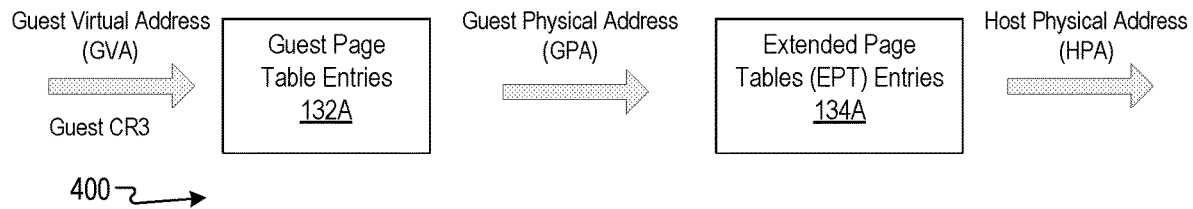
FIG. 4A is a block diagram illustrating translation of a guest virtual address to a guest physical address and of the GPA to a host physical address, according to one implementation.

FIG. 4A is a block diagram 400 illustrating translation of a guest virtual address (GVA) to a guest physical address (GPA) and of the GPA to a host physical address (HPA), according to an implementation. In one implementation, in order to emulate an instruction on behalf of the TD-VMM 146 or a TD-VM 155, the logical processor operating in SEAM need to translate a linear address (e.g., a GVA) used by the instruction to a physical memory address such that the logical processor can access data at that physical address.

In order to perform that translation, the logical processor may need to first determine paging and segmentation including examining a segmentation state of the virtual machine, such as that of TD-VM 155, for example. The logical processor may also determine a paging mode of the TD-VM 155 at the time of instruction invocation, including examining page tables, the MSR 116A, and the control registers 116B. Following discovery of paging and segmentation modes, the logical processor in SEAM may generate a GVA for a logical address, and detect any segmentation faults.

Assuming no segmentation faults are detected, the logical processor may translate the GVA to a GPA and the GPA to an HPA, including performing a page table walk in software. To perform these translations in software, the logical processor may load a number of paging structure entries and EPT structure entries into general purpose registers or memory. Once these paging and EPT structure entries are loaded, the MMU 124 may perform the memory translations as follows.

More specifically, with reference to FIG. 4A, the MMU 124 may be programmed with a guest page table pointer and an EPT pointer from the VMCS when a VMLAUNCH or VMRESUME instruction is performed. The MMU 124 may load a plurality of guest page table entries 132A from the guest page tables 132 and a plurality of extended page table entries 134A from the EPT 134 that were established by the VM. The MMU 124 may then perform translation by walking (e.g., sequentially searching) through the guest page table entries 132A to generate a GPA from the GVA. The MMU 124 may then use the GPA to walk (e.g., hierarchically) the EPT 134 to generate the HPA associated with the GPA. Use of the EPT 134 is a feature that can be used to support the virtualization of physical memory. When EPT is in use, certain addresses that would normally be treated as physical addresses (and used to access memory) are instead treated as guest-physical addresses. Guest-physical addresses are translated by traversing a set of EPT paging structures to produce physical addresses that are used to access physical memory.

Figure 4B:
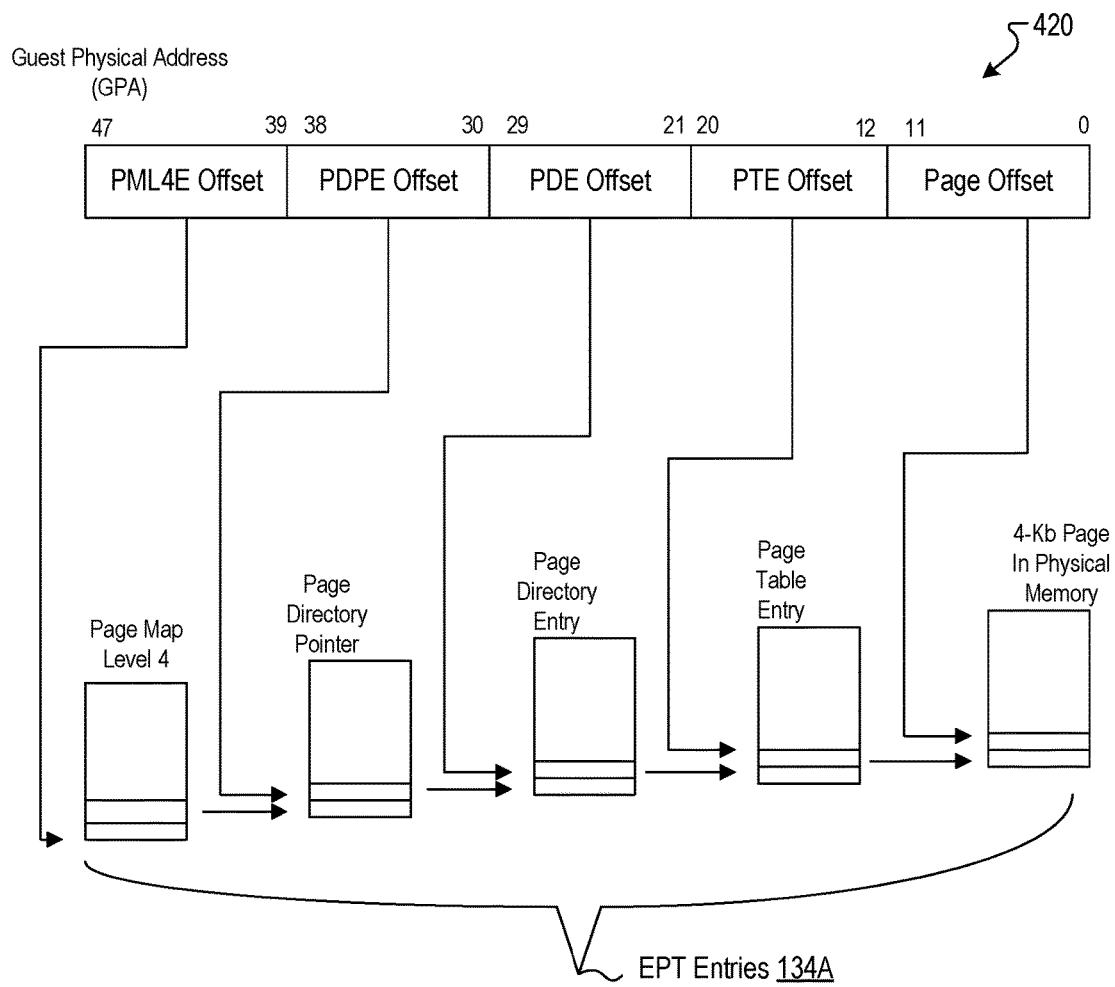
FIG. 4B is a block diagram illustrating use of extended page tables (EPT) to translate the guest physical address to the host physical address, according to one implementation.

FIG. 4B is a block diagram 720 illustrating use of extended page tables (EPT) to translate the guest physical address (GPA) to the host physical address (HPA), according to one implementation. For example, the logical processor may walk the extended page table entries 134A to translate a GPA to an HPA, according to one implementation. For example, the guest physical address (GPA) may be broken into a series of offsets, each to index within a table structure of a hierarchy of the EPT entries 134A. In this example, the EPT from which the EPT entries are derived includes a four-level hierarchal table of entries, including a page map level 4 table, a page directory pointer table, a page directory entry table, and a page table entry table. (In other embodiments, a different number of levels of hierarchy may exist within the EPT, and therefore, the disclosed embodiments are not to be limited by a particular implementation of the EPT.) A result of each index at a level of the EPT hierarchy may be added to the offset for the next table to locate a next result of the next level table in the EPT hierarchy. The result of the fourth (page table entry) table may be combined with a page offset to locate a 4 Kb page (for example) in physical memory, which is the host physical address. Although FIGS. 4A and 4B depict translations for the (shared) EPT 134, similar translation may be implemented when secured EPT, such as hSEPT 164 or gSEPT 166, are used to determine the secure physical addresses (SPA 138) of the private memory pages exclusively associated with the TDs.

Figure 4C:
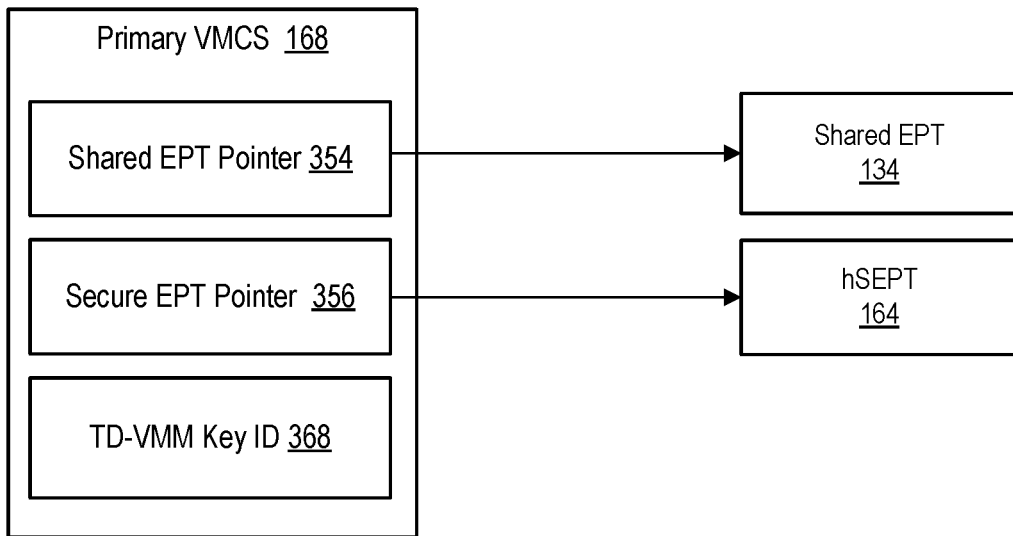
FIG. 4C is a block diagram of a primary virtual machine control structure set up by the SEAM module for the virtual machine monitor operating inside a trust domain, according to one implementation.

FIG. 4C is a block diagram of a primary VMCS 168 set up by the SEAM module 144 for the TD-VMM 146, according to one implementation. In various implementations, after the SEAM module 144 is loaded and is operational to support TD-VMX, the SEAM module 144 sets up the primary VMCS 168 for the TD-VMM 146, which is illustrated in FIG. 4C. In some implementations, the primary VMCS 168 includes a shared EPT pointer 354, a secure EPT pointer 356, and a TD private key ID 352. The shared EPT pointer 354 is used to point to a shared EPT 134 which is used to map the shared memory and is built managed by the VMM 140. The secure EPT pointer 356 is built and managed by the SEAM module 144 and points to the hSEPT 164. The SEAM module 144 may configure the secure EPT pointer 356 and the TD-VMM private key ID, which in some implementations may be the same as the TD private key ID 352.

In some implementations, the hSEPT 164 maps memory that is private to the TD and is reserved for use by the TD-VMM 146, e.g., code and data of the TD-VMM 146, and is encrypted using a private memory encryption key corresponding to the TD-VMM private key ID 368. This private key may be accessible by the SEAM module 144. The MMU 124 may enforce that this private key ID are not used for making memory accesses (load/store/code-fetch) when not in the SEAM and/or TD-VMX-root mode. The SEAM module 144 builds and manages the hSEPT 164 for the TD. By building the hSEPT 164 and making the associated encryption key private, the SEAM module 144 ensures protection from tampering (e.g., by the VMM 140, TDRM 142, or other non-SEAM agent) of the memory mapping performed by the hSEPT 164. The SEAM module 144 specifies these to hardware as part of the VM Entry to the TD using the following the secure EPT pointer 356 and the TD-VMM private key ID 368.

In one implementation, the secure EPT pointer 356 is a new 64-bit control field to specify the hSEPT 164. In implementations, a first bit (e.g., bit 7) of the secure EPT pointer 356 is defined as an "S-position" bit, where "S" stands for "shared" between the SEAM module 144, the TD, and the VMM 140/TDRM 142. When this S-position bit is zero ("0"), an indicator bit (e.g., the "S" bit) is in a first position (e.g., position 47) of the GPA and when the S-position bit is a one ("1"), the indicator bit is located at a second position (e.g., position 51) of the GPA. In another implementation, the S bit position is specified by another field of the primary VMCS 168. The TD-VMM 146 may set the S-bit position in the GPA to indicate to the MMU 124 a position of the indicator (or "S") bit within the GPA, where the indicator bits indicates whether the TD-VMM 146 is making a private or a shared memory access. When the S-bit is set to indicate that the TD-VMM 146 wants to make a shared memory access, then the MMU 124 will translate the GPA to a physical address using the shared EPT 134 and otherwise translate the GPA to a physical address using the secure hSEPT 164.

In implementations, the TD-VMM private key ID 368 is a new 32-bit control field to specify the TD's ephemeral key ID, which corresponds to the private encryption key for the TD-VMM 146. An array of multiple TD-assigned key IDs may be specified to allow the TD-VMM 146 to use more than one key ID, e.g., such that different private memory regions of a given TD may be encrypted and integrity protected using one of the TD-assigned key IDs. The TD-assigned key IDs may be carried along with the physical address in the read or write transaction to the MK-TME engine 126 and be used by the MK-TME engine 126 to select the corresponding key with which to perform the memory encryption. The secure hSEPT 164 may be a 4-level or 5-level EPT (same as configured for the shared EPT by the VMM), for example. The processor 112 may enforce that the number of levels in the two EPTs be identical.

Figure 4D:
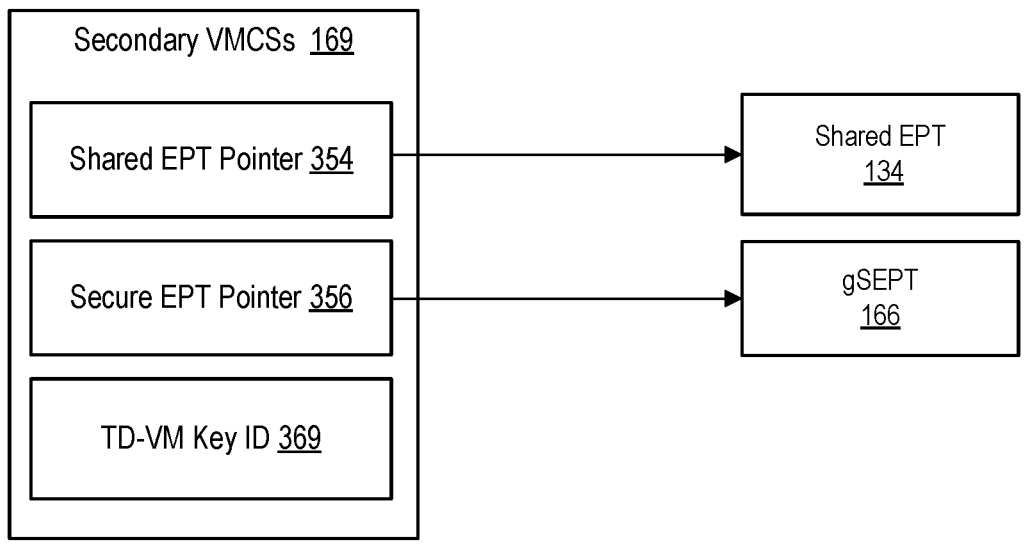
FIG. 4D is a block diagram of a secondary virtual machine control structure set up by the by the SEAM module for a virtual machine inside a trust domain, according to one implementation.

FIG. 4D is a block diagram of a secondary VMCS 169 set up by the SEAM module 144 on behalf of the TD-VMM 146 for a TD-VM 155, according to one implementation. The structure of the secondary VMCS 169 may be similar to the structure of the primary VMCS 168 disclosed above but with the secure EPT pointer 356 pointing to the secure gSEPT 166. In some implementations, the TD-VM private key ID 369 may be the same as the TD-VMM private key ID 368 (and the same as the TD private key ID 352 in FIG. 3B). In other implementations, the TD-VMM key ID 368 may be different from the TD-VM private key ID 369. In some implementations, each of the TD-VMs 155 may be assigned a separate key ID different from the TD-VM private key ID 362. In some implementations, the TD-VMM 146 may have access to all encryption keys assigned to the TD, but each of the TD-VMs 155 may only have access to a specific encryption key assigned to that TD-VM.

Figure 5A:
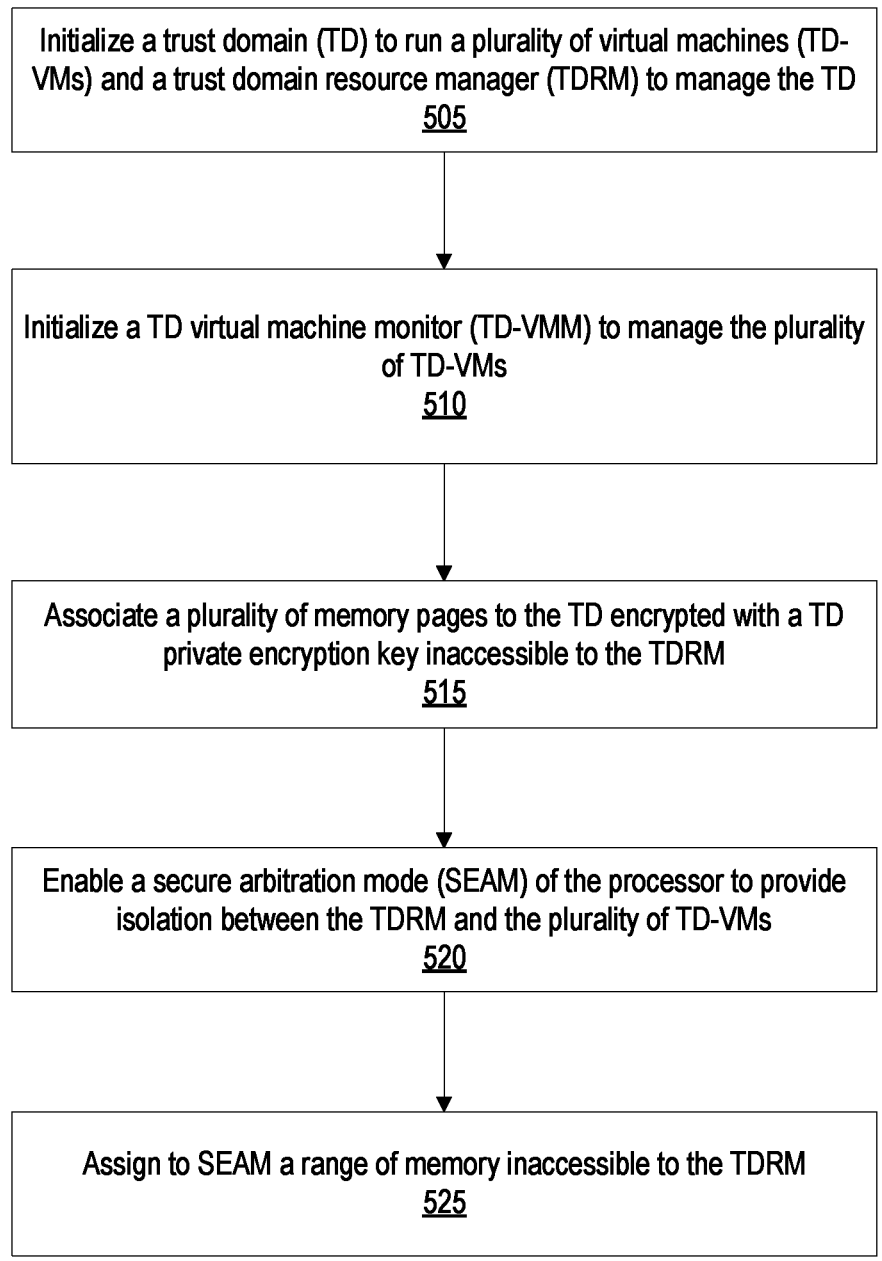
FIG. 5A illustrates an example method that implements virtual machines inside a trust domain, in the SEAM-enabled TD-VMX architecture.

FIG. 5A illustrates an example method 500 that implements virtual machines inside a trust domain (TD), in the SEAM-enabled TD-VMX architecture. Method 500 may be performed by processing logic that may include hardware (e.g., circuitry, dedicated logic, programmable logic, microcode, etc.), software (such as operations being performed by the TDRM or VMM), firmware or a combination thereof. In one exemplary implementation, the method 500 may be performed by the virtualization server 110 of FIG. 1A. The method 500 may involve, initializing, by the processing logic, a trust domain (TD), such as the TD3 150C, to run a plurality of virtual machines (TD-VMs) therein (505). The processing logic may also initialize a trust domain resource manager (TDRM) to manage the TD, including allocation of resources, such as physical memory, to the TD. The TDRM may manage additional TDs. Some of these additional TDs may not support virtualization whereas other TDs may also support a plurality of TD-VMs. To ensure secure execution of applications inside the TDs, the TDRM may not be included in the trusted computing base of the TDs.

The method 500 may also include the processing logic to initialize, inside the TD, such as the TD3 150C, a trusted hypervisor/virtual machine monitor (TD-VMM) (510). The TD-VMM may be a lightweight hypervisor, compared to a host hypervisor (such as the TDRM). The TD-VMM may be configured to execute a limited number of instructions sufficient to manage the TD-VMs. In some implementations, the TD-VMM may be configured to execute only those instruction that are necessary for secure management of the TD-VMs and rely on the TDRM for execution of less sensitive tasks. The TD-VMM may also ensure isolation of different TD-VMs from each other. The TD-VMM may be inside the trusted computing base (TCB) of the TD-VMs. In contrast, to ensure secure execution of applications inside the TD (e.g., by the TD-VMs), the TDRM may not be included in the TCB of the TD. For example, the TDRM may not have access to the state of a processor (e.g., a virtual processor) that is executing commands issued by the TD software (e.g., a guest operating system or applications running therein). The TDRM may exclusively associate a plurality of memory pages to the TD (515). However the TDRM may not have access to the physical memory that it associates with the TD. The TD-associated physical memory may be encrypted with a TD private encryption key that may be inaccessible to the TDRM. For example, the key ID of the TD private encryption key may be assigned for exclusive use with TD operations and such exclusive use may be hardware-enforced.

Because the TDRM may not have access to the memory and state of the processor of the TD whereas the TD-VMM, as a guest software, may not be allowed unrestricted access to the host (e.g., virtualization server 110) resources, the processing logic may enable a secure arbitration mode (SEAM) of the processor to provide isolation between the TDRM and the plurality of the TD-VMs running inside the TD (520). Operations of the processor in SEAM may be controlled by a SEAM module (e.g., the SEAM module 144), which may be implemented in software, firmware, or hardware. The SEAM module may operate in the root mode of the virtual machine architecture (VMX-root mode), i.e. the same mode in which the VMM of the host server operates, but, unlike the VMM, may have access to the control structures of the TD-VMM and the TD-VMs. For example, the TDRM may allocate one or more host memory pages to store a primary (or secondary) virtual machine control structure (VMSC) to store the state of the virtual processor of the TD-VMM (or one of the TD-VMs), but may not have access to it. The processor may launch, resume, read from or write into the VMCSs while in the SEAM mode responsive to commands from the SEAM module. To facilitate operations in the SEAM of the processor, there may be a range of protected memory assigned to SEAM which may be inaccessible to the TDRM (525). In some implementations, the SEAM range of memory to store a SEAM library may be loaded in one of the registers of the processor upon the boot of the virtualization server, e.g., by a Basic Input/Output System firmware. In some implementations, the memory pages in the SEAM range of memory may be encrypted with a SEAM private encryption key which may be hardware-protected from access by the TDRM. The SEAM library may be used to support functionality of the SEAM module when the processor operates in the SEAM. For example, the SEAM library may store the VMCSs of the TD-VMM and the TD-VMs and a secure extended page table(s) (SEPT) to store mappings of guest physical addresses (visible to the TD) to the host physical addresses of the host memory pages.

The order in which various parts of the method 500 are implemented is not limited to the order depicted in FIG. 5A, which illustrates merely an example implementation. Some blocks of method 500 may be performed in a different order. For example, enabling the SEAM (block 520) may be performed after assignment of secure SEAM memory (block 525), and both may be performed prior to the initialization of the TD (block 505), the TD-VMM (block 510), or association of memory with the TD (block 515). Similarly, block 515 may be performed prior to blocks 505 and/or 510.

Figure 5B:
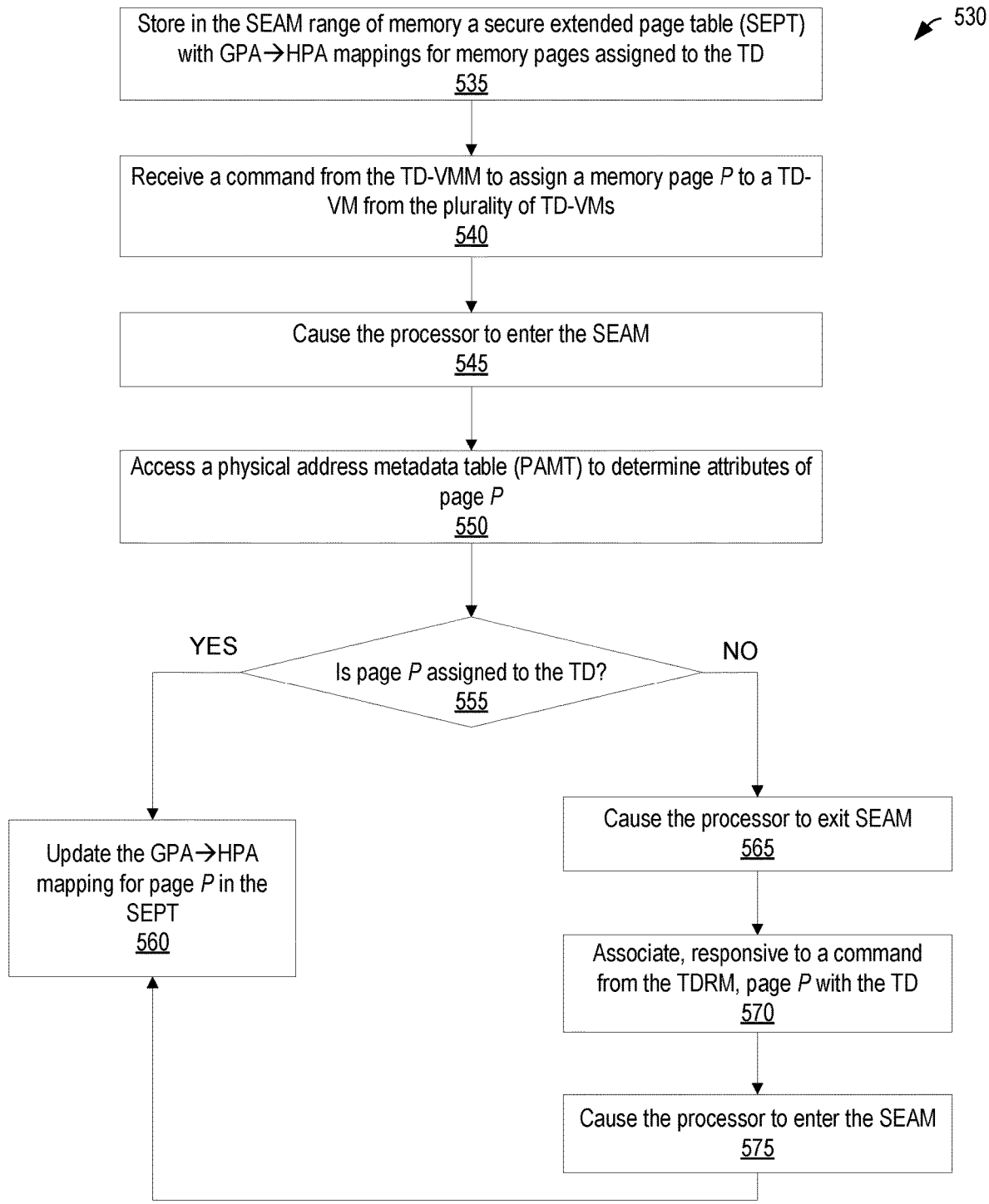
FIG. 5B illustrates an example method that implements assignment of memory to a virtual machine operating inside a trust domain, in the SEAM-enabled TD-VMX architecture.

FIG. 5B illustrates an example method 530 that implements assignment of memory to a virtual machine operating inside a trust domain, in the SEAM-enabled TD-VMX architecture. Method 530 may be performed by processing logic that may include hardware (e.g., circuitry, dedicated logic, programmable logic, microcode, etc.), software (such as operations being performed by the TDRM/VMM, or the TD-VMM), firmware or a combination thereof. In one exemplary implementation, the method 530 may be performed by the virtualization server 110 of FIG. 1A. The method 530 may involve some or all of the blocks of the method 500 of FIG. 5A. For example, in some implementations, some or all of the blocks of the method 500 may be performed prior to execution of any of the blocks of the method 530. The method 530 may involve storing in the SEAM range of memory the SEPT with GPA→HPA mappings for those memory pages that are assigned to the TD (535). The method 530 may continue with receiving a command from the TD-VMM to assign a memory page, e.g. a page P, to one of the plurality of the TD-VMs (540). In some instances the TD-VMM may need to create a new SEPT to store the GPA→HPA mapping for page P and may further add a pointer to the new SEPT in the secondary VMCS for the TD-VM. In some instances, the TD-VMM may need to update the existing SEPT by adding an indication that the page P is private for the TD-VM, so that other TD-VMs may not have access to it. Because the TD-VMM may need to create or modify the SEPT stored in the secure SEAM library, the TD-VMM may have to execute a VM Exit instruction to the processor (e.g., the logical processor) to cause the processor to enter the SEAM (545). The SEAM module, operating in the VMX-root and SEAM-root modes, may access the physical metadata table (PAMT) to determine attributes of page P (550). For example, the processing logic may, responsive to commands from the SEAM module, determine whether page P is in fact associated with the TD whose TD-VMM has requested the assignment of page P to the TD-VM. For example, responsive to receiving the GPA of page P (e.g., the gGPA of page P), the processing logic may first perform a page walk to determine the HPA of page P. The processing logic may then access the PAMT using the HPA which may store security attributes for page P, such as the state of the page. In some implementations, the PAMT entry for page P may be a bitmap of N bits indicating a state of page P, such as 00—free, 01—assigned, 10—pending (in the process of being freed or reassigned). The PAMT may also check the status bit of the page, indicating whether page P is valid or invalid. The PAMT may further include a TD identifier field, which may be a multi-bit field to store the identifier of the TD with which the state P is associated.

If the processing logic determines that the state of page P is "assigned," and that the content of the TD identifier field matches the identifier of the TD, the processing logic may update the SEPT with the GPA→HPA mapping, including an indication that the state of the page is now "assigned" and that the assignment is to the TD-VM (560). The SEAM module may then execute a VM Exit and cede the control of the processor back to the TD-VMM. Note that the term "state" in relation to a page of memory is used in this description in two senses. The state of a page as stored in the PAMT indicates whether the page is associated (e.g., exclusively associated) with a TD. The state of the page in the SEPT indicates whether the page that is associated with a TD is assigned (by the TD-VMM of that TD) to one or more of the TD-VMs (or reserved for own use by the TD-VMM).

If the processing logic determines that page P is not associated with the TD but that its state in PAMT is "free," page P may be associated with the TD before the SEPT is updated. Specifically, the SEAM module may cause the processor to execute a SEAMRET (565) and to transfer control of the processor to the TDRM. The processing logic may then associate, responsive to a command from the TDRM, page P to the TD (570) and execute a SEAM CALL (SEAMCALL (SEAM Entry)) to cause the processor to enter SEAM and return the control of the processor to the SEAM module (575). The processing logic may then update the GPA→HPA mapping in the SEPT in the same manner as disclosed above (560). If, however, at block 555 it is determines that page P is not associated with the TD and that its state in PAMT is "blocked" or "assigned" to a different TD (or to VMM itself), a fault may occur and the SEAM module may execute a VM Entry advising the TD-VMM that page P is unavailable and that the TD-VMM should assign a different page to its TD-VM.

FIGS. 6A-6F illustrate example flows for execution of various TDCALL instructions that can be invoked by the TD-VMM 146 for management of secure EPTs (such as the hSEPT 164 and/or gSEPT 166) in the SEAM-enabled TD-VMX architecture, in one exemplary implementation. Various blocks shown in FIGS. 6A-6F may be executed by a TD-VM 155, the TD-VMM 146, the SEAM module 144, and the VMM 140. Some or all of the blocks shown as executed by the VMM 140 may, in some implementations, be executed by the TDRM 142 even when this is not explicitly stated.

Figure 6A:
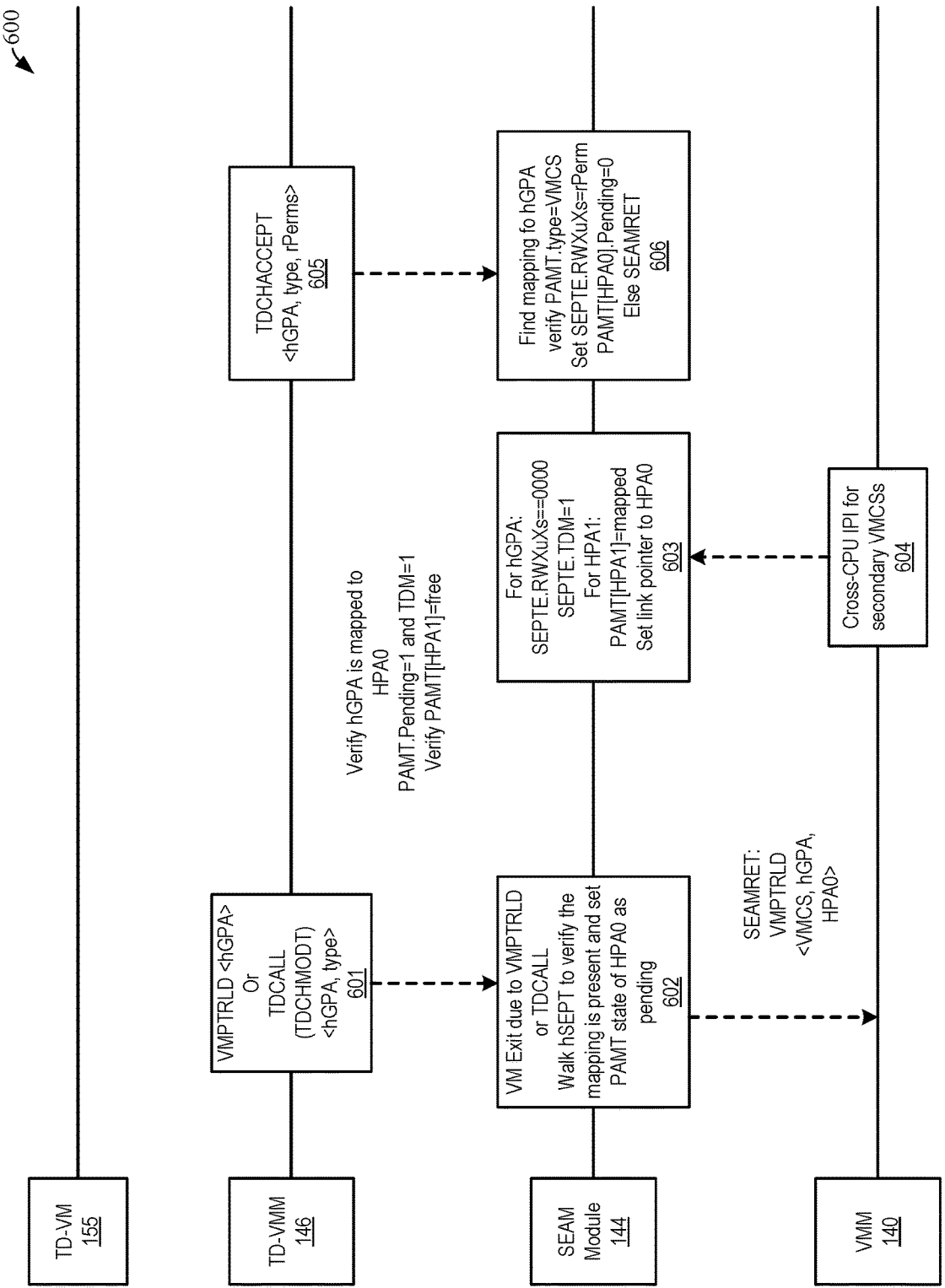
FIG. 6A illustrates a flow for execution of an instruction to create a secondary virtual machine control structure, in the SEAM-enabled TD-VMX architecture, in one exemplary implementation.

FIG. 6A illustrates a flow 600 for execution of an instruction to create a secondary virtual machine control structure (VMCS), in the SEAM-enabled TD-VMX architecture, in one exemplary implementation. The flow 600 may start with the TD-VMM 146 identifying a memory page by its hGPA to be used to store the secondary VMCS, such as one of the secondary VMCSs 169. The TD-VMM 146 may invoke TDCALL, such as TDCHMODT 601 (e.g., a Trust Domain Child Modify Permission TDCALL), specifying, as parameters, the hGPA, whose type is to be modified, and a new type of the memory page. For example, a memory page assigned to the TD may have different types: a "regular" type page to be used for various operations inside the TD, an "SETP" type page to be used as a page to store the hSEPT 164 or gSEPT 166, a "VMCS" type page to store one of the TD VMCSs (e.g., one of the secondary VMCSs 169), and so on. Accordingly, in some implementations, the selected memory page that is to store the secondary VMCS for a new TD-VM 155 may need to have its type changed, e.g., in the PAMT 120, from "regular" to "VMCS." This may be needed since these special page types may not be swapped out by the TDRM 142 when the TD is executing because the processor may be using these pages for saving and restoring a state of the TD-VM logical processor.

The TDCHMODT instruction may trigger the processor exit into the SEAM where the SEAM module 144 may verify (e.g., by a walk in the corresponding hSEPT 164) that the hGPA is mapped (hGPA→HPA0) to a memory page (having a physical address HPA0) that is assigned to the TD whose TD-VMM 146 has issued the TDCHMODT call, for example the TD3 150C (602). Such verification may be performed, for example, by accessing the PAMT 120 and determining the ownership of the memory page identified by the HPA0. If the memory page is indeed assigned to the TD, the SEAM module 144 may set the status of the memory page as "pending" in the PAMT 120. The SEAM module 144 may then execute a SEAMRET and transfer execution to the VMM 140 referencing the primary VMCS 168, the hGPA, and the HPA0 of the memory page. The VMM 140 may then execute a TDADDVPS (e.g., a Trust Domain Add Virtual Processor Structure) instruction to create a secondary VMCS and store it in the HPA0 (604). The TDADDVPS instruction may have the primary VMCS 168, the hGPA, and the HPA0, as operands. Additionally, the TDADDVPS instruction may reference an HPA1 where the primary VMCS 168 is stored. If, however, it is determined at block 602 by the SEAM module 144 that the memory page HPA0 is not assigned to the TD, the VMM 140 may first address this problem by assigning the HPA0 prior to the execution of the TDADDVPS instruction.

The flow 600 may then continue with the SEAM module 144 clearing permissions in hSEPT 164 for the HPA0 memory page (as identified in hSEPT 164 by the hGPA), e.g., by executing the instruction Set SETPE RWXuXs=0, where the read (R), write (W), execute (Xu), and access (Xs) denote the corresponding permission bits (603). The SEAM module 144 may also change the type of the HPA0 memory page as "VMCS." The SEAM module 144 may also verify that the status of the HPA1 is "free" and change this status to "mapped" in the PAMT 120 and store a link pointer to the memory page HPA0 in the memory page HPA1 where the primary VMCS 168 is stored. The TD-VMM 146 may then initiate verification that the permissions to the hGPA have been cleared and that its type has been changed. Such verification may be needed to ensure the integrity of the TD and to exclude a possibility that the untrusted VMM 140 may have failed to do either of these tasks (maliciously or by mistake). The TD-VMM 146 may do this verification by invoking a TDCHACCEPT call listing the VMCS, the hGPA, and the type (605). The TD-VMM 146 may also identify the permissions ("rPerm") that are to be set for the memory page among the parameters of the TDCHACCEPT call. Upon a VM Exit into SEAM, the SEAM module 144 may verify that the type of the page is now "VMCS" (PAMT.type=VMCS), that at the permissions have been cleared (SEPT.PERM=0) and set the permissions to the requested values (Set SETPE RWXuXs=rPerms) (606). The state of the HPA0 memory page in the PAMT 120 may also be changed from "pending" to the "assigned," in some implementations. The TD-VMM 146 may then load (via the VMPTRLD instruction) the new secondary VMCS as explained earlier (not explicitly shown in FIG. 6A). In some implementations, the same flow 600 may be used if the TD-VMM 146 needs to instantiate a shadow VMCS (for the primary VMCS 168 or one of the secondary VMCSs 169) instead of a secondary VMCS. Other permission sets beyond RWXuXS that are populated in the EPT entry may be similarly verified and/or set using this process.

Figure 6B:
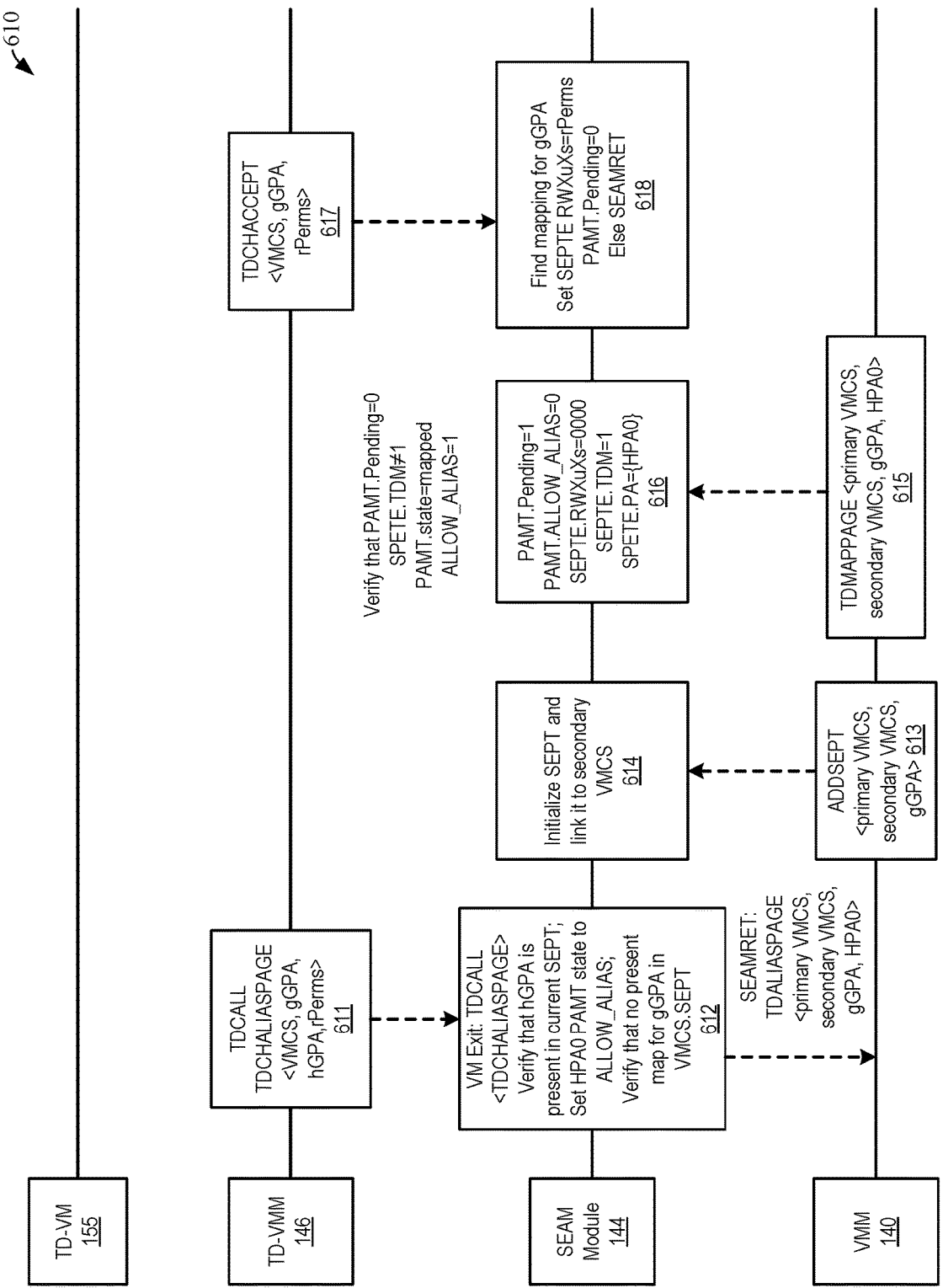
FIG. 6B illustrates a flow for execution of an instruction to grant permission to a virtual machine to access a memory page that is already mapped for use of another virtual machine or the virtual machine monitor operating inside a trust domain, in the SEAM-enabled TD-VMX architecture, in one exemplary implementation.

FIG. 6B illustrates a flow 610 for execution of an instruction to grant permission to a TD-VM to access a memory page that is already mapped for use of another TD-VM or the TD-VMM 146, in the SEAM-enabled TD-VMX architecture, in one exemplary implementation. The flow 610 may start with the TD-VMM 146 invoking a TDCALL, such as TDCHALIASPAGE (e.g., a Trust Domain Child Alias Page TDCALL), and identifying a memory page with its hGPA (611). The TD-VMM 146 may also identify the secondary VMCS of the TD-VM 155 that is to receive permission to access the memory page and further identify the scope or a permission being granted (such as read, write, execute, and so on). The TD-VMM 146 may also specify the gGPA that is to be mapped on the HPA0 of the memory page in the gSEPT 166 for the secondary VMCS.

The TDCHALIASPAGE instruction may trigger the processor exit into the SEAM where the SEAM module 144 may verify (e.g., by a walk in the corresponding hSEPT 164) that the hGPA is currently mapped (hGPA→HPA0) to a memory page that is assigned to the TD whose TD-VMM 146 has issued the TDCHALIASPAGE call, for example the TD3 150C (612). Such verification may be performed, for example, by accessing the PAMT 120 and determining the ownership of the memory page identified by the HPA0. If the memory page is indeed assigned to the TD, the SEAM module 144 may set the state of the HPA0 memory page as "allow alias" in the PAMT 120. The SEAM module 144 may also verify that no mapping gGPA→HPA0 presently exists. The SEAM module 144 may then execute a SEAMRET and transfer execution to the VMM 140 referencing the primary VMCS 168, the secondary VMCS 169, and the gGPA and the HPA0 of the memory page. In some instances, the VMM 140 may determine that there is no sufficient space in the existing gSEPT 166 for the secondary VMCS 169. The VMM 140 may then execute an ADDSEPT instruction to allocate a new memory page for use as the gSEPT 166 (613). The VMM 140 may then execute a SEAMCALL (SEAM Entry) and transfer control of the processor to the SEAM module 144 for initialization of the allocated new memory page as the gSEPT 166 and linking this page to the secondary VMCS 169 (e.g., by adding a pointer to the new memory page from the VMCS) (614). The SEAM module 144 may then return control of the processor to the VMM 140 so that the VMM 140 may execute a TDMAPPAGE to create a mapping gGPA→HPA0 (615).

The flow 610 may then continue with the SEAM module 144 verifying that the gGPA→HPA0 mapping is indeed requested by the TD-VMM 146 (616). The SEAM module 144 may also verify that the state of PAMT 120 is set to allow aliases and that the HPA0 memory page is already in a state mapped for use of the TD. The SEAM module 144 may then create the gGPA→HPA0 mapping state and clear permissions in the corresponding gSEPT 166 for the HPA0 memory page (as identified in gSEPT 166 with the gGPA), e.g., by executing the instruction Set SETPE RWXuXs=0. The TD-VMM 146 may then initiate verification that the requested mapping has been created and the permissions to the gGPA have been cleared. The TD-VMM 146 may do this verification by invoking a TDCHACCEPT call listing the secondary VMCS, the gGPA, and the requested permissions ("rPerm") that the secondary VMCS is to have with respect to the memory page HPA0 identified by the gGPA in the gSEPT 166 (617). Upon a VM Exit into SEAM, the SEAM module 144 may set the permissions to the requested values (Set SETPE RWXuXs=rPerms) (618). In some implementations, where the TD-VMM 146 may need to allow access to a memory page to multiple TD-VMs 155 controlled by different secondary VMCSs 169, the TD-VMM 146 may execute the flow 610 multiple times, once for each secondary VMCS 169.

FIG. 6C illustrates an example flow 620 for execution of an instruction to modify permissions to access a memory page identified by a gGPA that can be invoked by the TD-VMM 146 in the SEAM-enabled TD-VMX architecture, in one exemplary implementation. The flow may start with the TD-VMM 146 invoking a TDCALL, such as TDCHMODPR (e.g., a Trust Domain Child Modify Permission TDCALL), specifying, as parameters, the gGPA, whose permissions need to be modified, and the VMCS (e.g., a secondary VMCS 169) for the TD-VM 155 to which the memory page identified by the gGPA is assigned (621). The TDCHMODPR instruction may trigger the processor exit into the SEAM where the SEAM module 144 may verify (e.g., by a walk in the corresponding gSEPT 166) that the gGPA is indeed mapped to a memory page that is assigned to the right TD, such as the TD3 150C to which the TD-VMM 146 that has issued the TDCHMODPR call belongs (622). Such verification may be performed by accessing the PAMT 120 and determining the ownership of the memory page. If the memory page is indeed assigned to the TD, the SEAM module 144 may clear the permission bits in the SEPT, such as the read (R), write (W), execute (Xu), and access (Xs) permission bits (622). The SEAM module 144 may also mark the status of the memory page as "pending" in the PAMT 120. If, however, the memory page is not assigned to the TD, the SEAM module 144 may execute a SEAMRET into the VMX-root mode (as shown in FIG. 2A) so that the VMM 140 may address this problem (for example, by assigning the memory page to the TD, if the memory page is available for such assignment).

After clearing the permission bits, the flow 620 may continue with the SEAM module 144 transferring (via a VM Entry) control of the logical processor to the TD-VMM 146. The TD-VMM 146 may stop execution of some or all TD-VMs 155 and execute the INVEPT TDCALL to invalidate the SEPT which has the mapping of the gGPA (623). Following the INVEPT call, the TD-VMM 146 may trigger a VM Exit into the SEAM so that the SEAM module 144 may verify that all TD-VMs have stopped execution on all logical processors (624). This may be done by executing the VMCLEAR instruction, in some implementations. If the SEAM module 144 cannot verify that all TD-VMs are inactive, the SEAM module 144 may execute a SEAMRET into the VMM-root mode and request the VMM 140 to send inter-processor interrupt (IPI) to interrupt execution of current and active TD-VMs. Once all TD-VMs are stopped, the processor can flush the TLB entries that store cached translations involving the memory page identified by the gGPA to ensure that no old translations are still present. This may be performed the SEAM module 144 and/or by the VMM 140 invoking a cross-CPU IPI handler (625-626).

The TD-VMM 146 may then initiate verification that the permissions to the referenced gGPA have been cleared. Such verification may be needed to ensure the integrity of the TD and to exclude a possibility that the untrusted VMM 140 may have failed to clear permissions (maliciously or by mistake). The TD-VMM 146 may do this verification by invoking a TDCHACCEPT call listing the VMCS, the gGPA, and the requested permissions ("rPerm") for the memory page as parameters of the call (627). Upon a VM Exit into SEAM, the SEAM module 144 may verify that the permissions have been cleared (SEPT.PERM==0) and set the permissions to the requested values (Set SETPE RWXuXs==rPerms) (628). But if the permissions have not been cleared, the SEAM may exit and transfer the control of the logical processor to the VMM 140. If the permissions are properly cleared and then reset according to the rPerms instructions, the control of the logical processor is transferred to the TD-VMM 146 via a VM Entry and the TD-VMM 146 may resume the execution of the TD-VM 155 using the VMRESUME call listing the secondary VMCS of the TD-VM 155 as a parameter (629). In some implementations, execution of the TDCHMODPR flow may require no changes to the PAMT 120, if the memory page identified by the gGPA has already assigned to the TD. In some implementations, where the gGPA identifies a memory page that has not been previously assigned to the TD and the VMM 140 assigns this page to the TD, the SEAM module 144 may add or modify the attributes of this page in the PAMT 120.

Figure 6D:
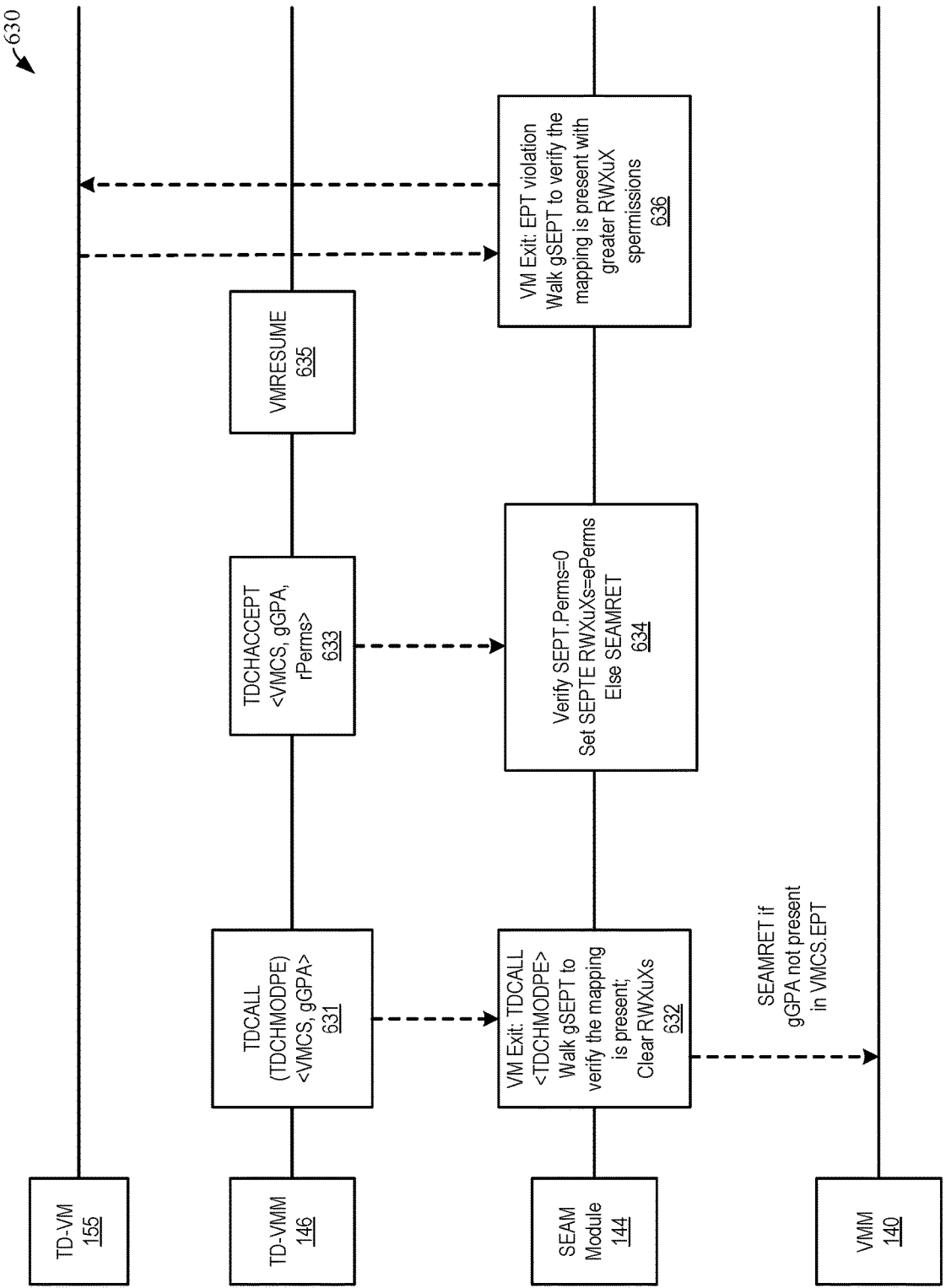
FIG. 6D illustrates an example flow for execution of an instruction to enhance permissions to access a memory page identified by a guest physical address that can be invoked by the virtual machine monitor operating inside a trust domain, in the SEAM-enabled TD-VMX architecture, in one exemplary implementation.

FIG. 6D illustrates an example flow 630 for execution of an instruction to enhance permissions to access a memory page identified by a gGPA that can be invoked by the TD-VMM 146 in the SEAM-enabled TD-VMX architecture, in one exemplary implementation. For example, the TD-VMM 146 may need to grant permission to a TD-VM to write into a memory page identified by the gGPA in a situation where the TD-VM had only had a permission to read from this page. The flow may start with the TD-VMM 146 invoking a TDCALL, such as TDCHMODPE (e.g., a Trust Domain Child Modify Permission Enhance TDCALL), specifying, as parameters, the gGPA, whose permissions need to be enhanced, and the VMCS (e.g., a secondary VMCS 169) for the TD-VM 155 to which the memory page identified by the gGPA is assigned (631). The TDCHMODPE instruction may trigger the processor exit into the SEAM where the SEAM module 144 may verify (e.g., by a walk in the corresponding gSEPT 166) that the gGPA is indeed mapped to a memory page that is assigned to the right TD, such as the TD3 150C to which the TD-VMM 146 that has issued the TDCHMODPE call belongs (632). Such verification may be performed by accessing the PAMT 120 and determining the ownership of the memory page. If the memory page is indeed assigned to the TD, the SEAM module 144 may clear the permission bits in the SEPT (632). If, however, the memory page is not assigned to the TD, and the TD-VMM 146 is attempting to enhance permissions of an unmapped page, the SEAM module 144 may execute a SEAMRET into the VMX-root mode so that the VMM 140 may address this problem (for example, by assigning the memory page to the TD, if the memory page is available for such assignment).

Unlike the flow 620, the flow 630 may not need flushing of TLB-cashed translations gGPA→HPA and may proceed directly to the verification that the permissions to the referenced gGPA have been cleared. The TD-VMM 146 may do this verification by invoking a TDCHACCEPT call listing the VMCS, the gGPA, and the requested enhanced permissions ("ePerm") as parameters of the call (633). Upon a VM Exit into SEAM, the SEAM module 144 may verify that the permissions have been cleared (SEPT.PERM==0) and set the permissions to the requested enhanced values (Set SETPE RWXuXs==ePerms) (634). If the permissions have not been cleared, the SEAM may exit and transfer the control of the logical processor to the VMM 140. If the permissions are properly cleared and then reset according to the ePerms instructions, the control of the logical processor is transferred to the TD-VMM 146 via a VM Entry and the TD-VMM 146 may resume the execution of the TD-VM 155 using the VMRESUME call listing the secondary VMCS of the TD-VM 155 as a parameter (635). In some implementations, execution of the TDCHMODPE flow may require no changes to the PAMT 120, if the memory page identified by the gGPA has already assigned to the TD. In some implementations, it may be essential that the TD-VMM 146 executes the TDCHACCEPT instruction. For example, if a TD-VMM 146 attempts accessing a memory page using a gGPA whose mapping gGPA→HPA has not been accepted by the TD-VMM 146, a VM Exit into SEAM may occur and the SEAM module may verify that the mapping gGPA→HPA is present in the gSEPT 166 (636).

Figure 6E:
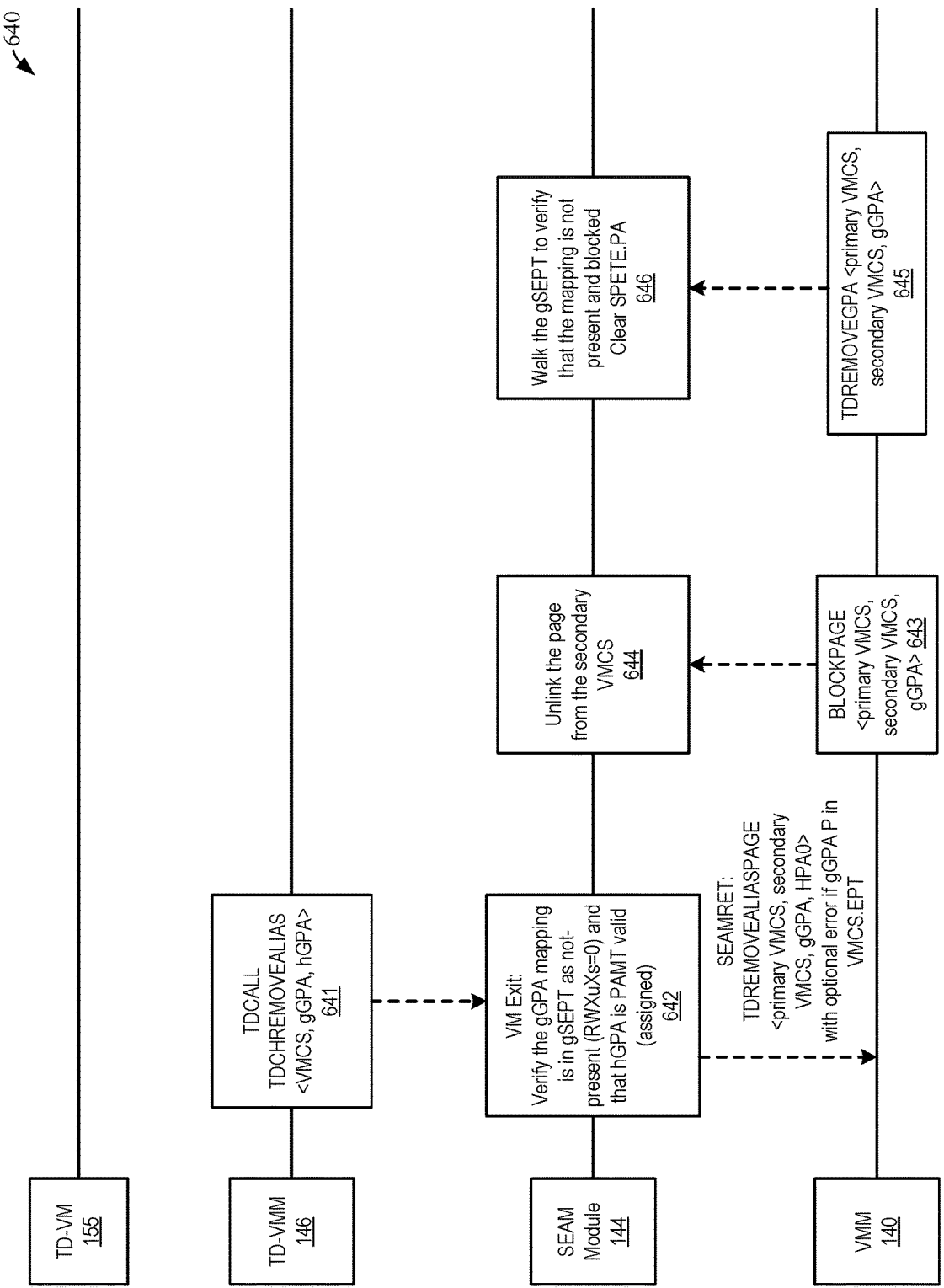
FIG. 6E illustrates a flow for execution of an instruction to remove permission from a virtual machine to access a memory page that may have been previously mapped for use by another virtual machine or the virtual machine monitor operating inside a trust domain, in the SEAM-enabled TD-VMX architecture, in one exemplary implementation.

FIG. 6E illustrates a flow 640 for execution of an instruction to remove permission from a TD-VM to access a memory page that may have been previously mapped for use by another TD-VM or the TD-VMM 146, in the SEAM-enabled TD-VMX architecture, in one exemplary implementation. The flow 640 may start with the TD-VMM 146 invoking a TDCALL, such as TDCHREMOVEALIAS (e.g., a Trust Domain Child Remove Alias TDCALL), and identifying a memory page with its hGPA and gGPA (641). Both the hGPA and the gGPA refer to the same memory page with the hGPA→HPA0 mapping in the hSEPT 164 used by the TD-VMM 146 and the gGPA→HPA0 mapping used by the TD-VM 155. The TD-VMM 146 may also identify the secondary VMCS of the TD-VM 155 whose permission to access the memory page is to be removed.

The TDCHREMOVEALIAS instruction may trigger the processor exit into the SEAM where the SEAM module 144 may verify (e.g., by a walk in the corresponding gSEPT 166) that the gGPA is currently mapped to the memory page (HPA0) that is assigned to the TD whose TD-VMM 146 has issued the TDCHREMOVEALIAS call, for example the TD3 150C (642). Such verification may be performed, for example, by accessing the PAMT 120 and determining the ownership of the memory page identified by the HPA. If the memory page is indeed assigned to the TD, the SEAM module 144 may clear all permissions (e.g., R, W, Xu, Xs) and/or mark the page as "non-present" in the gSEPT 166. The SEAM module 144 may then execute a SEAMRET and transfer execution to the VMM 140 referencing the primary VMCS 168, the secondary VMCS 169, and the gGPA and the HPA0 of the memory page. The VMM 140 may then execute—via a SEAMCALL instruction—a TDBLOCKPAGE instruction to block the memory page (643). The VMM 140 may then execute a SEAMCALL (SEAM Entry) and transfer control of the processor to the SEAM module 144 for unlinking the memory page from the secondary VMCS 169 (e.g., by removing a pointer to the memory page from the VMCS) (644). The SEAM module 144 may then return control of the processor to the VMM 140 so that the VMM 140 may execute a TDREMOVEGPA to unmap the blocked GPA from the TD (645) The flow 610 may then continue with the SEAM module 144 verifying that the gGPA→HPA0 mapping is no longer present in the gSEPT 166 and blocked from use by the secondary VMCS 169 (646).

Figure 6F:
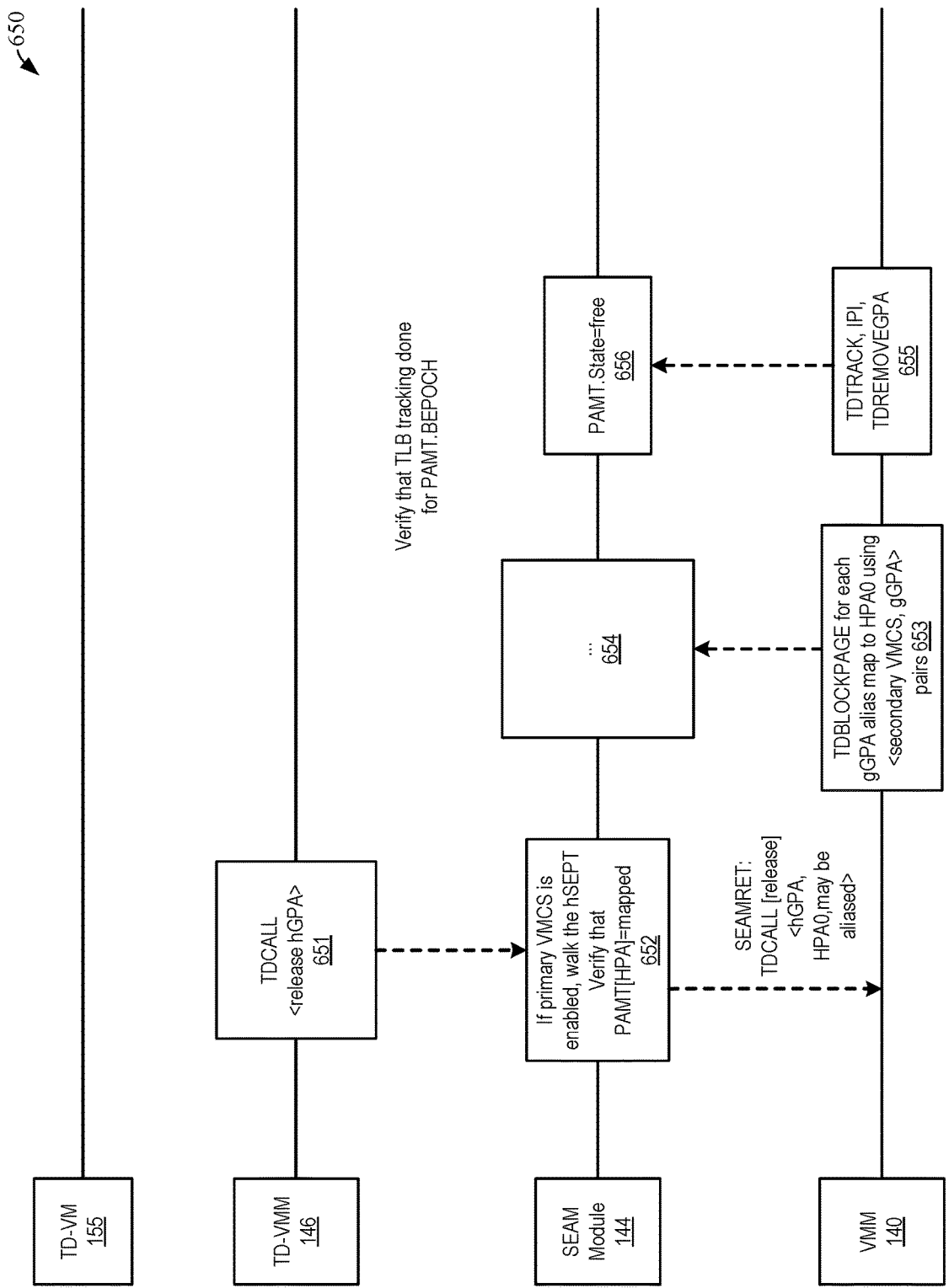
FIG. 6F illustrates a flow for execution of an instruction to release a memory page associated with a trust domain, in the SEAM-enabled TD-VMX architecture, in one exemplary implementation.

FIG. 6F illustrates a flow 650 for execution of an instruction to release a memory page associated with a TD, in the SEAM-enabled TD-VMX architecture, in one exemplary implementation. The flow 650 may start with the TD-VMM 146 invoking a TDCALL to release a memory page identified by its hGPA (651). The TDCALL instruction may trigger the processor exit into the SEAM where the SEAM module 144 may verify (e.g., by a walk in the corresponding hSEPT 164) that the hGPA is currently mapped to a memory page (HPA0) that is assigned to the TD whose TD-VMM 146 has issued the TDCALL, for example the TD3 150C (652). Such verification may be performed, for example, by accessing the PAMT 120 and determining the ownership of the memory page identified by the HPA. The SEAM module 144 may then execute a SEAMRET and transfer execution to the VMM 140 referencing the primary VMCS 168, the hGPA, and the HPA0 of the memory page. The VMM 140 may then execute a TDBLOCKPAGE for each gGPA alias that may have been used to map the HPA0 memory page using <secondary VMCS, gGPA> pairs (653). The VMM 140 may then execute a SEAMCALL (SEAM Entry) and transfer control of the processor to the SEAM module 144. The SEAM module may record the TD epoch in the PAMT entry of the hSEPT page to ensure that a stale TLB entry is not being installed by the untrusted VMM (654). The VMM may also need to perform normal TDTRACK, IPI, and TDREMOVEGPA flows to track and flush the TLB entries that cache the gGPA→HPA mappings corresponding to the HPA0 memory page being released for the logical processors with active secondary VMSCs for various TD-VMs (655). The TDTRACK may bump up the BEPOCH number in the TDCS for the TD and the SEAM may store the sampled value of TD_EPOCH as the new EPOCH value in the meta-data for the logical processor executing the TD. The SEAM module 144 may then verify that TLB tracking and flushing has been done for PAMT.BEPOCH and set the state of the page in the PAMT as free (656).

In some implementations, two additional TDCALL for memory management may be available to the TD-VMM, such as TDCHDEMOTEPAGE and TDCHPROMOTEPAGE. The TD-VMM 146 may decrease or increase the size of a memory page assigned to a specific TD-VM. In case the TD-VMM 146 is to decrease the size of the memory page (e.g., by 4 KB or any other size), the TD-VMM may invoke the TDCHDEMOTEPAGE instruction, which may include such parameters as secondary VMCS (to identify the TD-VM whose page is being resized), gGPA address of this page, the old page size, and the new page size. TDCHDEMOTEPAGE TDCALL operation may be invoked by TD-VMM to 146 to remove the original (large page) SEPT entry and replace it with the new SEPT entry for the demoted page and the SEPT entry for the memory page (e.g., 4 KB page) that has been split off the original page. This TDCALL may result in a request by SEAM for a corresponding support from the TDRM 142. SEAMRET may be required for SEAM tracking and TDRM (and/or a service VM, to which the VMM may offload long-running tasks) to maintain gGPA to SPA mappings to support SEPT management. After operation is completed by SEAM (with support of TDRM), TD-VMM may invoke TDACCEPT to acknowledge the change in the SEP because a TD-VM attempting to access the corresponding page entries before TDACCEPT is invoked by TD-VMM will cause EPT violation.

Similarly, the TDCHPROMOTEPAGE TDCALL may be used by the TD-VMM 146 to increase the sizer of the memory page assigned to a TD-VM and may have such parameters as the secondary VMCS, gGPA, the old page size, and the new page size. The corresponding TB TDCALL operation may be invoked by TD-VMM to remove page entries (e.g., 4 KB entries) for the TD-VM and to promote (merge) original page entries into a large page SPET entry. This TDCALL may similarly request corresponding support from TDRM through SEAM (as described above) similarly invoke TDACCEPT to acknowledge the change.

Figure 7A:
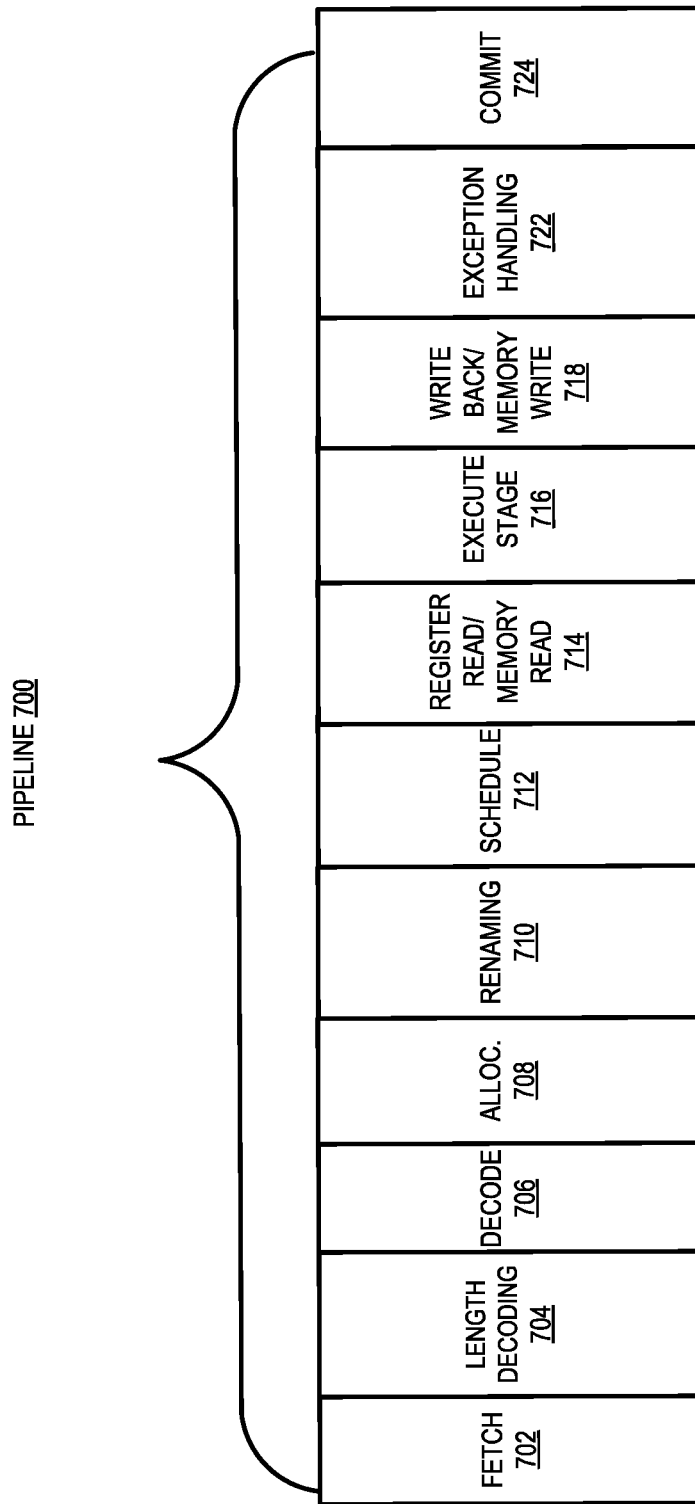
FIG. 7A is a block diagram illustrating a micro-architecture for a processor in which one implementation of the disclosure may be used.
Figure 7B:
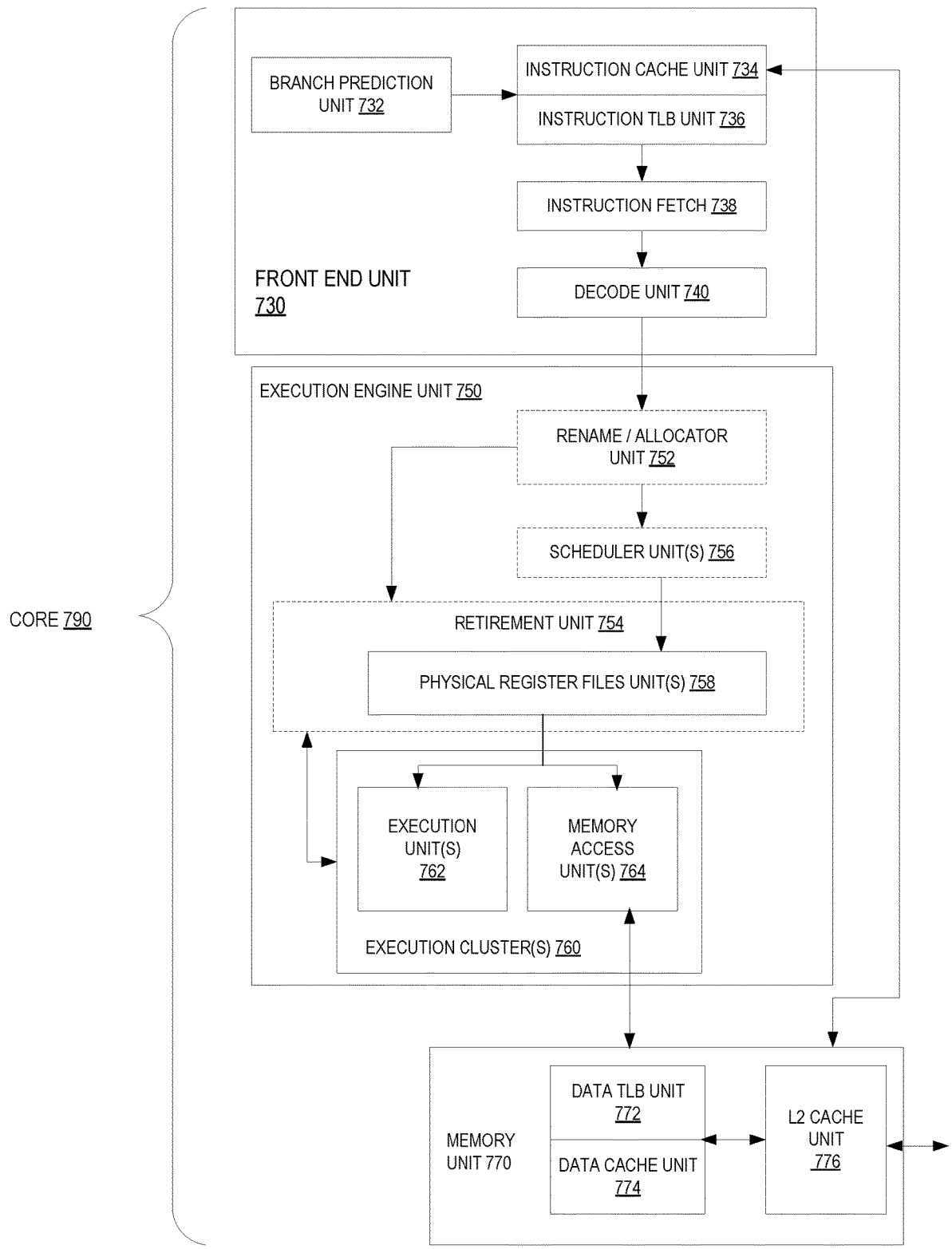
FIG. 7B is a block diagram illustrating an in-order pipeline and a register renaming stage, out-of-order issue/execution pipeline implemented according to at least one implementation of the disclosure.

FIG. 7A is a block diagram illustrating an in-order pipeline and a register re-naming stage, out-of-order issue/ execution pipeline of a processor monitoring performance of a processing device to execute virtual machines inside a trust domain, in the SEAM-enabled TD-VMX architecture, according to at least one implementation of the disclosure. FIG. 7B is a block diagram illustrating an in-order architecture core and a register renaming logic, out-of-order issue/execution logic to be included in a processor according to at least one implementation of the disclosure. The solid lined boxes in FIG. 7A illustrate the in-order pipeline, while the dashed lined boxes illustrates the register renaming, out-of-order issue/execution pipeline. Similarly, the solid lined boxes in FIG. 7B illustrate the in-order architecture logic, while the dashed lined boxes illustrates the register renaming logic and out-of-order issue/execution logic.

In FIG. 7A, a processor pipeline 700 includes a fetch stage 702, a length decoding stage 704, a decode stage 706, an allocation stage 708, a renaming stage 710, a schedule (also known as a dispatch or issue) stage 712, a register read/memory read stage 714, an execute stage 716, a write back/memory write stage 718, an exception handling stage 722, and a commit stage 724. In some implementations, the stages are provided in a different order and different stages may be considered in-order and out-of-order.

In FIG. 7B, arrows denote a coupling between two or more units and the direction of the arrow indicates a direction of data flow between those units. FIG. 7B shows processor core (core) 790 including a front end unit 730 coupled to an execution engine unit 750, and both are coupled to a memory unit 770.

The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 734 is further coupled to a level 2 (L2) cache unit 776 in the memory unit 770. The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 758 is overlapped by the retirement unit 754 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point).

While some implementations may include a number of execution units dedicated to specific functions or sets of functions, other implementations may include one execution unit or multiple execution units that all perform all functions. The scheduler unit(s) 756, physical register file(s) unit(s) 758, and execution cluster(s) 760 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary implementation, the memory access units 764 may include a load unit, a store address unit, and a store data unit, each of which is coupled to the data TLB unit 772 in the memory unit 770. The L2 cache unit 776 is coupled to one or more other levels of cache and eventually to a main memory.

By way of example, the exemplary register renaming, out-of-order issue/execution core architecture may implement the pipeline 700 of FIG. 7A as follows: 1) the instruction fetch 38 performs the fetch and length decoding stages 702 and 704 respectively; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated implementation of the processor also includes a separate instruction and data cache units 734/774 and a shared L2 cache unit 776, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 8:
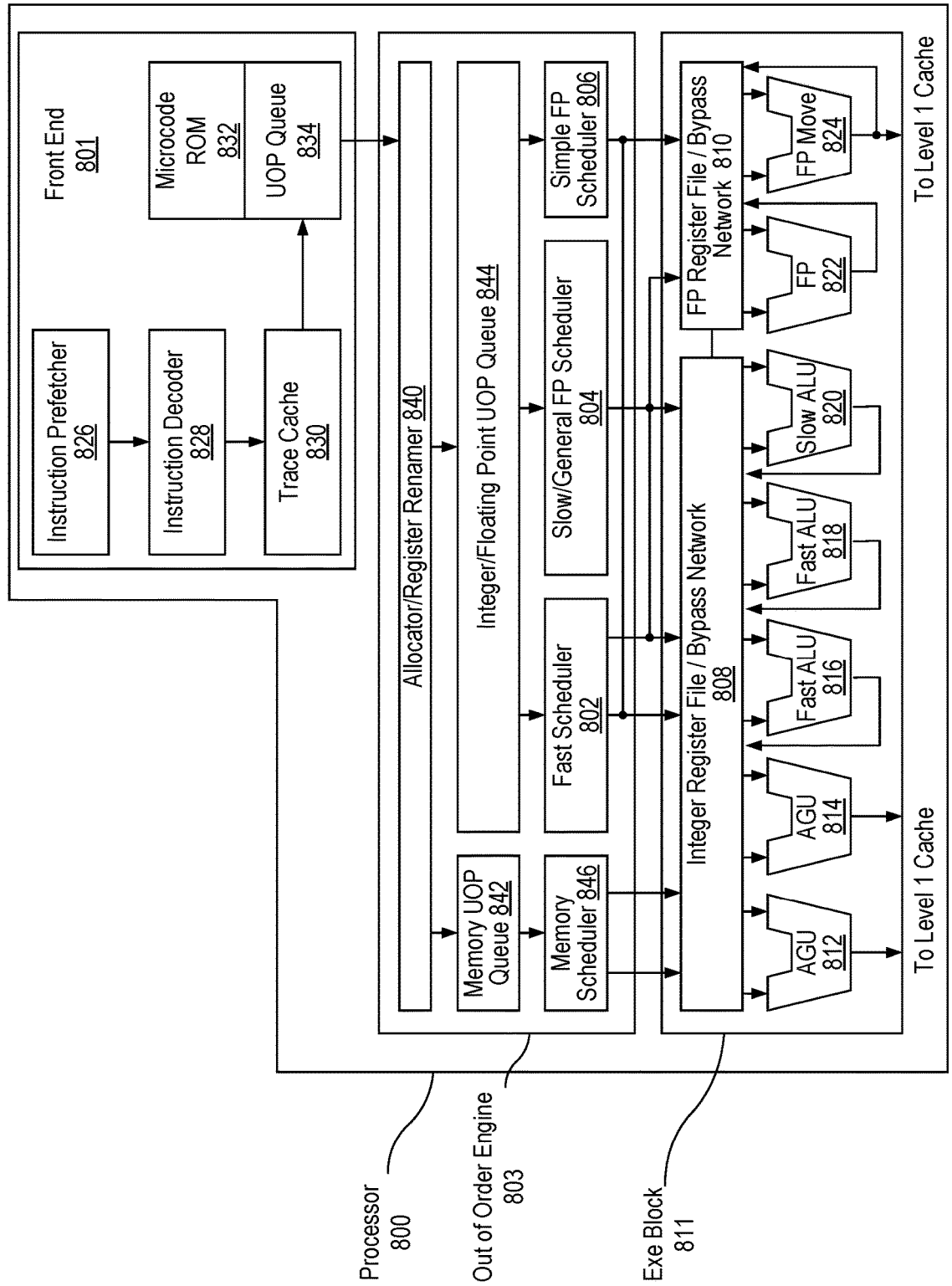
FIG. 8 illustrates a block diagram of the micro-architecture for a processing device that includes logic circuits to execute virtual machines inside a trust domain, in the SEAM-enabled TD-VMX architecture, according to one implementation of the disclosure.

FIG. 8 illustrates a block diagram of the micro-architecture for a processing device 800 that includes logic circuits to execute virtual machines inside a trust domain, in the SEAM-enabled TD-VMX architecture, according to at least one implementation of the disclosure. In some implementations, an instruction may be implemented to operate on data elements having sizes of byte, word, doubleword, quadword, etc., as well as datatypes, such as single and double precision integer and floating point datatypes. In one implementation the in-order front end 801 is the part of the processing device 800 that fetches instructions to be executed and prepares them to be used later in the processing device pipeline. The implementations to execute virtual machines inside a trust domain, in the SEAM-enabled TD-VMX architecture, may be implemented in the processing device 800.

The front end 801 may include several units. In one implementation, the instruction prefetcher 826 fetches instructions from memory and feeds them to an instruction decoder 828 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one implementation, if more than four micro-ops are needed to complete an instruction, the decoder 828 accesses the microcode ROM 832 to do the instruction. For one implementation, an instruction may be decoded into a small number of micro ops for processing at the instruction decoder 828. In another implementation, an instruction may be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one implementation from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The allocator/register renaming logic 840 renames logic registers onto entries in a register file. The allocator 840 also allocates an entry for each uop in one of the two uop queues, one for memory operations 842 and one for non-memory operations 844, in front of the instruction schedulers: memory scheduler 846, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one implementation may schedule on each half of the main clock cycle while the other schedulers may only schedule once per main processing device clock cycle. The schedulers arbitrate for the dispatch ports to schedule uops for execution.

Register files 808, 810, sit between the schedulers 802, 804, 806, and the execution units 812, 814, 816, 818, 820, 822, 824 in the execution block 811. There is a separate register file 808, 810, for integer and floating point operations, respectively. Each register file 808, 810, of one implementation also includes a bypass network that may bypass or forward just completed results that have not yet been written into the register file to new dependent uops. The integer register file 808 and the floating point register file 810 are also capable of communicating data with the other. For one implementation, the integer register file 808 is split into two separate register files, one register file for the low order 32 bits of data and a second register file for the high order 32 bits of data. The floating point register file 810 of one implementation has 128 bit wide entries because floating point instructions typically have operands from 64 to 128 bits in width.

The execution block 811 contains the execution units 812, 814, 816, 818, 820, 822, 824, where the instructions are actually executed. This section includes the register files 808, 810, that store the integer and floating point data operand values that the micro-instructions need to execute. The processing device 800 of one implementation is comprised of a number of execution units: address generation unit (AGU) 812, AGU 814, fast ALU 816, fast ALU 818, slow ALU 820, floating point ALU 822, floating point move unit 824. For one implementation, the floating point execution blocks 812, 814, execute floating point, MMX, SIMD, and SSE, or other operations. The floating point ALU 812 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 816, 818. The fast ALUs 816, 818, of one implementation may execute fast operations with an effective latency of half a clock cycle. For one implementation, most complex integer operations go to the slow ALU 820 as the slow ALU 820 includes integer execution hardware for long latency type of operations, such as a multiplier, shifts, flag logic, and branch processing. Memory load/store operations are executed by the AGUs 812, 814. For one implementation, the integer ALUs 816, 818, 820, are described in the context of performing integer operations on 64 bit data operands. In alternative implementations, the ALUs 816, 818, 820, may be implemented to support a variety of data bits including 16, 32, 128, 256, etc. Similarly, the floating point units 822, 824, may be implemented to support a range of operands having bits of various widths. For one implementation, the floating point units 822, 824, may operate on 128 bits wide packed data operands in conjunction with SIMD and multimedia instructions.

In one implementation, the uops schedulers 802, 804, 806, dispatch dependent operations before the parent load has finished executing. As uops are speculatively scheduled and executed in processing device 800, the processing device 800 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processing device are also designed to catch instruction sequences for text string comparison operations.

The processing device 800 also includes logic to enable virtual machines inside a trust domain, in the SEAM-enabled TD-VMX architecture. In one implementation, the execution block 811 of processing device 800 may include the TDRM 142 and the SEAM module 144 to enable virtual machines inside a trust domain, in the SEAM-enabled TD-VMX architecture.

The term "registers" may refer to the on-board processing device storage locations that are used as part of instructions to identify operands. In other words, registers may be those that are usable from the outside of the processing device (from a programmer's perspective). However, the registers of an implementation should not be limited in meaning to a particular type of circuit. Rather, a register of an implementation is capable of storing and providing data, and performing the functions described herein. The registers described herein may be implemented by circuitry within a processing device using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessing devices enabled with MMX technology from Intel Corporation of Santa Clara, Calif. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 9:
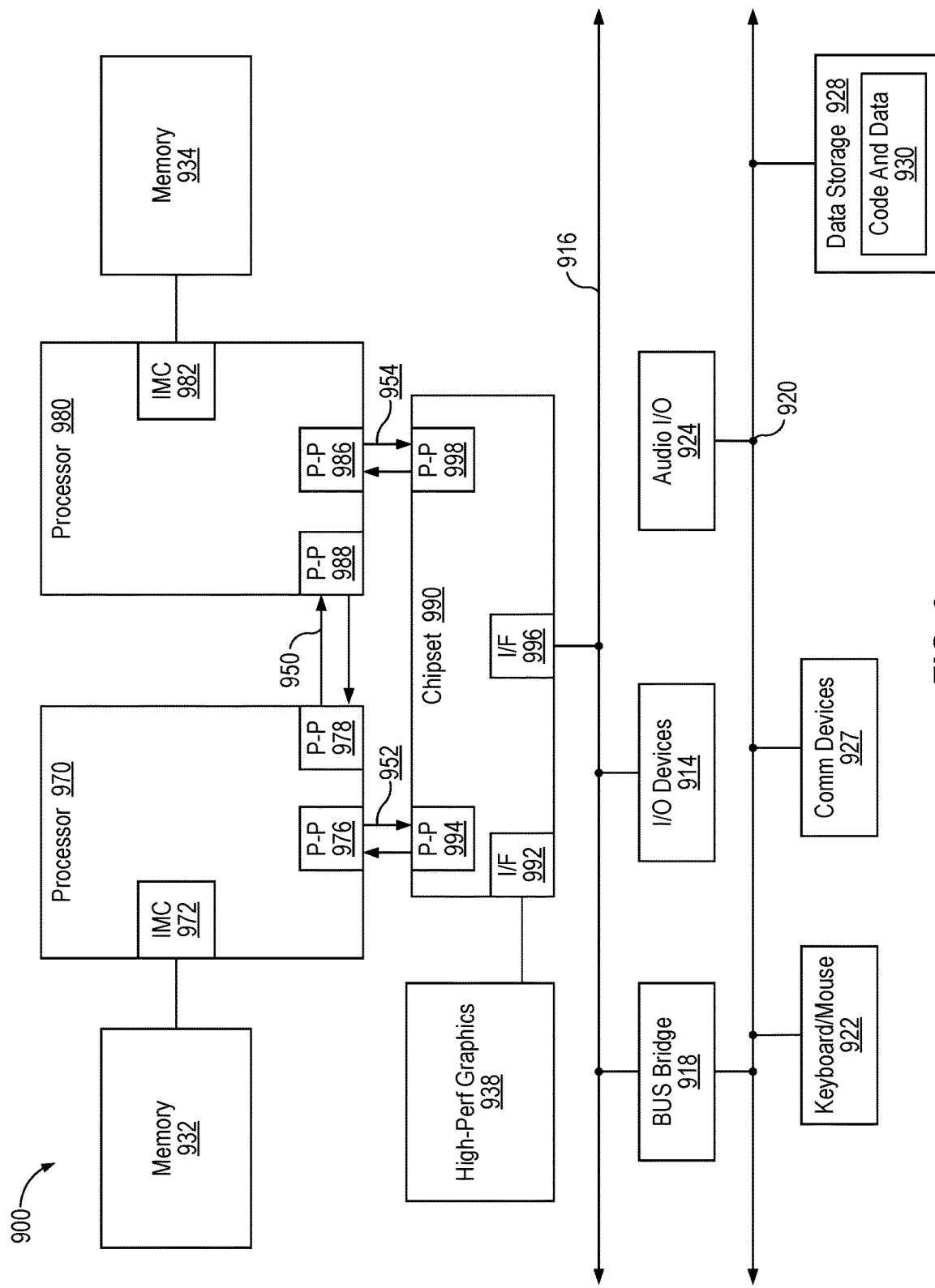
FIG. 9 is a block diagram of a computer system according to one implementation.

Implementations to execute virtual machines inside a trust domain, in the SEAM-enabled TD-VMX architecture, may be implemented in many different system types. Referring now to FIG. 9, shown is a block diagram of a multiprocessing device system 900 in accordance with an implementation. As shown in FIG. 9, multiprocessing device system 900 is a point-to-point interconnect system, and includes a first processing device 970 and a second processing device 980 coupled via a point-to-point interconnect 950. As shown in FIG. 9, each of processing devices 970 and 980 may be multicore processing devices, including first and second processing device cores (not shown), although potentially many more cores may be present in the processing devices. The processing devices each may include hybrid write mode logics in accordance with an implementation of the present. The implementations to execute virtual machines inside a trust domain, in the SEAM-enabled TD-VMX architecture may be implemented in the processing device 970, processing device 980, or both.

While shown with two processing devices 970, 980, it is to be understood that the scope of the disclosure is not so limited. In other implementations, one or more additional processing devices may be present in a given processing device.

Processors 970 and 980 are shown including integrated memory controller units (IMCs) 972 and 982, respectively. Processing device 970 also includes as part of its bus controller units point-to-point (P-P) interfaces 976 and 978; similarly, second processing device 980 includes P-P interfaces 986 and 988. Processing devices 970, 980 may exchange information via a point-to-point (P-P) interface 950 using P-P interface circuits 978, 988. As shown in FIG. 9, IMCs 972 and 982 couple the processing devices to respective memories, namely a memory 932 and a memory 934, which may be portions of main memory locally attached to the respective processing devices.

Processors 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 992.

A shared cache (not shown) may be included in either processing device or outside of both processing devices, yet connected with the processing devices via P-P interconnect, such that either or both processing devices' local cache information may be stored in the shared cache if a processing device is placed into a low power mode.

Chipset 990 may be coupled to a first bus 916 via an interface 996. In one implementation, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918 which couples first bus 916 to a second bus 920. In one implementation, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one implementation. Further, an audio I/O 924 may be coupled to second bus 920. Note that other architectures are possible. For example, instead of the point-to-point architecture of FIG. 9, a system may implement a multi-drop bus or other such architecture.

Figure 10:
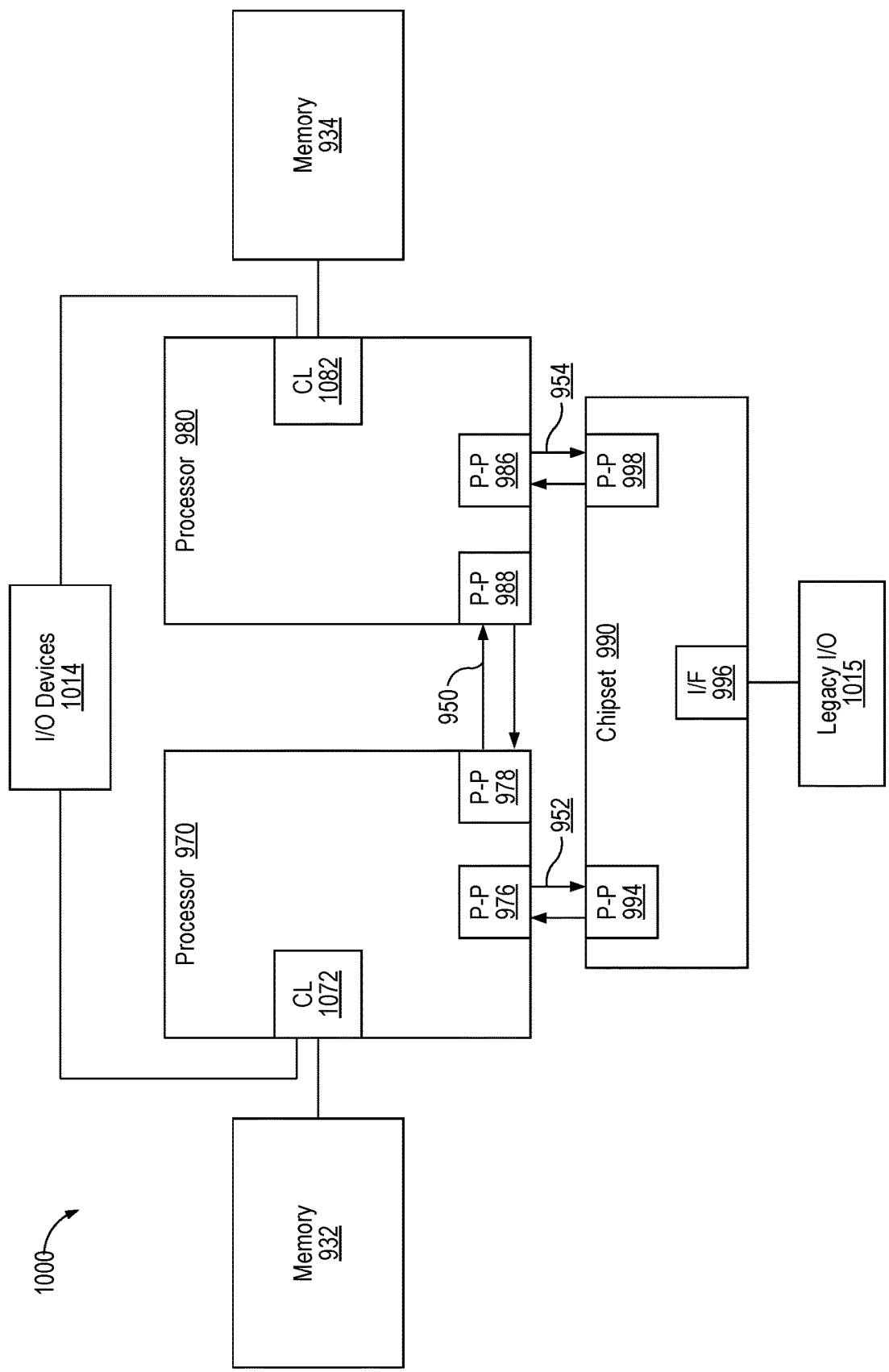
FIG. 10 is a block diagram of a computer system according to another implementation.

Referring now to FIG. 10, shown is a block diagram of a third system 1000 in accordance with an implementation of the disclosure. Like elements in FIGS. 9 and 10 bear like reference numerals, and certain aspects of FIG. 9 have been omitted from FIG. 10 in order to avoid obscuring other aspects of FIG. 10.

FIG. 10 illustrates processors 970, 980. In one embodiment, processors 970, 980 may implement hybrid cores. Processors 970, 980 may include integrated memory and I/O control logic ("CL") 1072 and 1082, respectively, and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one implementation, the CL 1072, 1082 may include IMCs 972, 982 as described herein. In addition, CL 1072, 1082 may also include I/O control logic. FIG. 10 illustrates that the memories 932, 934 are coupled to the CL 1072, 1082, and that I/O devices 1014 are also coupled to the CL 1072, 1082. Legacy I/O devices 1015 are coupled to the chipset 990 via interface 996. The implementations to execute virtual machines inside a trust domain, in the SEAM-enabled TD-VMX architecture, may be implemented in processing device 970, processing device 980, or both.

Figure 11:
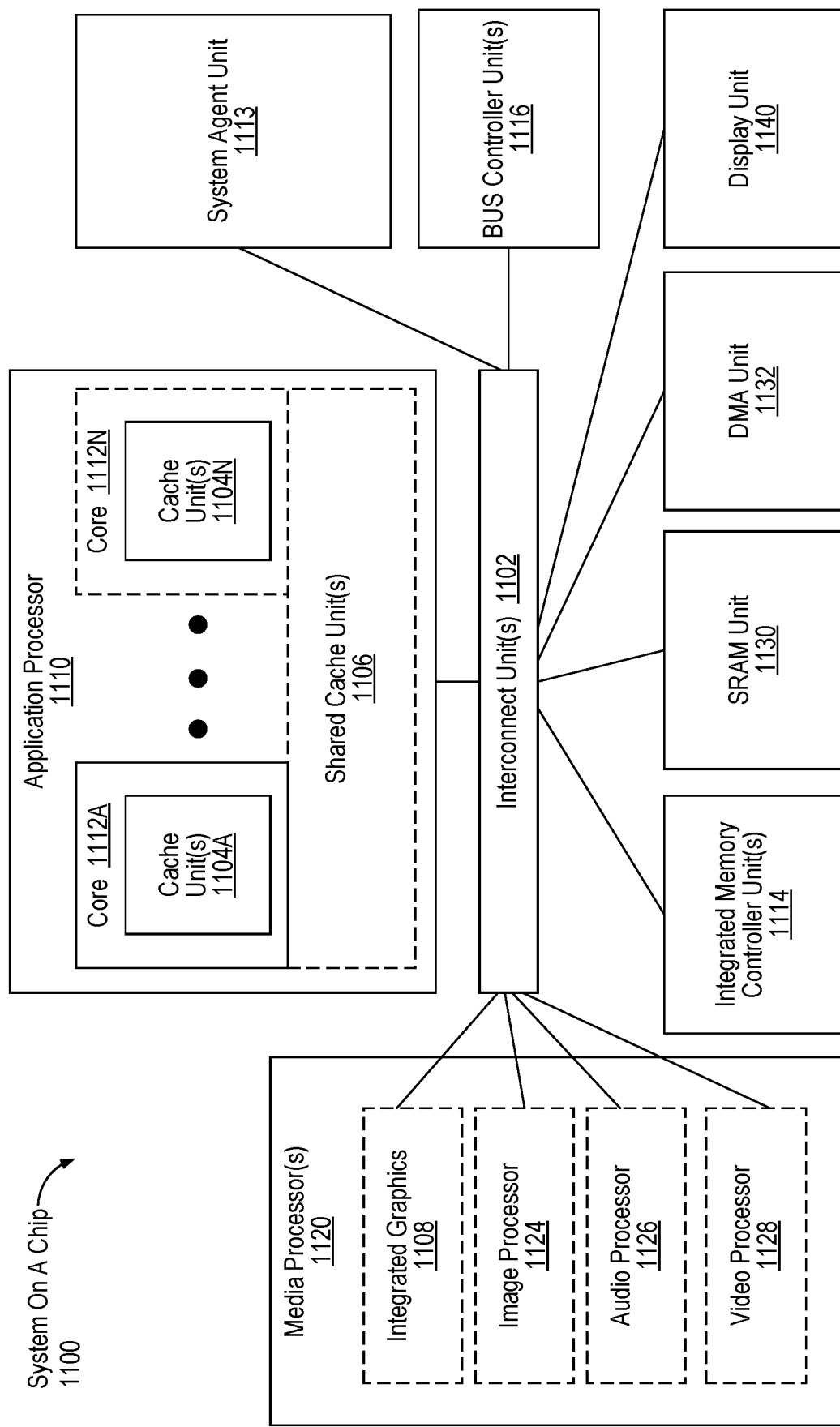
FIG. 11 is a block diagram of a system-on-a-chip according to one implementation.

FIG. 11 is an example system on a chip (SoC) 1100 that may include one or more of the cores 1112A ... 1112N of the application processor 1110. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 11, shown is a block diagram of a SoC 1100 in accordance with an implementation of the disclosure. Also, dashed lined boxes are features on more advanced SoCs. In FIG. 11, an interconnect unit(s) 1102 is coupled to: the application processor 1110 which includes a set of one or more cores 1112A-N, containing one or more cache unit(s) 1104A ... 1104N, respectively, and shared cache unit(s) 1106; a system agent unit 1113; a bus controller unit(s) 1116; an integrated memory controller unit(s) 1114; a set or one or more media processing devices 1120 which may include integrated graphics logic 1108, an image processing device 1124 for providing still and/or video camera functionality, an audio processing device 1126 for providing hardware audio acceleration, and a video processing device 1128 for providing video encode/decode acceleration; a static random access memory (SRAM) unit 1130; a direct memory access (DMA) unit 1132; and a display unit 1140 for coupling to one or more external displays. The implementations to execute virtual machines inside a trust domain, in the SEAM-enabled TD-VMX architecture, may be implemented in SoC 1100.

Figure 12:
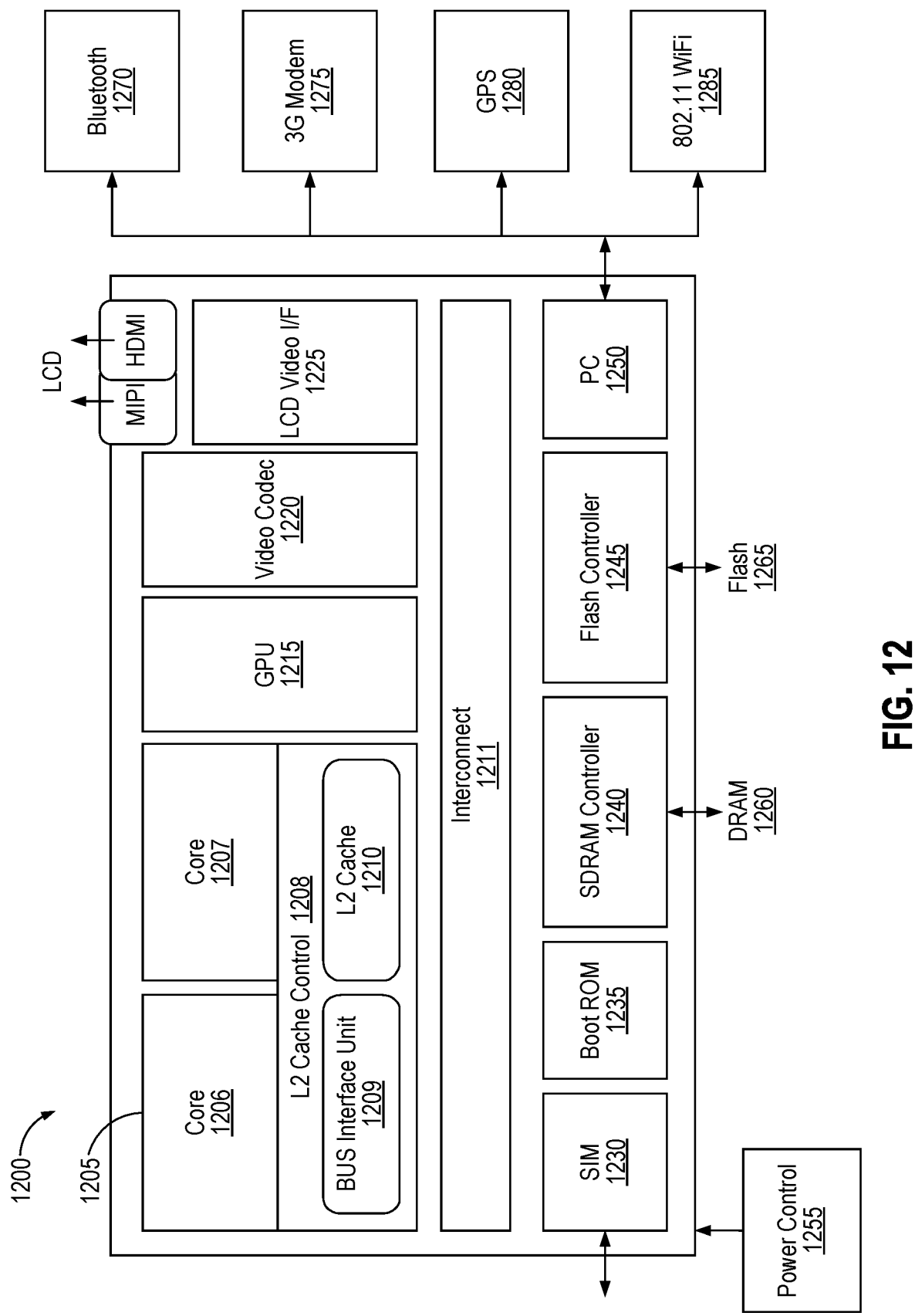
FIG. 12 illustrates another implementation of a block diagram for a computing system.

Turning next to FIG. 12, an implementation of an SoC design in accordance with implementations of the disclosure is depicted. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which may correspond in nature to a mobile station (MS) in a GSM network. The implementations to execute virtual machines inside a trust domain, in the SEAM-enabled TD-VMX architecture, may be implemented in SoC 1200.

Here, SoC 1220 includes 2 cores-1206 and 1207. Similar to the discussion above, cores 1206 and 1207 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which may implement one or more aspects of the described disclosure.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the implementations described herein.

In addition, the system illustrates peripherals for communication, such as a Bluetooth module 1270, 3G modem 1275, GPS 1280, and Wi-Fi 1285. Note as stated above, a UE includes a radio for communication. As a result, these peripheral communication modules may not all be included. However, in a UE some form of a radio for external communication should be included.

Figure 13:
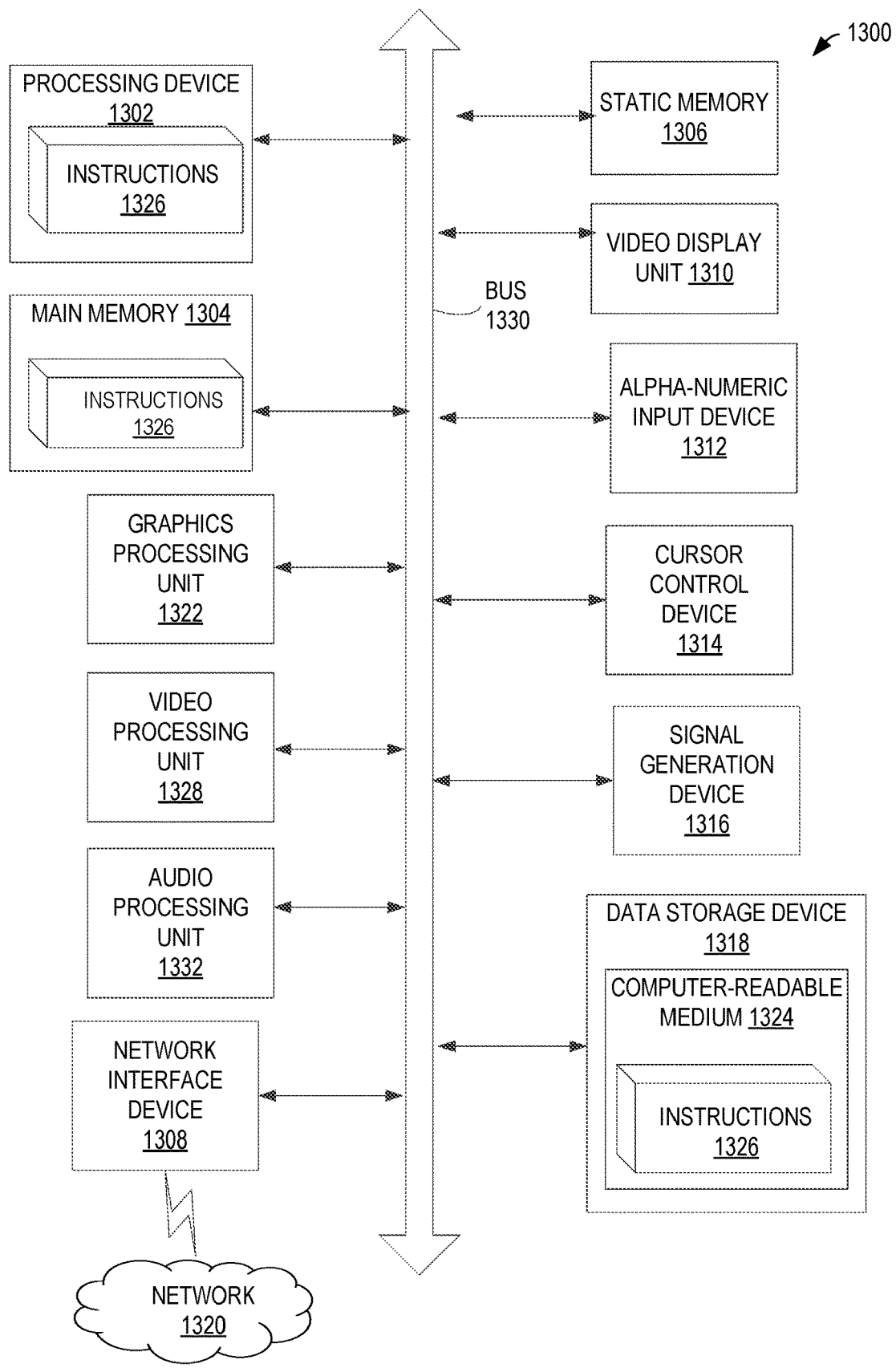
FIG. 13 illustrates another implementation of a block diagram for a computing system.

FIG. 13 illustrates a diagrammatic representation of a machine in the example form of a computing system 1300 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections may be implemented in computing system 1300.

The computing system 1300 includes a processing device 1302, main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessing device, central processing unit, or the like. More particularly, the processing device may be complex instruction set computing (CISC) microprocessing device, reduced instruction set computer (RISC) microprocessing device, very long instruction word (VLIW) microprocessing device, or processing device implementing other instruction sets, or processing devices implementing a combination of instruction sets. Processing device 1302 may also be one or more special-purpose processing devices such as an application specific integrated circuit (ASIC), a field programmable gate array (FPGA), a digital signal processing device (DSP), network processing device, or the like. In one implementation, processing device 1302 may include one or processing device cores. The processing device 1302 is configured to execute instructions 1326 for performing the operations discussed herein. In one implementation, processing device 1302 may be part of the computing system 100 of FIG. 1. Alternatively, the computing system 1300 may include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another implementation, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored instructions 1326 embodying any one or more of the methodologies of functions described herein. The instructions 1326 may also reside, completely or at least partially, within the main memory 1304 as instructions 1326 and/or within the processing device 1302 as processing logic during execution thereof by the computing system 1300; the main memory 1304 and the processing device 1302 also constituting computer-readable storage media.

The computer-readable storage medium 1324 may also be used to store instructions 1326 utilizing the processing device 1302, such as described with respect to FIG. 1, and/or a software library containing methods that call the above applications. While the computer-readable storage medium 1324 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

The following examples pertain to further implementations.

Example 1 is a processor comprising a processor core to 1) initialize a trust domain (TD) and a trust domain resource manager (TDRM) to manage the TD, 2) initialize a virtual machine monitor within the TD (TD-VMM) to manage a plurality of TD-VMs, 3) responsive to receiving an instruction from the TDRM, exclusively associate a plurality of memory pages with the TD, wherein the plurality of memory pages are encrypted with a TD private encryption key inaccessible to the TDRM, and 4) enable a secure arbitration mode (SEAM) of the processor, the SEAM being assigned a SEAM range of memory inaccessible to the TDRM, wherein the SEAM range of memory is used to provide isolation between the TDRM and the plurality of TD-VMs; and one or more registers to store an identifier of the SEAM range of memory, and a TD key identifier (key ID) identifying the TD private encryption key.

In Example 2, the processor of Example 1, wherein the processor core is further to, responsive to a command from the TD-VMM, 1) assign, to a first TD-VM of the plurality of TD-VMs, a first memory page of the plurality of memory pages associated with the TD, 2) assign, to a second TD-VM of the plurality of TD-VMs, a second memory page of the plurality of memory pages associated with the TD; and 3) assign, to the TD-VMM, a third memory page of the plurality of memory pages associated with the TD.

In Example 3, the processor of Example 1, further comprising a physical address metadata table (PAMT) to store attributes of the plurality of memory pages associated with the TD, wherein the attributes of a memory page include at least one of a state, a type, an owner identifier, or a status of the memory page.

In Example 4, the processor of Example 1, wherein the SEAM range of memory comprises one or more memory pages encrypted with a SEAM private encryption key inaccessible to the TDRM.

In Example 5, the processor of Example 1, wherein the SEAM range of memory comprises one or more memory pages to store a secure extended page table (SEPT), wherein the SEPT comprises mappings of guest physical memory addresses (GPAs) to host physical memory addresses (HPAs) for the plurality of memory pages associated with the TD.

In Example 6, the processor of Example 5, wherein the SEPT comprises 1) a guest SEPT to store a first GPA to HPA mapping for a first memory page of the plurality of memory pages associated with the TD, wherein the first memory page is assigned, by the TD-VMM, to one or more of the plurality of TD-VMs, and 2) a host SEPT to store a second GPA to HPA mapping for a second memory page of the plurality of memory pages associated with the TD, wherein the second memory page is assigned, by the TD-VMM, to the TD-VMM.

In Example 7, the processor of Example 5, wherein the processor core is further to 1) initialize, responsive to an instruction from the TDRM, and store, in the SEAM range of memory, a primary virtual machine control structure (VMCS) to maintain an execution state of the TD-VMM, wherein the primary VMCS comprises a pointer to the SEPT, and 2) initialize, responsive to a command from the TD-VMM, and store, in the SEAM range of memory, a plurality of secondary VMCSs for maintaining execution states of the plurality of TD-VMs.

In Example 8, the processor of Example 5, wherein the processor core is further to 1) receive a command from the TD-VMM to assign to a first TD-VM of the plurality of TD-VMs a first memory page of the plurality of memory pages associated with the TD, 2) enter the SEAM of the processor, and 3) update a GPA to HPA mapping for the first memory page in the SEPT.

In Example 9, the processor of Example 5, wherein the processor core is further to 1) receive a command from the TD-VMM to assign to a first TD-VM of the plurality of TD-VM, a first memory page, 2) enter the SEAM of the processor, 3) verify, by accessing a physical address metadata table (PAMT) storing attributes of the plurality of memory pages associated with the TD that the first memory page belongs to the plurality of memory pages associated with the TD, and 4) update a GPA to HPA mapping for the first memory page in the SEPT.

In Example 10, the processor of Example 5, wherein the processor core is further to 1) receive a command from the TD-VMM to assign, to a first TD-VM of the plurality of TD-VMs, a first memory page, 2) enter the SEAM of the processor, 3) verify, by accessing a physical address metadata table (PAMT) storing attributes of the plurality of the memory pages associated with the TD, that the first memory page does not belong to the plurality of memory pages associated with the TD, 4) responsive to verifying that the first memory page does not belong to the plurality of memory pages associated with the TD, exit the SEAM of the processor, 5) associate, responsive to receiving a command from the TDRM, the first memory page with the TD, 6) enter the SEAM of the processor, and 7) update the SEPT with a GPA to HPA mapping for the first memory page.

In Example 11, the processor of Example 5, wherein the processor core is further to 1) receive, while under control of a first TD-VM, a program call from the first TD-VM, 2) determine that execution of the program call requires support from the TD-VMM, 3) execute a VM exit to enter the SEAM of the processor, 3) execute a VM entry from the SEAM of the processor to transfer control of the processor to the TD-VMM, and 4) receive a command from the TD-VMM to execute the program call.

Example 12, a system comprising 1) a memory device, 2) a processor to A) initialize a trust domain (TD) and a trust domain resource manager (TDRM) to manage the TD, B) initialize a virtual machine monitor within the TD (TD-VMM) to manage a plurality of TD-VMs, C) responsive to receiving an instruction from the TDRM, exclusively associate a plurality of pages of the memory device with the TD, wherein the plurality of pages of the memory device are encrypted with a TD private encryption key inaccessible to the TDRM, and D) enable a secure arbitration mode (SEAM) of the processor, the SEAM being assigned a SEAM range of the memory device inaccessible to the TDRM, wherein the SEAM range is used to provide isolation between the TDRM and the plurality of TD-VMs, and 3) one or more hardware registers to store an identifier of the SEAM range of memory and a TD key identifier (key ID) identifying the TD private encryption key.

In Example 13, the system of Example 12, wherein the SEAM range comprises one or more pages of the memory device to store a secure extended page table (SEPT), wherein the SEPT comprises mappings of guest physical memory addresses (GPAs) to host physical memory addresses (HPAs) for the plurality of the pages of the memory device associated with the TD.

Example 14 a method comprising 1) initializing, by a processing device, a trust domain (TD) and a trust domain resource manager (TDRM) to manage the TD, 2) initializing a virtual machine monitor within the TD (TD-VMM) to manage a plurality of TD-VMs, 3) responsive to receiving an instruction from the TDRM, exclusively associating a plurality of memory pages with the TD, wherein the plurality of memory pages are encrypted with a TD private encryption key inaccessible to the TDRM, and 4) enabling a secure arbitration mode (SEAM) of the processing device, the SEAM being assigned a SEAM range of memory inaccessible to the TDRM, wherein the SEAM range of memory is used to provide isolation between the TDRM and the plurality of TD-VMs, and 5) storing, in one or more registers of the processing device an identifier of the SEAM range of memory, and a TD key identifier (key ID) identifying the TD private encryption key.

In Example 15, a method of Example 14, further comprising, responsive to a command from the TD-VMM, 1) assigning to a first TD-VM of the plurality of TD-VMs, a first memory page of the plurality of memory pages associated with the TD, 2) assigning to a second TD-VM of the plurality of TD-VMs, a second memory page of the plurality of memory pages associated with the TD; and 3) assigning to the TD-VMM, a third memory page of the plurality of memory pages associated with the TD.

In Example 16, a method of Example 14, further comprising storing a physical address metadata table (PAMT), wherein the PAMT is to store attributes of the plurality of memory pages associated with the TD-VMM, wherein the attributes of a memory page include at least one of a state, a type, an owner identifier, or a status of the memory page.

In Example 17, a method of Example 14, further comprising encrypting one or more memory pages in the SEAM range of memory with a SEAM private encryption key inaccessible to the TDRM.

In Example 18, a method of Example 14, further comprising storing, in one or more memory pages of the SEAM range of memory, a secure extended page table (SEPT), wherein the SEPT comprises mappings of guest physical memory addresses (GPAs) to host physical memory addresses (HPAs) for the plurality of memory pages associated with the TD.

In Example 19, a method of Example 18, wherein the SEPT comprises 1) a guest SEPT to store a first GPA to HPA mapping for a first memory page of the plurality of memory pages associated with the TD, wherein the first memory page is assigned, by the TD-VMM, to one or more of the plurality of TD-VMs, and 2) a host SEPT to store a second GPA to HPA mapping for a second memory page of the plurality of memory pages associated with the TD, wherein the second memory page is assigned, by the TD-VMM, to the TD-VMM.

In Example 20, a method of Example 18, further comprising 1) initializing, responsive to an instruction from the TDRM, and storing in the SEAM range of memory, a primary virtual machine control structure (VMCS) to maintain an execution state of the TD-VMM, wherein the primary VMCS comprises a pointer to the SEPT; and 2) initializing, responsive to a command from the TD-VMM, and storing in the SEAM range of memory, a plurality of secondary VMCSs for maintaining execution states of the plurality of TD-VMs.

In Example 21, a method of Example 18, further comprising 1) receiving a command from the TD-VMM to assign to a first TD-VM of the plurality of TD-VMs a first memory page of the plurality of memory pages associated with the TD, 2) causing the processing device to enter the SEAM, and 3) updating the SEPT with a GPA to HPA mapping for the first memory page.

In Example 22, a method of Example 18, further comprising 1) receiving a command from the TD-VMM to assign to a first TD-VM of the plurality of TD-VM, a first memory page, 2) causing the processing device to enter the SEAM, 3) verifying, by the processing device accessing a physical address metadata table (PAMT), which stores attributes of the plurality of memory pages associated with the TD, that the first memory page belongs to the plurality of memory pages associated with the TD, and 4) updating a GPA to HPA mapping for the first memory page in the SEPT.

In Example 23, a method of Example 18, further comprising 1) receiving a command from the TD-VMM to assign, to a first TD-VM of the plurality of TD-VMs, a first memory page, 2) causing the processing device to enter the SEAM, 3) verifying, by the processing device accessing a physical address metadata table (PAMT), which stores attributes of the plurality of the memory pages associated with the TD-VMM, that the first memory page does not belong to the plurality of memory pages associated with the TD, 4) responsive to verifying that the first memory page does not belong to the plurality of memory pages associated with the TD, causing the processing device to exit the SEAM, 5) associating, responsive to receiving a command from the TDRM, the first memory page with the TD, 6) causing the processing device to enter the SEAM, and 7) updating a GPA to HPA mapping for the first memory page in the SEPT.

Various implementations may have different combinations of the structural features described above. For instance, all optional features of the processors and methods described above may also be implemented with respect to a system described herein and specifics in the examples may be used anywhere in one or more implementations.

Example 24 is a non-transitory computer-readable medium storing instructions, which when executed by a processor having a core coupled to a system memory, cause the processor to execute a plurality of logic operations comprising 1) initializing, by a processing device, a trust domain (TD) and a trust domain resource manager (TDRM) to manage the TD, 2) initializing a virtual machine monitor within the TD (TD-VMM) to manage a plurality of TD-VMs, 3) responsive to receiving an instruction from the TDRM, exclusively associating a plurality of memory pages with the TD, wherein the plurality of memory pages are encrypted with a TD private encryption key inaccessible to the TDRM, and 4) enabling a secure arbitration mode (SEAM) of the processing device, the SEAM being assigned a SEAM range of memory inaccessible to the TDRM, wherein the SEAM range of memory is used to provide isolation between the TDRM and the plurality of TD-VMs, and 5) storing, in one or more registers of the processing device an identifier of the SEAM range of memory, and a TD key identifier (key ID) identifying the TD private encryption key.

In Example 25, the non-transitory computer-readable medium of Example 24, wherein the operations further comprise, responsive to a command from the TD-VMM, 1) assigning to a first TD-VM of the plurality of TD-VMs, a first memory page of the plurality of memory pages associated with the TD, 2) assigning to a second TD-VM of the plurality of TD-VMs, a second memory page of the plurality of memory pages associated with the TD; and 3) assigning to the TD-VMM, a third memory page of the plurality of memory pages associated with the TD.

In Example 26, the non-transitory computer-readable medium of Example 24, wherein the operations further comprise storing a physical address metadata table (PAMT), wherein the PAMT is to store attributes of the plurality of memory pages associated with the TD-VMM, wherein the attributes of a memory page include at least one of a state, a type, an owner identifier, or a status of the memory page.

In Example 27, the non-transitory computer-readable medium of Example 24, wherein the operations further comprise encrypting one or more memory pages in the SEAM range of memory with a SEAM private encryption key inaccessible to the TDRM.

In Example 28, the non-transitory computer-readable medium of Example 24, wherein the operations further comprise storing, in one or more memory pages of the SEAM range of memory, a secure extended page table (SEPT), wherein the SEPT comprises mappings of guest physical memory addresses (GPAs) to host physical memory addresses (HPAs) for the plurality of memory pages associated with the TD.

In Example 29, the non-transitory computer-readable medium of Example 28, wherein the SEPT comprises 1) a guest SEPT to store a first GPA to HPA mapping for a first memory page of the plurality of memory pages associated with the TD, wherein the first memory page is assigned, by the TD-VMM, to one or more of the plurality of TD-VMs, and 2) a host SEPT to store a second GPA to HPA mapping for a second memory page of the plurality of memory pages associated with the TD, wherein the second memory page is assigned, by the TD-VMM, to the TD-VMM.

In Example 30, the non-transitory computer-readable medium of Example 28, wherein the operations further comprise 1) initializing, responsive to an instruction from the TDRM, and storing in the SEAM range of memory, a primary virtual machine control structure (VMCS) to maintain an execution state of the TD-VMM, wherein the primary VMCS comprises a pointer to the SEPT; and 2) initializing, responsive to a command from the TD-VMM, and storing in the SEAM range of memory, a plurality of secondary VMCSs for maintaining execution states of the plurality of TD-VMs.

In Example 31, the non-transitory computer-readable medium of Example 28, wherein the operations further comprise 1) receiving a command from the TD-VMM to assign to a first TD-VM of the plurality of TD-VMs a first memory page of the plurality of memory pages associated with the TD, 2) causing the processing device to enter the SEAM, and 3) updating the SEPT with a GPA to HPA mapping for the first memory page.

In Example 32, the non-transitory computer-readable medium of Example 28, wherein the operations further comprise 1) receiving a command from the TD-VMM to assign to a first TD-VM of the plurality of TD-VM, a first memory page, 2) causing the processing device to enter the SEAM, 3) verifying, by the processing device accessing a physical address metadata table (PAMT), which stores attributes of the plurality of memory pages associated with the TD, that the first memory page belongs to the plurality of memory pages associated with the TD, and 4) updating a GPA to HPA mapping for the first memory page in the SEPT.

In Example 33, the non-transitory computer-readable medium of Example 28, wherein the operations further comprise 1) receiving a command from the TD-VMM to assign, to a first TD-VM of the plurality of TD-VMs, a first memory page, 2) causing the processing device to enter the SEAM, 3) verifying, by the processing device accessing a physical address metadata table (PAMT), which stores attributes of the plurality of the memory pages associated with the TD-VMM, that the first memory page does not belong to the plurality of memory pages associated with the TD, 4) responsive to verifying that the first memory page does not belong to the plurality of memory pages associated with the TD, causing the processing device to exit the SEAM, 5) associating, responsive to receiving a command from the TDRM, the first memory page with the TD, 6) causing the processing device to enter the SEAM, and 7) updating a GPA to HPA mapping for the first memory page in the SEPT.

Various implementations may have different combinations of the structural features described above. For instance, all optional features of the processors and methods described above may also be implemented with respect to a system described herein and specifics in the examples may be used anywhere in one or more implementations.

Example 34 is a system comprising 1) means for initializing, by a processing device, a trust domain (TD) and a trust domain resource manager (TDRM) to manage the TD, 2) means for initializing a virtual machine monitor within the TD (TD-VMM) to manage a plurality of TD-VMs, 3) means for, responsive to receiving an instruction from the TDRM, exclusively associating a plurality of memory pages with the TD, wherein the plurality of memory pages are encrypted with a TD private encryption key inaccessible to the TDRM, and 4) means for enabling a secure arbitration mode (SEAM) of the processing device, the SEAM being assigned a SEAM range of memory inaccessible to the TDRM, wherein the SEAM range of memory is used to provide isolation between the TDRM and the plurality of TD-VMs, and 5) means for storing, in one or more registers of the processing device an identifier of the SEAM range of memory, and a TD key identifier (key ID) identifying the TD private encryption key.

In Example 35, a system of Example 34, further comprising means for, responsive to a command from the TD-VMM, 1) assigning to a first TD-VM of the plurality of TD-VMs, a first memory page of the plurality of memory pages associated with the TD, 2) assigning to a second TD-VM of the plurality of TD-VMs, a second memory page of the plurality of memory pages associated with the TD; and 3) assigning to the TD-VMM, a third memory page of the plurality of memory pages associated with the TD.

In Example 36, a system of Example 34, further comprising means for storing a physical address metadata table (PAMT), wherein the PAMT is to store attributes of the plurality of memory pages associated with the TD-VMM, wherein the attributes of a memory page include at least one of a state, a type, an owner identifier, or a status of the memory page.

In Example 37, a system of Example 34, further comprising means for encrypting one or more memory pages in the SEAM range of memory with a SEAM private encryption key inaccessible to the TDRM.

In Example 38, a system of Example 34, further comprising means for storing, in one or more memory pages of the SEAM range of memory, a secure extended page table (SEPT), wherein the SEPT comprises mappings of guest physical memory addresses (GPAs) to host physical memory addresses (HPAs) for the plurality of memory pages associated with the TD.

In Example 39, a system of Example 38, wherein the SEPT comprises 1) a guest SEPT to store a first GPA to HPA mapping for a first memory page of the plurality of memory pages associated with the TD, wherein the first memory page is assigned, by the TD-VMM, to one or more of the plurality of TD-VMs, and 2) a host SEPT to store a second GPA to HPA mapping for a second memory page of the plurality of memory pages associated with the TD, wherein the second memory page is assigned, by the TD-VMM, to the TD-VMM.

In Example 40, a system of Example 38, further comprising 1) means for initializing, responsive to an instruction from the TDRM, and storing in the SEAM range of memory, a primary virtual machine control structure (VMCS) to maintain an execution state of the TD-VMM, wherein the primary VMCS comprises a pointer to the SEPT; and 2) means for initializing, responsive to a command from the TD-VMM, and means for storing in the SEAM range of memory, a plurality of secondary VMCSs for maintaining execution states of the plurality of TD-VMs.

In Example 41, a system of Example 38, further comprising 1) means for receiving a command from the TD-VMM to assign to a first TD-VM of the plurality of TD-VMs a first memory page of the plurality of memory pages associated with the TD, 2) means for causing the processing device to enter the SEAM, and 3) means for updating the SEPT with a GPA to HPA mapping for the first memory page.

In Example 42, a system of Example 38, further comprising 1) means for receiving a command from the TD-VMM to assign to a first TD-VM of the plurality of TD-VM, a first memory page, 2) means for causing the processing device to enter the SEAM, 3) means for verifying, by the processing device accessing a physical address metadata table (PAMT), which stores attributes of the plurality of memory pages associated with the TD, that the first memory page belongs to the plurality of memory pages associated with the TD, and 4) means for updating a GPA to HPA mapping for the first memory page in the SEPT.

In Example 43, a system of Example 38, further comprising 1) means for receiving a command from the TD-VMM to assign, to a first TD-VM of the plurality of TD-VMs, a first memory page, 2) means for causing the processing device to enter the SEAM, 3) means for verifying, by the processing device accessing a physical address metadata table (PAMT), which stores attributes of the plurality of the memory pages associated with the TD-VMM, that the first memory page does not belong to the plurality of memory pages associated with the TD, 4) means for, responsive to verifying that the first memory page does not belong to the plurality of memory pages associated with the TD, causing the processing device to exit the SEAM, 5) means for associating, responsive to receiving a command from the TDRM, the first memory page with the TD, 6) means for causing the processing device to enter the SEAM, and 7) means for updating a GPA to HPA mapping for the first memory page in the SEPT.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the disclosure. It will be apparent, however, to one skilled in the art that these specific details need not be employed to practice the disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the disclosure.

The implementations are described with reference to executing virtual machines inside a trust domain, in the SEAM-enabled TD-VMX architecture in specific integrated circuits, such as in computing platforms or microprocessing devices. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that may perform the functions and operations taught below. It is described that the system may be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processing device, other implementations are applicable to other types of integrated circuits and logic devices. Similar techniques and teachings of implementations of the disclosure may be applied to other types of circuits or semiconductor devices that may benefit from higher pipeline throughput and improved performance. The teachings of implementations of the disclosure are applicable to any processing device or machine that performs data manipulations. However, the disclosure is not limited to processing devices or machines that perform 512 bit, 256 bit, 128 bit, 64 bit, 32 bit, or 16 bit data operations and may be applied to any processing device and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the below examples describe instruction handling and distribution in the context of execution units and logic circuits, other implementations of the disclosure may be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions may be used to cause a general-purpose or special-purpose processing device that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from. Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a processor core to:
      initialize a trust domain (TD) and a trust domain resource manager (TDRM) to manage the TD;
      initialize a virtual machine monitor within the TD (TD-VMM) to manage a plurality of TD-VMs;
      responsive to receiving a first instruction from the TDRM, exclusively associate a plurality of memory pages with the TD, wherein the plurality of memory pages are encrypted with a TD private encryption key inaccessible to the TDRM;
      enable a secure arbitration mode (SEAM) of the processor, the SEAM being assigned a SEAM range of memory inaccessible to the TDRM; and
      responsive to receiving a second instruction from the TD-VMM, exit the TD-VMM into a SEAM module to manage memory space for one or more of the plurality of TD-VMs; and
   one or more registers to store:
      an identifier of the SEAM range of memory; and
      a TD key identifier (key ID) identifying the TD private encryption key.

2. The processor of claim 1, wherein the processor core is further to, responsive to a command from the TD-VMM:
   assign, to a first TD-VM of the plurality of TD-VMs, a first memory page of the plurality of memory pages associated with the TD;
   assign, to a second TD-VM of the plurality of TD-VMs, a second memory page of the plurality of memory pages associated with the TD; and
   assign, to the TD-VMM, a third memory page of the plurality of memory pages associated with the TD.

3. The processor of claim 1, further comprising a physical address metadata table (PAMT) to store attributes of the plurality of memory pages associated with the TD, wherein the attributes of a memory page include at least one of a state, a type, an owner identifier, or a status of the memory page.

4. The processor of claim 1, wherein the SEAM range of memory comprises one or more memory pages encrypted with a SEAM private encryption key inaccessible to the TDRM.

5. The processor of claim 1, wherein the SEAM range of memory comprises one or more memory pages to store a secure extended page table (SEPT), wherein the SEPT comprises mappings of guest physical memory addresses (GPAs) to host physical memory addresses (HPAs) for the plurality of memory pages associated with the TD.

6. The processor of claim 5, wherein the SEPT comprises:
   a guest SEPT to store a first GPA to HPA mapping for a first memory page of the plurality of memory pages associated with the TD, wherein the first memory page is assigned, by the TD-VMM, to one or more of the plurality of TD-VMs; and
   a host SEPT to store a second GPA to HPA mapping for a second memory page of the plurality of memory pages associated with the TD, wherein the second memory page is assigned, by the TD-VMM, to the TD-VMM.

7. The processor of claim 5, wherein the processor core is further to:
   initialize, responsive to an instruction from the TDRM, and store, in the SEAM range of memory, a primary virtual machine control structure (VMCS) to maintain an execution state of the TD-VMM, wherein the primary VMCS comprises a pointer to the SEPT; and
   initialize, responsive to a command from the TD-VMM, and store, in the SEAM range of memory, a plurality of secondary VMCSs for maintaining execution states of the plurality of TD-VMs.

8. The processor of claim 5, wherein the processor core is further to:
   receive a command from the TD-VMM to assign to a first TD-VM of the plurality of TD-VMs a first memory page of the plurality of memory pages associated with the TD;
   enter the SEAM of the processor; and
   update a GPA to HPA mapping for the first memory page in the SEPT.

9. The processor of claim 5, wherein the processor core is further to:
   receive a command from the TD-VMM to assign to a first TD-VM of the plurality of TD-VM, a first memory page;
   enter the SEAM of the processor;
   verify, by accessing a physical address metadata table (PAMT) storing attributes of the plurality of memory pages associated with the TD that the first memory page belongs to the plurality of memory pages associated with the TD; and
   update a GPA to HPA mapping for the first memory page in the SEPT.

10. The processor of claim 5, wherein the processor core is further to:
    receive a command from the TD-VMM to assign, to a first TD-VM of the plurality of TD-VMs, a first memory page;
    enter the SEAM of the processor;
    verify, by accessing a physical address metadata table (PAMT) storing attributes of the plurality of the memory pages associated with the TD, that the first memory page does not belong to the plurality of memory pages associated with the TD;
    responsive to verifying that the first memory page does not belong to the plurality of memory pages associated with the TD, exit the SEAM of the processor;
    associate, responsive to receiving a command from the TDRM, the first memory page with the TD;
    enter the SEAM of the processor; and
    update the SEPT with a GPA to HPA mapping for the first memory page.

11. The processor of claim 5, wherein the processor core is further to:
    receive, while under control of a first TD-VM, a program call from the first TD-VM;
    determine that execution of the program call requires support from the TD-VMM;
    execute a VM exit to enter the SEAM of the processor;
    execute a VM entry from the SEAM of the processor to transfer control of the processor to the TD-VMM; and
    receive a command from the TD-VMM to execute the program call.

12. A system comprising:
    a memory device;
    a processor to:
       initialize a trust domain (TD) and a trust domain resource manager (TDRM) to manage the TD;
       initialize a virtual machine monitor within the TD (TD-VMM) to manage a plurality of TD-VMs;
       responsive to receiving an instruction from the TDRM, exclusively associate a plurality of pages of the memory device with the TD, wherein the plurality of pages of the memory device are encrypted with a TD private encryption key inaccessible to the TDRM;
       enable a secure arbitration mode (SEAM) of the processor, the SEAM being assigned a SEAM range of the memory device inaccessible to the TDRM; and
       responsive to receiving a second instruction from the TD-VMM, exit the TD-VMM into a SEAM module to manage memory space for one or more of the plurality of TD-VMs; and
    one or more hardware registers to store:
       an identifier of the SEAM range of memory; and
       a TD key identifier (key ID) identifying the TD private encryption key.

13. The system of claim 12, wherein the SEAM range comprises one or more pages of the memory device to store a secure extended page table (SEPT), wherein the SEPT comprises mappings of guest physical memory addresses (GPAs) to host physical memory addresses (HPAs) for the plurality of the pages of the memory device associated with the TD.

14. A method comprising:
    initializing, by a processing device, a trust domain (TD) and a trust domain resource manager (TDRM) to manage the TD;
    initializing, a virtual machine monitor within the TD (TD-VMM) to manage a plurality of TD-VMs;
    responsive to receiving an instruction from the TDRM, exclusively associating a plurality of memory pages with the TD, wherein the plurality of memory pages are encrypted with a TD private encryption key inaccessible to the TDRM; and enabling a secure arbitration mode (SEAM) of the processing device, the SEAM being assigned a SEAM range of memory inaccessible to the TDRM;
storing, in one or more registers of the processing device:
an identifier of the SEAM range of memory; and
a TD key identifier (key ID) identifying the TD private encryption key; and
responsive to receiving a second instruction from the TD-VMM, exiting the TD-VMM into a SEAM module to manage memory space for one or more of the plurality of TD-VMs.

15. The method of claim 14, further comprising, responsive to a command from the TD-VMM:
assigning to a first TD-VM of the plurality of TD-VMs, a first memory page of the plurality of memory pages associated with the TD;
assigning to a second TD-VM of the plurality of TD-VMs, a second memory page of the plurality of memory pages associated with the TD; and
assigning to the TD-VMM, a third memory page of the plurality of memory pages associated with the TD.

16. The method of claim 14, further comprising storing a physical address metadata table (PAMT), wherein the PAMT is to store attributes of the plurality of memory pages associated with the TD-VMM, wherein the attributes of a memory page include at least one of a state, a type, an owner identifier, or a status of the memory page.

17. The method of claim 14, further comprising encrypting one or more memory pages in the SEAM range of memory with a SEAM private encryption key inaccessible to the TDRM.

18. The method of claim 14, further comprising storing, in one or more memory pages of the SEAM range of memory, a secure extended page table (SEPT), wherein the SEPT comprises mappings of guest physical memory addresses (GPAs) to host physical memory addresses (HPAs) for the plurality of memory pages associated with the TD.

19. The method of claim 18, wherein the SEPT comprises:
a guest SEPT to store a first GPA to HPA mapping for a first memory page of the plurality of memory pages associated with the TD, wherein the first memory page is assigned, by the TD-VMM, to one or more of the plurality of TD-VMs; and
a host SEPT to store a second GPA to HPA mapping for a second memory page of the plurality of memory pages associated with the TD, wherein the second memory page is assigned, by the TD-VMM, to the TD-VMM.

20. The method of claim 18, further comprising:
initializing, responsive to an instruction from the TDRM, and storing in the SEAM range of memory, a primary virtual machine control structure (VMCS) to maintain an execution state of the TD-VMM, wherein the primary VMCS comprises a pointer to the SEPT; and
initializing, responsive to a command from the TD-VMM, and storing in the SEAM range of memory, a plurality of secondary VMCSs for maintaining execution states of the plurality of TD-VMs.

21. The method of claim 18, further comprising:
receiving a command from the TD-VMM to assign to a first TD-VM of the plurality of TD-VMs a first memory page of the plurality of memory pages associated with the TD;
causing the processing device to enter the SEAM; and
updating the SEPT with a GPA to HPA mapping for the first memory page.

22. The method of claim 18, further comprising:
receiving a command from the TD-VMM to assign to a first TD-VM of the plurality of TD-VM, a first memory page;
causing the processing device to enter the SEAM;
verifying, by the processing device accessing a physical address metadata table (PAMT), which stores attributes of the plurality of memory pages associated with the TD, that the first memory page belongs to the plurality of memory pages associated with the TD; and
updating a GPA to HPA mapping for the first memory page in the SEPT.

23. The method of claim 18, further comprising:
receiving a command from the TD-VMM to assign, to a first TD-VM of the plurality of TD-VMs, a first memory page;
causing the processing device to enter the SEAM;
verifying, by the processing device accessing a physical address metadata table (PAMT), which stores attributes of the plurality of the memory pages associated with the TD-VMM, that the first memory page does not belong to the plurality of memory pages associated with the TD;
responsive to verifying that the first memory page does not belong to the plurality of memory pages associated with the TD, causing the processing device to exit the SEAM;
associating, responsive to receiving a command from the TDRM, the first memory page with the TD;
causing the processing device to enter the SEAM; and
updating a GPA to HPA mapping for the first memory page in the SEPT.

\* \* \* \* \*